(12) United States Patent
Liu et al.

(10) Patent No.: US 11,902,801 B2
(45) Date of Patent: Feb. 13, 2024

(54) INTRA-SLOT TRANSMIT/RECEIVE BEAM SELECTION FOR SIDELINK

(71) Applicant: QUALCOMM INCORPORATED, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Ozcan Ozturk, San Diego, CA (US); Tao Luo, San Diego, CA (US); Sony Akkarakaran, Poway, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

(21) Appl. No.: 17/304,627

(22) Filed: Jun. 23, 2021

(65) Prior Publication Data

US 2022/0046430 A1 Feb. 10, 2022

Related U.S. Application Data

(60) Provisional application No. 62/706,224, filed on Aug. 5, 2020.

(51) Int. Cl.
| | |
|---|---|
| H04W 24/10 | (2009.01) |
| H04W 16/28 | (2009.01) |
| H04L 5/00 | (2006.01) |
| H04W 72/0446 | (2023.01) |
| H04W 72/20 | (2023.01) |

(52) U.S. Cl.
CPC .......... *H04W 16/28* (2013.01); *H04L 5/0048* (2013.01); *H04W 24/10* (2013.01); *H04W 72/0446* (2013.01); *H04W 72/20* (2023.01)

(58) Field of Classification Search
CPC ..... H04W 16/28; H04W 72/20; H04W 24/10; H04W 72/0446; H04L 5/0048
USPC .......................................................... 370/329
See application file for complete search history.

(56) References Cited

U.S. PATENT DOCUMENTS

2021/0297199 A1* 9/2021 Miao ..................... H04L 1/1896

FOREIGN PATENT DOCUMENTS

WO WO 2019/065189 * 10/2018

* cited by examiner

*Primary Examiner* — Christopher R Crompton
(74) *Attorney, Agent, or Firm* — QUALCOMM Incorporated

(57) ABSTRACT

Wireless communications systems and methods related to intra-slot transmit beam selection and receive beam selection for sidelink are provided. A first user equipment (UE) transmits, to a second UE over a sidelink, a plurality of beam measurement signals in a plurality of beam directions during a first slot, wherein each beam measurement signal of the plurality of beam measurement signals includes at least one of sidelink control information (SCI) or a channel state information-reference signal (CSI-RS), and wherein the plurality of beam directions includes at least two different beam directions. The first UE receives, from the second UE, an indication of a preferred beam direction of the plurality of beam directions. The first UE transmits, to the second UE over the sidelink, data in the preferred beam direction.

30 Claims, 18 Drawing Sheets

US 11,902,801 B2

INTRA-SLOT TRANSMIT/RECEIVE BEAM SELECTION FOR SIDELINK

CROSS REFERENCE TO RELATED APPLICATIONS

The present application claims priority to and the benefit of U.S. Provisional Patent Application No. 62/706,224, filed Aug. 5, 2020, which is hereby incorporated by reference in its entirety as if fully set forth below and for all applicable purposes.

TECHNICAL FIELD

This application relates to wireless communication systems, and more particularly to intra-slot transmit beam selection and receive beam selection for sidelink.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first user equipment (UE), including transmitting, to a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; receiving, from the second UE, an indication of a preferred beam direction of the plurality of beam directions; and transmitting, to the second UE over the sidelink, data in the preferred beam direction.

In an additional aspect of the disclosure, a method of wireless communication performed by a first user equipment (UE), including transmitting, to a second UE over a sidelink, an indication of a preferred transmit beam direction of a plurality of transmit beam directions; receiving, from the second UE over the sidelink based on a plurality of receive beam directions, a plurality of beam measurement signals in the preferred transmit beam direction; determining, based on the plurality of beam measurement signals received from the second UE, a preferred receive beam direction from the plurality of receive beam directions; and receiving, from the second UE over the sidelink based on the preferred receive beam direction, data.

In an additional aspect of the disclosure, a method of wireless communication performed by a first user equipment (UE), including receiving, from a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; transmitting, to the second UE based on one or more beam measurement signals of the plurality of beam measurement signals, an indication of a preferred beam direction of the plurality of beam directions; and receiving, from the second UE over the sidelink, data in the preferred beam direction.

In an additional aspect of the disclosure, a method of wireless communication performed by a first user equipment (UE), including receiving, from a second UE over a sidelink, an indication of a preferred transmit beam direction of a plurality of transmit beam directions; transmitting, to the second UE over the sidelink, a plurality of beam measurement signals in the preferred transmit beam direction associated with a receive beam selection; and transmitting, to the second UE over the sidelink based on the preferred transmit beam direction, data.

In an additional aspect of the disclosure, a first user equipment (UE) includes a transceiver configured to transmit, to a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; receive, from the second UE, an indication of a preferred beam direction of the plurality of beam directions; and transmit, to the second UE over the sidelink, data in the preferred beam direction.

In an additional aspect of the disclosure, a first user equipment (UE) includes a transceiver configured to transmit, to a second UE over a sidelink, an indication of a preferred transmit beam direction of a plurality of transmit beam directions; and receive, from the second UE over the sidelink based on a plurality of receive beam directions, a plurality of beam measurement signals in the preferred transmit beam direction; and a processor configured to determining, based on the plurality of beam measurement signals received from the second UE, a preferred receive beam direction from the plurality of receive beam directions, where the transceiver is further configured to receive, from the second UE over the sidelink based on the preferred receive beam direction, data.

In an additional aspect of the disclosure, a first user equipment (UE) includes a transceiver configured to receive, from a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; transmit, to the second UE based on one or more beam measurement signals of the plurality of beam measurement signals, an indication of a preferred beam direction of the plurality of beam directions; and receive, from the second UE over the sidelink, data in the preferred beam direction.

In an additional aspect of the disclosure, a first user equipment (UE) includes a transceiver configured to receive, from a second UE over a sidelink, an indication of a preferred transmit beam direction of a plurality of transmit beam directions; transmit, to the second UE over the sidelink, a plurality of beam measurement signals in the preferred transmit beam direction associated with a receive beam selection; and transmit, to the second UE over the sidelink based on the preferred transmit beam direction, data.

In an additional aspect of the disclosure, a non-transitory computer-readable medium having program code recorded thereon, the program code includes code for causing a first user equipment (UE) to transmit, to a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; code for causing the first UE to receive, from the second UE, an indication of a preferred beam direction of the plurality of beam directions; and code for causing the first UE to transmit, to the second UE over the sidelink, data in the preferred beam direction.

In an additional aspect of the disclosure, a non-transitory computer-readable medium having program code recorded thereon, the program code includes code for causing a first user equipment (UE) to transmit, to a second UE over a sidelink, an indication of a preferred transmit beam direction of a plurality of transmit beam directions; code for causing the first UE to receive, from the second UE over the sidelink based on a plurality of receive beam directions, a plurality of beam measurement signals in the preferred transmit beam direction; and code for causing the first UE to determining, based on the plurality of beam measurement signals received from the second UE, a preferred receive beam direction from the plurality of receive beam directions, code for causing the first UE to receive, from the second UE over the sidelink based on the preferred receive beam direction, data.

In an additional aspect of the disclosure, a non-transitory computer-readable medium having program code recorded thereon, the program code includes code for causing a first user equipment (UE) to receive, from a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; code for causing the first UE to transmit, to the second UE based on one or more beam measurement signals of the plurality of beam measurement signals, an indication of a preferred beam direction of the plurality of beam directions; and code for causing the first UE to receive, from the second UE over the sidelink, data in the preferred beam direction.

In an additional aspect of the disclosure, a non-transitory computer-readable medium having program code recorded thereon, the program code includes code for causing a first user equipment (UE) to receive, from a second UE over a sidelink, an indication of a preferred transmit beam direction of a plurality of transmit beam directions; transmit, to the second UE over the sidelink, a plurality of beam measurement signals in the preferred transmit beam direction associated with a receive beam selection; and transmit, to the second UE over the sidelink based on the preferred transmit beam direction, data.

In an additional aspect of the disclosure, a first user equipment (UE) includes means for transmitting, to a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; means for receiving, from the second UE, an indication of a preferred beam direction of the plurality of beam directions; and means for transmitting, to the second UE over the sidelink, data in the preferred beam direction.

In an additional aspect of the disclosure, a first user equipment (UE) includes means for transmitting, to a second UE over a sidelink, an indication of a preferred transmit beam direction of a plurality of transmit beam directions; means for receiving, from the second UE over the sidelink based on a plurality of receive beam directions, a plurality of beam measurement signals in the preferred transmit beam direction; and code for causing the first UE to determining, based on the plurality of beam measurement signals received from the second UE, a preferred receive beam direction from the plurality of receive beam directions, means for receiving, from the second UE over the sidelink based on the preferred receive beam direction, data.

In an additional aspect of the disclosure, a first user equipment (UE) includes means for receiving, from a second UE over a sidelink, a plurality of beam measurement signals in a plurality of beam directions during a first slot, where each beam measurement signal of the plurality of beam measurement signals includes at least one of sidelink control information (SCI) or a channel state information-reference signal (CSI-RS), and where the plurality of beam directions includes at least two different beam directions; means for transmitting, to the second UE based on one or more beam measurement signals of the plurality of beam measurement signals, an indication of a preferred beam direction of the plurality of beam directions; and means for receiving, from the second UE over the sidelink, data in the preferred beam direction.

In an additional aspect of the disclosure, a first user equipment (UE) includes means for receiving, from a second UE over a sidelink, an indication of a preferred transmit beam direction of a plurality of transmit beam directions; transmit, to the second UE over the sidelink, a plurality of beam measurement signals in the preferred transmit beam direction associated with a receive beam selection; and transmit, to the second UE over the sidelink based on the preferred transmit beam direction, data.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
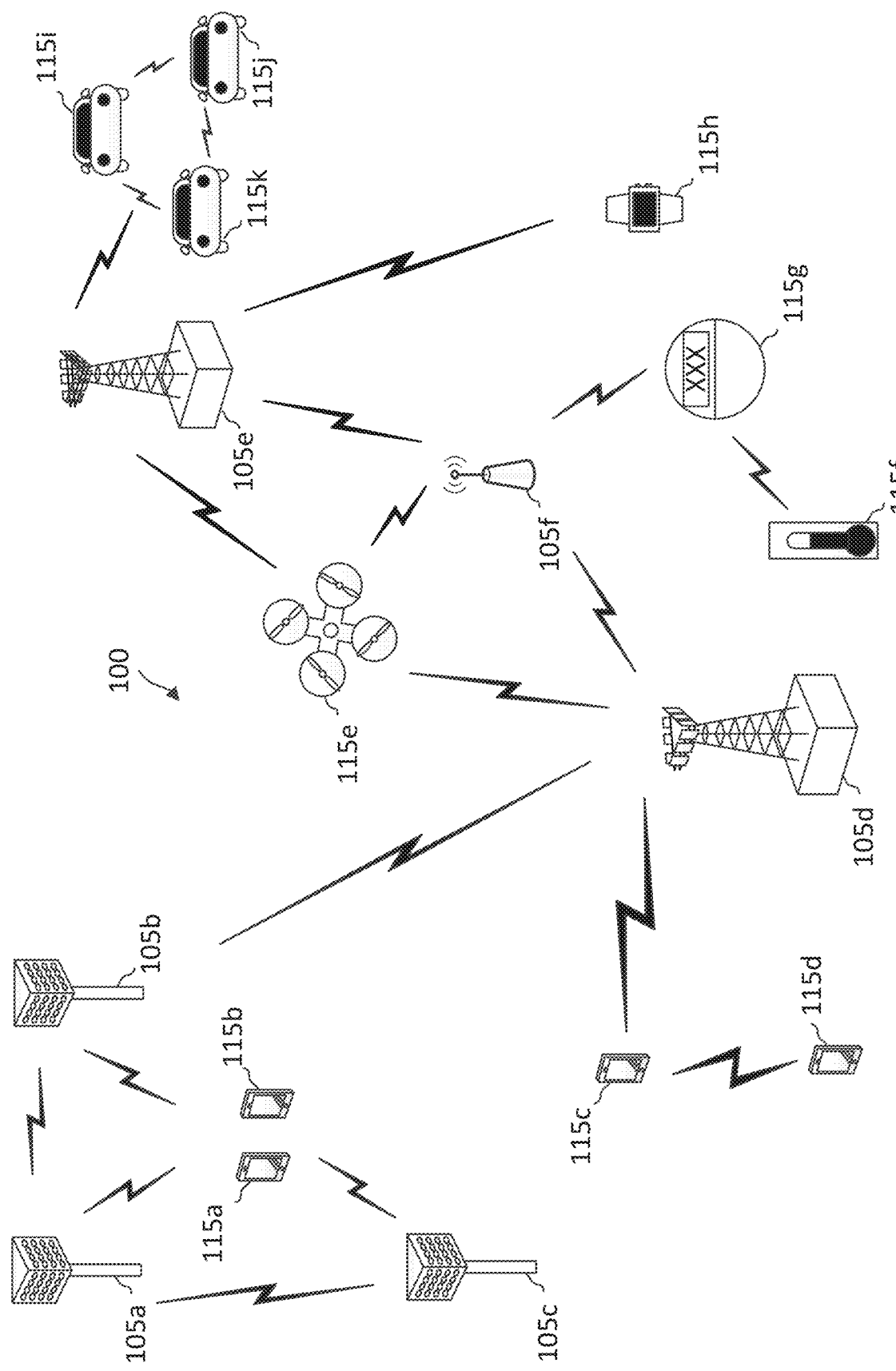
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on non-symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. In some implementations, the SCI in the PSCCH may referred to as SCI part 1 (SCI-1), and additional SCI, which may be referred to as SCI part 2 (SCI-2) may be carried in the PSSCH. The SCI-2 can include control information (e.g., transmission parameters, modulation coding scheme (MCS)) that are more specific to the data carrier in the PSSCH. Use cases for sidelink communication may include V2X, enhanced mobile broadband (eMBB), industrial IoT (IIoT), and/or NR-lite.

As used herein, the term "sidelink UE" can refer to a user equipment device performing a device-to-device communication or other types of communications with another user equipment device independent of any tunneling through the BS (e.g., gNB) and/or an associated core network. As used herein, the term "sidelink transmitting UE" can refer to a user equipment device performing a sidelink transmission operation. As used herein, the term "sidelink receiving UE" can refer to a user equipment device performing a sidelink reception operation. As used herein, the terms "sync UE", "sidelink sync UE", "anchor UE", or "sidelink anchor UE" refer to a sidelink UE transmitting an S-SSB to facilitate sidelink communications among multiple sidelink UEs (e.g., when operating in a standalone sidelink system), and the terms are interchangeable without departing from the scope of the present disclosure. As used herein, the terms "non-sync UE", "non-anchor UE", or "client" refer to a sidelink UE that relies on an anchor UE to provide sidelink system information. A sidelink UE may operate as a transmitting sidelink UE at one time and as a receiving sidelink UE at another time. A sidelink sync UE may also operate as a transmitting sidelink UE at one time and operate as a receiving sidelink UE at another time.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS (e.g., gNB) may determine a radio resource on behalf of a sidelink UE and transmit an indication of the radio resource to the sidelink UE. In some aspects, the serving BS grants a sidelink transmission with downlink control information (DCI). For this mode, however, there is significant base station involvement and is only operable when the sidelink UE is within the coverage area of the serving BS. The mode-2 RRA supports autonomous RRA that can be used for out-of-coverage sidelink UEs or partial-coverage sidelink UEs. For instance, a serving BS may configure a sidelink UE (e.g., while in coverage of the serving BS) with sidelink resource pools which may be used for sidelink when the sidelink UE is out of the coverage of the serving BS. A serving BS may also configure a sidelink UE to operate as a sidelink anchor UE to provide sidelink system information for out-of-coverage sidelink UEs to communicate sidelink communications. For instance, a sidelink anchor UE may provide sidelink system information by broadcasting sidelink-synchronization signal block (S-SSB). The S-SSB may be analogous to the SSB broadcast by a BS. For instance, an S-SSB may include synchronization signals and/or sidelink system information. Some examples of sidelink system information may include a sidelink bandwidth part (BWP) configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some implementations, an anchor UE may also schedule other sidelink UEs for communications. Thus, a sidelink anchor UE may operate as a mini-gNB facilitating and/or coordinating communications among sidelink UEs over. A sidelink channel where two UEs may communicate with each other directly may also be referred to as a PC5 interface.

In some situations, it may be desirable to utilize beamforming for sidelink communications (e.g., PSCCH and/or PSSCH communication), for example, to support higher date rates eMBB traffic over sidelink and/or when operating over a high-frequency band, such as frequency range 2 (FR2), where the pathloss may be high. Additionally, an anchor UE transmit beamformed system sidelink system information to improve coverage and/or capacity. To enable beamforming overs sidelink, a transmitting sidelink UE may sweep beams with a set of beam directions over multiple physical channels, such as a PSCCH and/or PSSCH. A receiving sidelink UE may perform beam measurements and select a preferred transmit beam direction and feedback the preferred transmit beam direction to the transmitting sidelink UE. Subsequently, the transmitting sidelink UE may transmit a long data burst to the receiving sidelink UE using the preferred transmit beam direction indicated by the receiving sidelink UE. In some implementations, a transmitting sidelink UE may sweep one beam per sidelink slot. Thus, the beam training and selection process can be long since the transmitting sidelink UE may take several sidelink slots before a corresponding receiving sidelink UE may be able to determine a preferred transmit beam direction. Additionally, a receiving sidelink UE may have multiple receive antenna panels, for example, locating at different physical corners or different physical sides of the UE. Thus, the receiving sidelink UE may receive different signal qualities using different receive antenna panels. As such, it may also be desirable for a receiving sidelink UE to select a receive antenna panel in addition to selecting a preferred transmit beam direction for an optimal reception from a corresponding transmitting sidelink UE.

The present application describes mechanisms for intra-slot transmit/receive beam selection for sidelink communications. For example, a first UE may transmit a plurality of first beam measurement signals to a second UE over a sidelink during a single slot by sweeping across a plurality of transmit beam directions in a single sidelink. In some aspects, a single slot may include about fourteen symbols. The plurality of transmit beam directions may include at least two different beam directions. The plurality of first beam measurement signal may be transmitted back-to-back in consecutive periods with no gap between the transmissions. In some aspects, the sidelink slot may include about fourteen symbols. In some aspects, each of the plurality of first beam measurement signal may include SCI-2 and a reference signal (e.g., a demodulation reference signal (DMRS) carried in a PSSCH. In some other aspects, each of the plurality of first beam measurement signals may include a channel state information-reference signal (CSI-RS). The first UE may configure and/or schedule the plurality of first beam measurement signal for transmit beam selection in a variety of ways, for example, via SCI-1 (a dynamic on-demand beam sweep trigger), a semi-persistent scheduling (SPS) configuration, a beam sweeping resource pool configuration, and/or a CSI-RS trigger.

The second UE may receive the plurality of first beam measurement signals and performs transmit beam selection based on received first beam measurement signals. For instance, the second UE may determine a receive signal measurement (e.g., reference signal received power (RSRP), signal-to-noise ratio (SNR), and/or signal-to-interference-plus-noise ratio (SINR)) for each beam measurement signal of the plurality of beam measurement signals. The second UE may select a preferred transmit beam direction from the plurality of transmit beam direction based on the receive signal measurements. In this regard, the second UE may determine the beam measurement signal that provides the highest receive signal power among the plurality of first beam measurement signals. The second UE may determine the beam direction where the beam measurement signal with the highest receive signal measurement is received as the preferred transmit beam direction. After determining the preferred transmit beam direction, the second UE may transmit an indication of the preferred transmit beam direction to the first UE. In some aspects, the second UE may transmit the indication in a PSFCH resource associated with the preferred transmit beam direction. Depending on the beam scheduling and/or configuration mechanism, the second UE may determine the PSFCH resource based on at least one of the preferred transmit beam direction, an SPS process identifier (ID) (when SPS scheduling is used), a mini-slot resource ID (when a beam sweeping specific resource pool is used), a CSI-RS resource ID (when CSI-RS trigger is used), a source ID (e.g., the first UE's ID), or a destination ID (e.g., the second UE's ID).

Upon receiving the indication of the preferred transmit beam direction, the first UE may transmit a plurality of second beam measurement signals in the preferred transmit beam direction to enable the second UE to perform receive beam selection. To perform receive beam selection, the second UE receives the plurality of second beam measurement signals by sweeping across a plurality of receive beam directions. For instance, the second UE may receive each beam measurement signal of the plurality of second beam measurement signals in a different receive beam direction. The second UE may determine a receive signal measurement (e.g., RSRPs, SNR, SINR) for each of second beam measurement signals. The second UE may select a preferred or optimal receive beam direction from the plurality of receive beam directions based on the receive signal measurements. For instance, the second UE may select the receive beam direction that provides the highest receive signal measurement as the preferred receive beam direction.

After selecting the preferred receive beam direction, the first UE and the second UE may communicate with each other using the preferred transmit beam direction and the preferred receive beam direction. For instance, the first UE may transmit data to the second UE over the sidelink using the preferred transmit beam direction, and the second UE may receive the data using the preferred receive beam direction. The first UE and the second UE may also apply channel reciprocity, for example, when operating in a FR2 band, by using the same transmit-receive beam pair for communication in a reverse link direction. For instance, the second UE may transmit data to the first UE over the sidelink in the same beam direction as the preferred receive beam direction, and the first UE may receive the data from the second UE in the same beam direction as the preferred transmit beam direction.

Aspects of the present disclosure can provide several benefits. For example, intra-slot beam sweeping where a transmitting sidelink UE sweeps across multiple transmit beams within a single sidelink slot can reduce transmit beam selection time. Additionally, when operating over a shared frequency band (e.g., in a shared spectrum or an unlicensed spectrum), back-to-back beam measurement signal transmission within a sidelink slot can avoid leaving gaps that may otherwise allow other nodes sharing the channel to gain access to the channel. Further, performing receive beam selection after transmit beam selection can further improve sidelink communication performance Transmitting multiple beam measurement signals using a preferred beam selected by a corresponding receiving sidelink UE in a single slot can also reduce receive beam selection time.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel Conversely, the LBT results in a failure when a channel reservation signal is detected in the channel A TXOP may also be referred to as channel occupancy time (COT).

Figure 2:
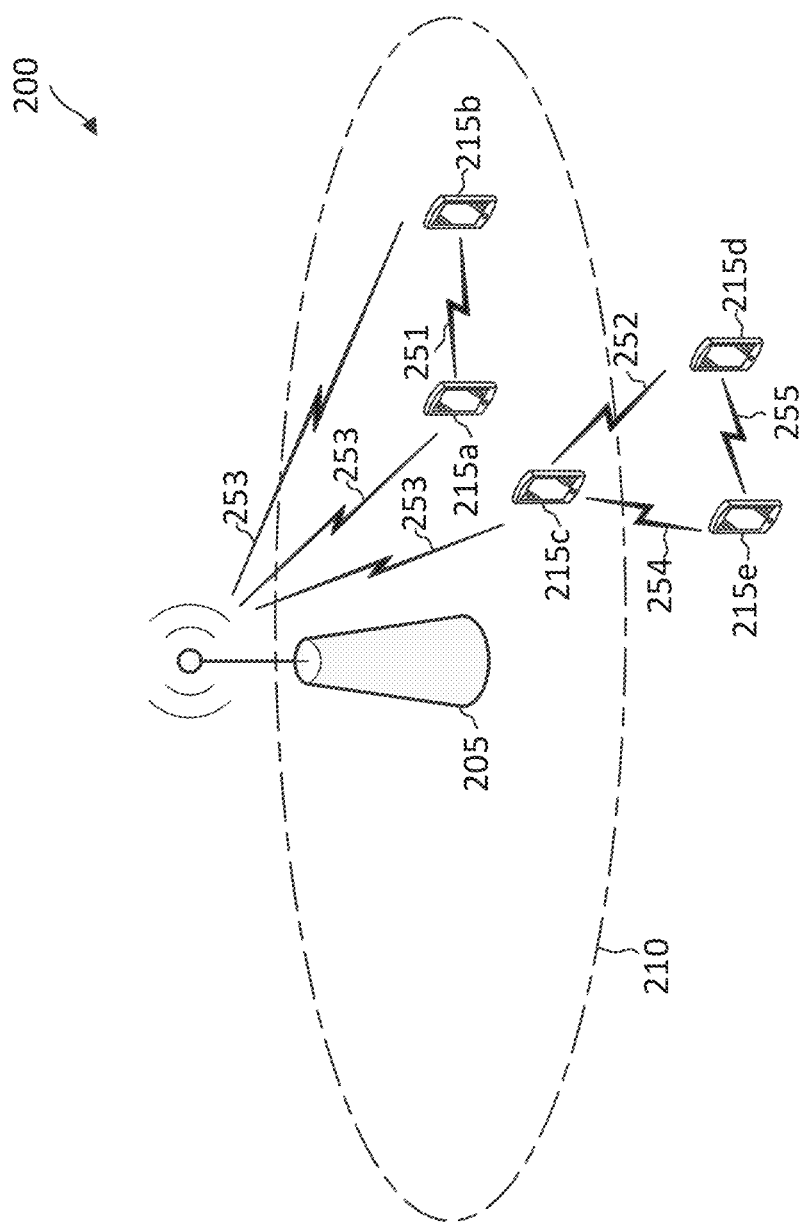
FIG. 2 illustrates a wireless communication network that provisions for sidelink communications according to some aspects of the present disclosure.

In some aspects, the network 100 may provision for sidelink communications to allow a UE 115 to communicate with another UE 115 without tunneling through a BS 105 and/or the core network as shown FIG. 2. As discussed above, sidelink communication can be communicated over a PSCCH and a PSSCH. For instance, the PSCCH may carry SCI and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a transmitting sidelink UE 115 may indicate SCI in two stages. In a first-stage SCI, the UE 115 may transmit SCI in PSCCH carrying information for resource allocation and decoding a second-stage SCI. The first-stage SCI may include at least one of a priority, PSSCH resource assignment, resource reservation period (if enabled), PSSCH DMRS pattern (if more than one pattern is configured), a second-stage SCI format (e.g., size of second-stage SCI), an amount of resources for the second-stage SCI, a number of PSSCH demodulation reference signal (DMRS) port(s), a modulation and coding scheme (MCS), etc. In a second-stage SCI, the UE 115 may transmit SCI in PSSCH carrying information for decoding the PSSCH. The second-stage SCI may include a -bit L1 destination identifier (ID), an 8-bit L1 source ID, a HARQ process ID, a new data indicator (NDI), a redundancy version (RV), etc. It should be understood that these are examples, and the first-stage SCI and/or the second-stage SCI may include or indicate additional or different information than those examples provided. Sidelink communication can also be communicated over a physical sidelink feedback control channel (PSFCH), which indicates an acknowledgement (ACK)-negative acknowledgement (NACK) for a previously transmitted PSSCH.

In some aspects, a BS 105 may configure a UE 115 to operate as a sidelink sync or anchor UE 115 to provide sidelink system information for other sidelink UEs 115, which may be out of the coverage of the BS 105, to communicate sidelink communications. The sidelink sync UE 115 may transmit the sidelink system information in the form of S-SSBs. An S-SSB may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. In some aspects, the BS 105 may configure the sidelink sync UE 115 transmit the S-SSB according to a synchronization raster defined for NR-U. In some instances, the S-SSB according to the NR-U synchronization raster may be offset from a lowest frequency of a corresponding sidelink BWP where the S-SSB is transmitted. In some other aspects, the BS 105 may transmit the S-SSB according to a synchronization raster defined for sidelink. The sidelink synchronization raster can be defined such that the S-SSB may be aligned to a lowest frequency of a corresponding sidelink BWP where the S-SSB is transmitted.

In some aspects, a transmitting sidelink UE 115 may employ beamform techniques to communicate with a receiving sidelink UE 115, for example, when communicating higher date rates eMBB traffic and/or operating over FR2, where the pathloss may be high. For instance, a transmitting sidelink UE 115 may sweep beams with a set of beam directions over multiple physical channels, such as a PSCCH and/or PSSCH. A receiving sidelink UE 115 may perform beam measurements and select a preferred transmit beam direction and feedback the preferred transmit beam direction to the transmitting sidelink UE 115. Subsequently, the transmitting sidelink UE 115 may transmit a long data burst to the receiving sidelink UE 115 using the preferred transmit beam direction indicated by the receiving sidelink UE. In some aspects, a transmitting sidelink UE 115 may sweep one beam per sidelink slot. In some aspects, a transmitting sidelink UE 115 may transmit multiple beam measurement signals by sweeping multiple beams (e.g., about 2, 3, or 4) within a single sidelink slot to reduce transmit beam selection time.

In some aspects, a receiving sidelink UE 115 can have multiple receive antenna panels, for example, locating at different physical corners or different physical sides of the UE 115. Thus, the receiving sidelink UE 115 may receive different signal qualities using different receive antenna panels. To further improve sidelink reception at the receiving sidelink UE 115, the transmitting sidelink UE 115 may transmit multiple beam measurement signals in the preferred transmit beam direction indicated by the receiving sidelink UE 115. The receiving sidelink UE 115 may select a receive antenna panel that may provide the highest receive signal quality for the selected preferred transmit beam direction. The transmitting sidelink UE 115 may facilitate transmit beam selection and/or receive beam selection at the receiving sidelink UE 115 in a variety of ways.

According to aspects of the present disclosure, the transmitting sidelink UE 115 may transmit a plurality of beam measurement signals in a plurality of transmit beam directions during a sidelink slot. In some aspects, the transmitting sidelink UE may transmit at least three beam measurement signals in a single sidelink slot. In some aspects, the beam measurement signals may include SCI-2 multiplexed with a DMRS. In some other aspects, the beam measurement signal may include CSI-RSs. The transmitting sidelink UE 115 may configure or schedule the beam measurement signals via SCI-1, a SPS configuration, and/or a CSI-RS trigger. The receiving sidelink UE 115 may select a preferred transmit beam direction from the plurality of transmit beam directions. For instance, the receiving sidelink UE 115 may determine a receive signal power (e.g., RSRP) for each of the beam measurement signals, determine a beam measurement signal with a highest receive signal power among the plurality of beam measurement signals, select a beam direction where the beam measurement signal with the highest receive signal power is received as the preferred transmit beam direction. The receiving sidelink UE 115 may feedback the preferred transmit beam direction to the transmitting sidelink UE 115.

In some aspects, the receiving sidelink UE 115 may have multiple receive antenna panels, for example, locating at different physical corners or different physical sides of the UE 115. Thus, the receiving sidelink UE 115 may receive different signal qualities using different receive antenna panels. To further improve reception at the receiving sidelink UE 115, the transmitting sidelink UE 115 may transmit a plurality of beam measurement signals in the transmit beam direction preferred by the receiving sidelink UE 115 to facilitate receive beam selection at the receiving sidelink UE 115. To speed up or reduce beam selection time, the transmitting sidelink UE 115 may transmit the beam measurement signals in a single sidelink slot for the receive beam selection. The receiving sidelink UE 115 may select a receive antenna panel or a receive beam direction that may provide the highest receive signal power with the preferred transmit beam direction. Subsequently, the transmitting sidelink UE 115 may transmit data over a sidelink to the receiving sidelink UE 115 using the preferred transmit beam direction, and the receiving sidelink UE 115 may receive the data using the selected receive antenna panel or receive beam direction. Mechanisms for performing intra-slot transmit beam selectin and/or receive beam selection for sidelink are discussed in greater detail herein.

FIG. 2 illustrates an example of a wireless communication network 200 that provisions for sidelink communications according to embodiments of the present disclosure. The network 200 may correspond to a portion of the network 100. FIG. 2 illustrates one BS 205 and five UEs 215 (shown as 215a, 215v, 215c, 215d, and 215e) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 2, 3 or more). The BS 205 and the UEs 215 may be similar to the BSs 105 and the UEs 115, respectively. The BS 205 and the UEs 215 may share the same radio frequency band for communications. In some instances, the radio frequency band may be a licensed band. In some instances, the radio frequency band may be an unlicensed band. In some instances, the radio frequency band may be a frequency range 1 (FR1) band. In some instances, the radio frequency band may be a FR2 band. In general, the radio frequency band may be at any suitable frequency.

In the network 200, some of the UEs 215 may communicate with each other in peer-to-peer communications. For example, the UE 215a may communicate with the UE 215b over a sidelink 251, the UE 215c may communicate with the UE 215d over a sidelink 252 and/or with the UE 215e over a sidelink 254, and the UE 215d may communicate with the UE 215e over a sidelink 255. The sidelinks 251, 252, 254, and 255 are unicast bidirectional links. Some of the UEs 215 may also communicate with the BS 205 in a UL direction and/or a DL direction via communication links 253. For instance, the UE 215a, 215b, and 215c are within a coverage area 210 of the BS 205, and thus may be in communication with the BS 205. The UE 215d and UE 215e are outside the coverage area 210, and thus may not be in direct communication with the BS 205. In some instances, the UE 215c may operate as a relay for the UE 215d to reach the BS 205. In some aspects, some of the UEs 215 are associated with vehicles (e.g., similar to the UEs 115*i-k*) and the communications over the sidelinks 251 and/or 252 may be C-V2X communications. C-V2X communications may refer to communications between vehicles and any other wireless communication devices in a cellular network.

In some aspects, the BS 205 may configure a sidelink UE 215 to operate as a sidelink anchor UE (e.g., the UE 215c). When operating as a sidelink sync UE, the UE 215 may broadcast S-SSBs, which may include synchronization signals (e.g., PSS and/or SSS) and sidelink system information, such as a sidelink BWP configuration, one or more sidelink transmit resource pools, and/or one or more sidelink receive resource pools, S-SSB transmission related parameters (e.g., sidelink slots configured for S-SSB transmission and/or S-SSB transmission periodicity), and/or any other configuration information related to sidelink communications. Accordingly, other UEs (e.g., the UEs 215d and 215e) that are nearby the UE 215c, but may be out of the coverage of the BS 205 may listen to and synchronize to the S-SSBs and communicate with each other based on the S-SSBs. The other UEs 215d and 215e receiving the sidelink system information from the UE 215c may be referred to as client UEs. In some aspects, anchor-to-client communications and/or client-to-client communication may employ beamforming techniques to improve performance (e.g., coverage and/or throughput capacity).

Figure 3:
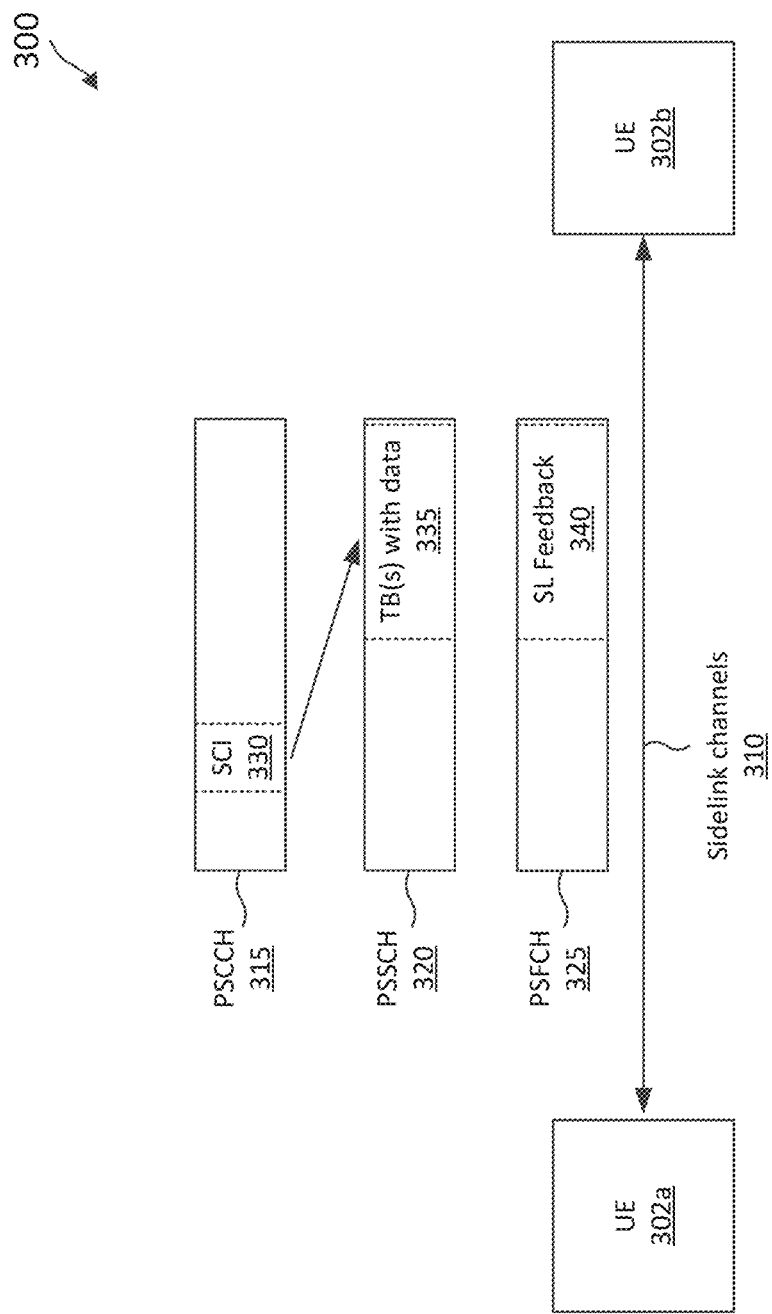
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and 215 in a network such as the networks 100 and/or 200 for sidelink communications. As shown in FIG. 3, a first UE 302a may communicate with a second UE 302b (and one or more other UEs 302)) via one or more sidelink channels 310. The UEs 302 and 302b may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 302 (e.g., UE 302a and/or UE 302b) may correspond to one or more other UEs described elsewhere herein, such as UE 115 and/or 215. In some aspects, the one or more sidelink channels 310 may use a PC5 interface and/or may operate in a high frequency band (e.g., about 3 GHz, 5 GHz, 6 GHz, or mmWave band). Additionally, or alternatively, the UEs 302 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a PSCCH 315, a PSSCH 320, and/or a PSFCH 325. The PSCCH 315 may be used to communicate control information, similar to a PDCCH and/or a PUCCH used for cellular communications with a base station 110 via an access link or an access channel. The PSSCH 320 may be used to communicate data, similar to a PDSCH and/or a PUSCH used for cellular communications with a base station 110 via an access link or an access channel. In some aspects, the PSCCH 315 may carry SCI 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., ACK/NACK information), transmit power control (TPC), a scheduling request (SR), and/or the like.

In some aspects, the one or more sidelink channels 310 may use resource pools. In some aspects, a scheduling assignment (e.g., included in SCI 330) may be transmitted in sub-channels using specific RBs across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 302 may operate using a transmission mode where resource selection and/or scheduling is performed by the UE 302 (e.g., rather than a base station 110). In some aspects, the UE 302 may perform resource selection and/or scheduling by sensing channel availability for transmissions. In some aspects, the UE 302 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 302 may perform resource selection and/or scheduling using SCI 330 received in the PSCCH 315, which may indicate occupied resources, channel parameters, and/or the like. Additionally, or alternatively, the UE 302 may perform resource selection and/or scheduling by determining a channel busy rate (CBR) associated with various sidelink channels, which may be used for rate control (e.g., by indicating a maximum number of resource blocks that the UE 302 can use for a particular set of subframes).

In the transmission mode where resource selection and/or scheduling is performed by a UE 302, the UE 302 may generate sidelink grants, and may transmit the grants in SCI 330. A sidelink grant may indicate, in some aspects, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 302 may generate a sidelink grant that indicates one or more parameters for semi-persistent scheduling (SPS), such as a periodicity of a sidelink transmission. Additionally, or alternatively, the UE 302 may generate a sidelink grant for event-driven scheduling, such as for an on-demand sidelink message.

PSFCH resources may be from a resource pool. There may be a period for PSFCH transmission in the resource pool. Supported periods may be 0, 1, 2, or 4 slots. PSFCH transmission timing may be the first slot with a PSFCH resource after a PSSCH and after a minimum time gap for PSFCH after the PSSCH. There may be a set of physical resource blocks (PRBs) and a quantity of channel state pairs defined for a PSFCH in a slot. A number of PSSCH slots may correspond to a quantity of PSFCH PRBs.

As indicated above, FIG. 3 is provided as an aspect. Other aspects may differ from what is described with respect to FIG. 3.

Figure 4A:
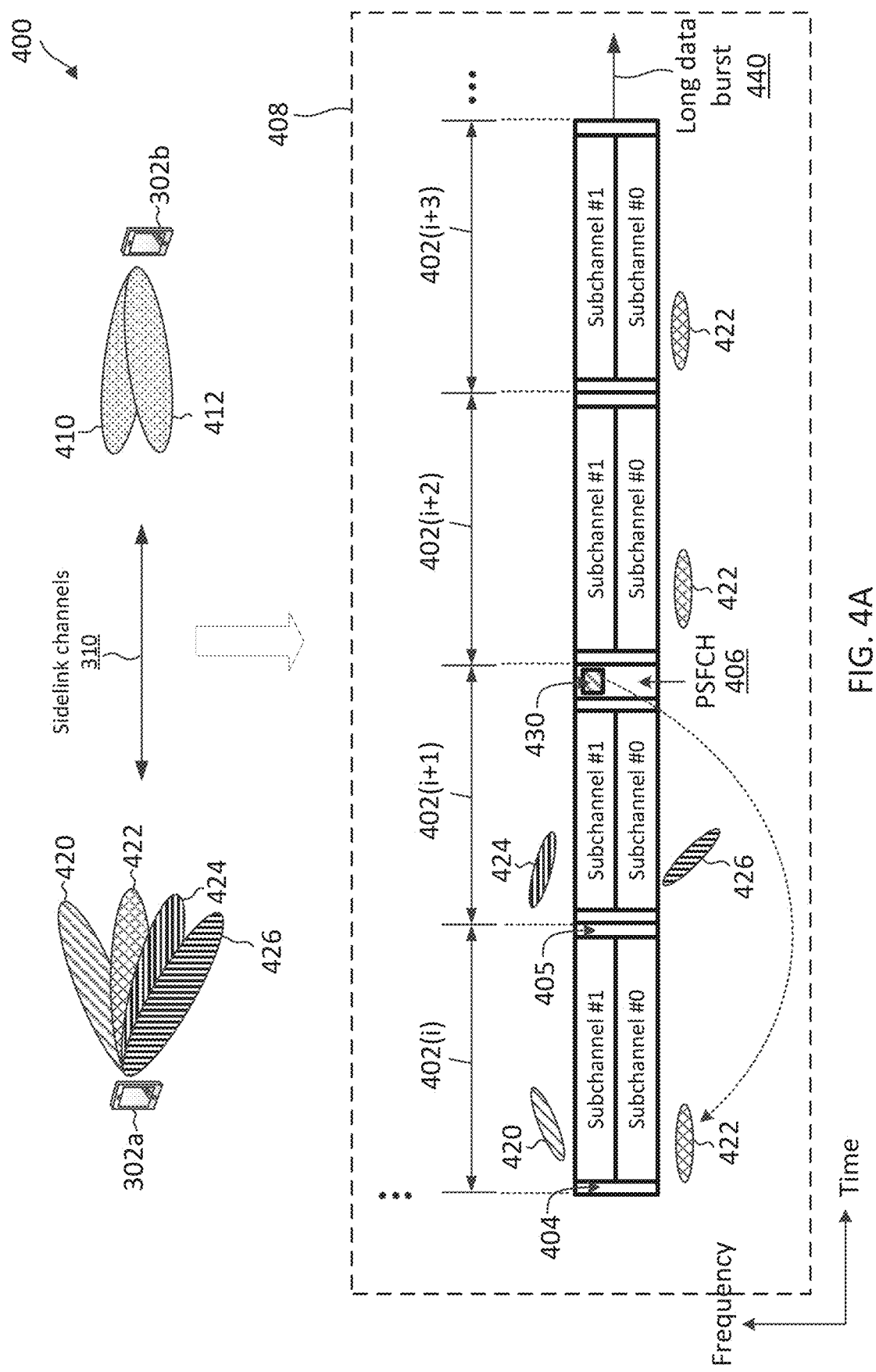
FIG. 4A is a sequence diagram illustrating a sidelink transmit/receive beam selection method according to some aspects of the present disclosure.
Figure 4B:
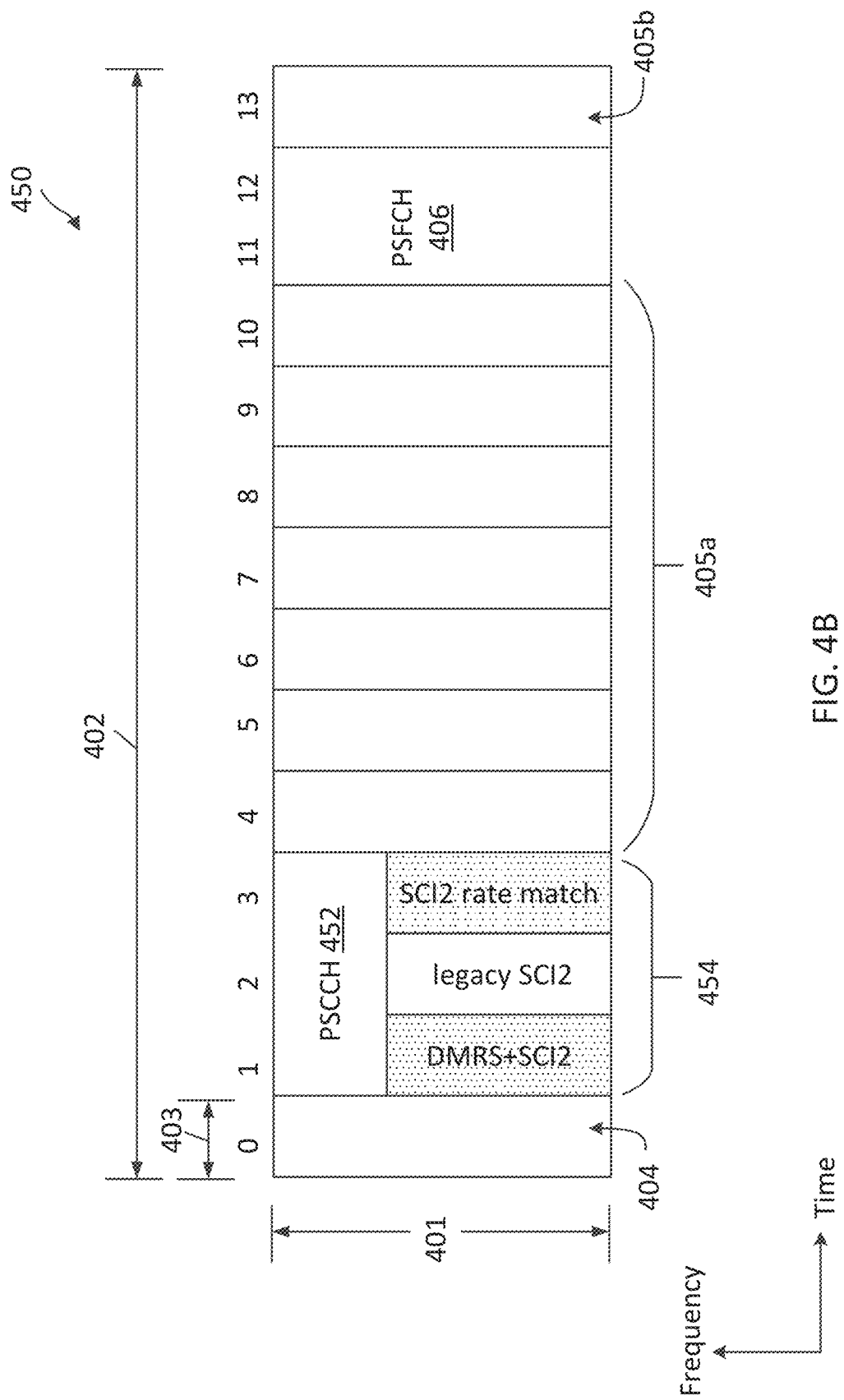
FIG. 4B illustrates a sidelink beam selection scheme according to some aspects of the present disclosure.

FIGS. 4A and 4B are discussed in relation to each other to illustrate sidelink transmit/receive beam selection. FIG. 4A illustrates a sidelink beam selection scheme 400 that employ beamforming techniques for communications according to some aspects of the present disclosure. The scheme 400 may be employed by UEs such as the UEs 115, 215, and/or 302 in a network such as the networks 100 and/or 200 for sidelink communications. In particular, sidelink UEs may employ the scheme 400 to perform transmit beam selection and/or receive beam selection prior to a sidelink data communication. The scheme 400 may be employed in conjunction with the scheme 300 for sidelink communications. In FIG. 4, the x-axis represents time in some arbitrary units, and the y-axis represents frequency in some arbitrary units.

As discussed above in FIG. 3, sidelink UEs may communicate with each other using resources from a sidelink resource pool. For instance, the UEs 302a and 302b may be configured be communicate with each other over a sidelink channel 310 in a high-frequency band, such as a sub-6 GHz band or a mmWave band. In some instances, the 302a may be an anchor UE as discussed above in relation to FIG. 2, and the UE 302b may a client UE. In some other instances, both the UEs 302a and 302b may be client UEs.

The UEs 302 may be configured with a sidelink resource pool 408. The sidelink resource pool 408 may include sidelink resources (time-frequency resources) in a plurality of sidelink slots 402 (shown as 402($i$), 402($i$+1), 402($i$+2), 402($i$+3), . . . ) across time in each subchannel within a frequency band (e.g., the high-frequency band). In some instances, the UEs 302 may receive a configuration for the resource pool 408 from a BS (e.g., the BSs 105 and/or 205) while in a coverage of the BS. In some other instances, the UEs 302 may receive a configuration for the resource pool 408 from an anchor UE (e.g., the UE 215$c$ of FIG. 2). In some aspects, each sidelink slot 402 may include about 14 OFDM symbols where a beginning symbol 404 of each slot 402 may be used for AGC training a last symbol 405 of each slot may be a gap. In some aspects, a sidelink slot 402 (e.g., the slot 402($i$+1)) may also include a PSFCH 406 (e.g., the PSFCH 325) near the end of the slot 402. The structure of sidelink slots 402 will be described more fully below with respect to FIG. 4B.

The UEs 302 may employ beamforming techniques for communications over the sidelink channel 310. Beamforming combines signals from multiple antenna elements in an antenna array, so that the combined signal level increases when several signal phases align (constructive interference). The signals from each antenna element are transmitted with a slightly different phase (delay) to produce a narrow beam directed towards the receiver. The UEs 302 may apply analog beamforming and/or digital beamforming (e.g., precoding) to scale the amplitudes and/or phases of the signals at each antenna elements to generate directional beams for communications.

In the illustrated example of FIG. 4, the UE 302$a$ may generate a set of transmit beams 420, 422, 424, and 426 for communications with the UE 302$b$. The set of transmit beams 420, 422, 424, and 426 can be predefined. Although FIG. 4 illustrates the UE 302$a$ utilizing four transmit beams, it should be understood that in other examples, the UE 302$a$ may use any suitable number of transmit beams (e.g., 2, 3, 5 or more). Each of the UE 302$a$'s transmit beams 420, 422, 424, and 426 may have a certain transmit beam characteristic (e.g., beam direction and/or beam width). For example, the transmit beams 420, 422, 424, and 426 may have different beam directions as shown. Additionally or alternatively, the transmit beams 420, 422, 424, and 426 may have different beam widths. The UE 302$a$ may transmit beam reference signals by sweeping across the set of transmit beams 420, 422, 424, and 426.

In some aspects, the UE 302$a$ may transmit multiple PSCCH/PSSCHs with different beams in different slots. When operating over an FR1 band, the UE 302$a$ may use different transmit beams for transmissions in different subchannels. For instance, for subchannel 0, the UE 302$a$ transmits a beam measurement signal using the beam 422 during the slot 402($i$) and switch to transmit a beam measurement signal using the beam 426 in a next slot 402($i$+1). For subchannel 1, the UE 302$a$ transmits a beam measurement signal using the beam 420 during the slot 402($i$) and switch to transmit a beam measurement signal using the beam 424 in a next slot 402($i$+1). In some aspects, the UE 302$a$ may transmit the beam measurement signal at a beginning portion of a sidelink slot 402. In some aspects, the beam reference signals may include be SCI-2 and/or DMRS(s) transmitted in a PSSCH show in FIG. 4B.

To communicate with the UE 302$a$, the UE 302$b$ may also generate a set of receive beams 410 and 412. The set of receive beams 410 and 412 can be predefined. Although FIG. 4 illustrates the UE 302$b$ utilizing two receive beams, it should be understood that in other examples, the UE 302$b$ may use any suitable number of transmit beams (e.g., 3, 4 or more). Each of the UE 302$b$'s receive beams 410 and 412 may have a certain receive beam characteristic (e.g., beam direction and/or beam width). For example, the receive beams 410 and 412 have different beam directions as shown. Additionally or alternatively, the receive beams 410 and 412 may have different beam widths.

In some aspects, the UE 302$b$ may use the same receive beam when performing a transmit beam selection and may further perform a receive beam selection after the transmit beam selection by sweeping through the set of receive beams. For instance, during the slots 402($i$) and slot 402($i$+1), the UE 302$b$ may utilize the receive beam 410 for reception while the UE 302$a$ sweep across the set of transmit beams 420, 422, 424, and 426. The UE 302$b$ may determine a receive signal measurement (e.g., RSRP, SNR, SINR) for each of the received beam measurement signals. The UE 302$b$ may select a best beam from the set of transmit beams 420, 422, 424, and 426 based on the receive signal measurements. In this regard, the UE 302 may determine the beam measurement signal that provides the highest receive signal power among the plurality of beam measurement signals. The UE 302$b$ may determine the beam direction where the beam measurement signal with the highest receive signal measurement is receive as the preferred transmit beam direction. The UE 302$b$ may indicate the preferred transmit beam direction to the UE 302$a$.

As an example, the UE 302$b$ may determine that the transmit beam 422 is the strongest beam (providing the highest receive signal measurement). As such, the UE 302$b$ transmits a preferred beam indication 430 (e.g., a feedback) in a PSFCH 406 to indicate the preferred transmit beam 422 to the UE 302$a$. In some aspects, the UE 302$a$ may configure the UE 302$b$ with a feedback resource in the PSFCH 406 for reporting the preferred transmit beam direction. In some other aspects, the UE 302$a$ may configure the 302$b$ with rules (a beam selection association rule) for determining a feedback resource in the PSFCH 406 for reporting the preferred transmit beam direction. For instance, each beam 420, 422, 424, and 426 may be associated with an orthogonal resource in the PSFCH 406. Accordingly, the UE 302$b$ may transmit the preferred transmit beam indication 430 in a PSFCH resource associated with the transit beam 422. The UE 302$a$ may detect the indication 430 from the UE 302$b$ in the PSFCH resource. The UE 302$a$ may determine the preferred transmit beam for the UE 302$b$ is the transmit beam 422 based on an association between the transmit beam 422 and the PSFCH resource where the indication 430 is received.

In some aspects, receive beam selection at a receiving sidelink UE may also be useful, for example, when the UE 302$a$ and UE 302$b$ communicate with each other over a FR2 band. For instance, after receiving the preferred beam indication 430, the UE 302$a$ may transmit a plurality of beam measurement signals using the preferred transmit beam direction indicated by the UE 302$b$ so that the UE 302$b$ may select a best receive beam to communicate with the UE 302$a$. As shown, the UE 302$a$ transmits a first beam measurement signal in subchannel 0 using the transmit beam 422 (indicated by the UE 302) during a next slot 402($i$+2) and a second beam measurement signal in subchannel 0 using the same transmit beam 422 during a next slot 402($i$+3). In some aspects, the UE 302$a$ may apply the preferred beam 422 for a predetermined number of slots 402 with or without data. For instance, the UE 302$a$ may transmit multiple SCI-2 (each in one beam measurement signal) using the preferred beam 422. In some aspects, the UE 302a may transmit a request to trigger the UE 302b to perform a receive beam selection. For instance, the UE 302a may include a receive beam selection trigger or instruction in SCI-2.

In some aspects, the UE 302b may perform a receive beam selection based on the receive beam selection trigger. The UE 302b may sweep across the set of receive beams 410 and 412 to determine a best receive beam for receiving signals from the selected preferred transmit beam direction. For instance, the UE 302b may receive the first beam measurement signal in the slot 402(i+2) using the receive beam 410 and receive the second beam measurement signal in the slot 402(i+3) using the receive beam 412. The UE 302b may determine a receive signal measurement (e.g., RSRPs, SNR, SINR) for each of the first and second beam measurement signals. The UE 302b may select a best receive beam from the set of receive beams 410 and 412 based on the receive signal measurements. The UE 302b may select the receive beam that provides the highest receive signal measurement. For instance, the first beam measurement signal received using the receive beam 412 provides a higher receive signal power than the second beam measurement signal received with the receive beam 410. Thus, the UE 302b may select the receive beam 412 as the preferred receive beam for communicating with the UE 302a. The UE 302b may subsequently use the receive beam 412 for communicating with the UE 302a. It may not be necessary for the UE 302b to report the preferred receive beam 412 to the UE 302a as the receive beam selection and/or configuration are local to the UE 302b.

After selecting the preferred transmit beam 422 and the preferred receive beam 412, the UE 302b may receive data (e.g., PSSCH data 335) from the UE 302a over the sidelink channel 310, for example, using sidelink resource in one or more subsequent slots 402. For instance, the transmitting sidelink UE 302a may transmit a long data bursts 440 (PSSCH data) using the preferred transmit beam 422 and the receiving sidelink UE 302b may receive the long data burst 440 using the preferred receive beam 412.

In some aspects, in FR1 and/or FR2, the UE 302b may also use the best receive beam 412 as the transmit beam for a reverse link transmission to the UE 302a based on channel reciprocity. Similarly, the UE 302b may use the transmit beam 422 as the receive beam for a reverse link reception from the UE 302b. For instance, the UE 302b may transmit data (PSSCH data) to the UE 302a using a transmit beam in the same beam direction as the best receive beam 412, and the UE 302a may receive the data from the UE 302a using a receive beam in the beam direction as the transmit beam 422 preferred by the UE 302b.

FIG. 4B illustrates a sidelink slot resource structure 450 according to some embodiments of the present disclosure. The sidelink slot structure 450 provides a more detailed view of a sidelink slot 402 for beam sweeping as discussed above in FIG. 4A. In FIG. 4B, the x-axis represents time in some arbitrary units, and the y-axis represents frequency in some arbitrary units. For simplicity of illustration and discussion, FIG. 4B illustrates a sidelink slot resource for one subchannel 401 (e.g., subchannel 0 of FIG. 4A). The same resource structure 450 may be applied to each subchannel in the resource pool 408.

For instance, the slot 402 may include about 14 symbols 403 (e.g., OFDM symbols) indexed from 0 to 13. The slot 402 may include an AGC symbol 404 at symbol 0, a PSCCH 452 multiplexed with a PSSCH 454 at symbols 1-3, a PSFCH 406 at symbols 11 and 12, and gaps 405 at symbols 4-10 (shown as 405a) and at symbol 14 (shown as 405b).

The PSCCH 452, the PSSCH 454, and the PSFCH 406 may be similar to the PSCCH 315, the PSSCH 320, and the PSFCH 325, respectively. Although FIG. 4B illustrates the sidelink slot 402 including 14 symbols 403 (e.g., OFDM symbols), it should be understood that in other examples a sidelink slot can include any suitable number of symbols and can vary depending on the subcarrier spacing.

In some aspects, the communications on the PSSCH 454 may contain SCI-2 with no data. Thus, PSSCH 454 may be reduced in length, such as to a last symbol (e.g., symbol 3 as shown) containing SCI-2 or to a last symbol of PSSCH 454. The PSSCH 454 may be referred to as a shortened PSSCH. In some aspects, a transmitting sidelink UE (e.g., the UE 302a) may transmit a DMRS along with the SCI-2. The SCI-2 can be rate matched around the resource elements (REs) or frequency subcarriers that carry the DMRS. A corresponding receiving sidelink UE or beam measurement UE (e.g., the UE 302b) may perform channel estimation based on the DMRS. In some aspects, when the UE 302a transmits beam measurement signals for sweeping through the set of beams 420, 422, 424, and 426, the UE 302a may transmit each beam reference signal using a shortened PSSCH 454. Each beam reference signal may include legacy SCI-2 (that are used or carrying sidelink data transmission parameters) and/or enhanced SCI-2 including information specific for transmit and/or receive beam selection. The enhanced SCI-2 is shown by the pattern-filled box. The enhanced SCI-2 can be referred to as beam sweeping SCI-2. The legacy SCI-2 can be transmitted at symbol 2. The beam measurement signal may also include a DMRS at symbol 1 and the beam sweeping SCI-2 can be at symbols 1 and 3 with rate-matching around the DMRS at symbol 1. In some aspects, the beam sweeping SCI-2 may include information for activating a corresponding beam measurement UE to perform beam selection and preferred beam reporting. In some aspects, the beam sweeping SCI-2 can include PSFCH mapping rules for the beam measurement UE to identify a resource within the PSFCH for preferred transmit beam reporting.

In some aspects, the AGC symbol 404 is a repetition of symbol 1. In other words, the same signal as symbol 1 is transmitted in symbol 0. The AGC symbol 404 can facilitate AGC training at the corresponding receiving sidelink UE prior to receiving and decoding the remaining symbols in the slot 402. The PSFCH 406 may be used by the receiving sidelink UE to transmit a feedback to the transmitting sidelink UE. The feedback may include a preferred transmit beam indication as discussed above in relation to FIG. 4A. In some other instances, the feedback can include an ACK/NACK if the PSSCH in the slot 402 carries data as discussed above in relation to FIG. 3.

As can be observed, when a transmitting sidelink UE performs beam sweeping with the shortened PSSCH 454, there is a gap 405b from symbols 4-10 in the slot 402. FIGS. 5-8 illustrate various mechanisms for on-demand intra-slot beam sweeping by utilizing gap period(s) in a sidelink slot 402 to sweep across multiple beams (e.g., the beams 420, 422, 424, and 426) within a single sidelink slot 402. The intra-slot beam sweeping enables a corresponding receiving sidelink UE to determine measurements for multiple beam directions in a single slot 402, instead of in multiple slots 402 as shown in FIG. 4A. Accordingly, transmit beam selection and/or receive beam selection timing can be reduced.

Figure 5:
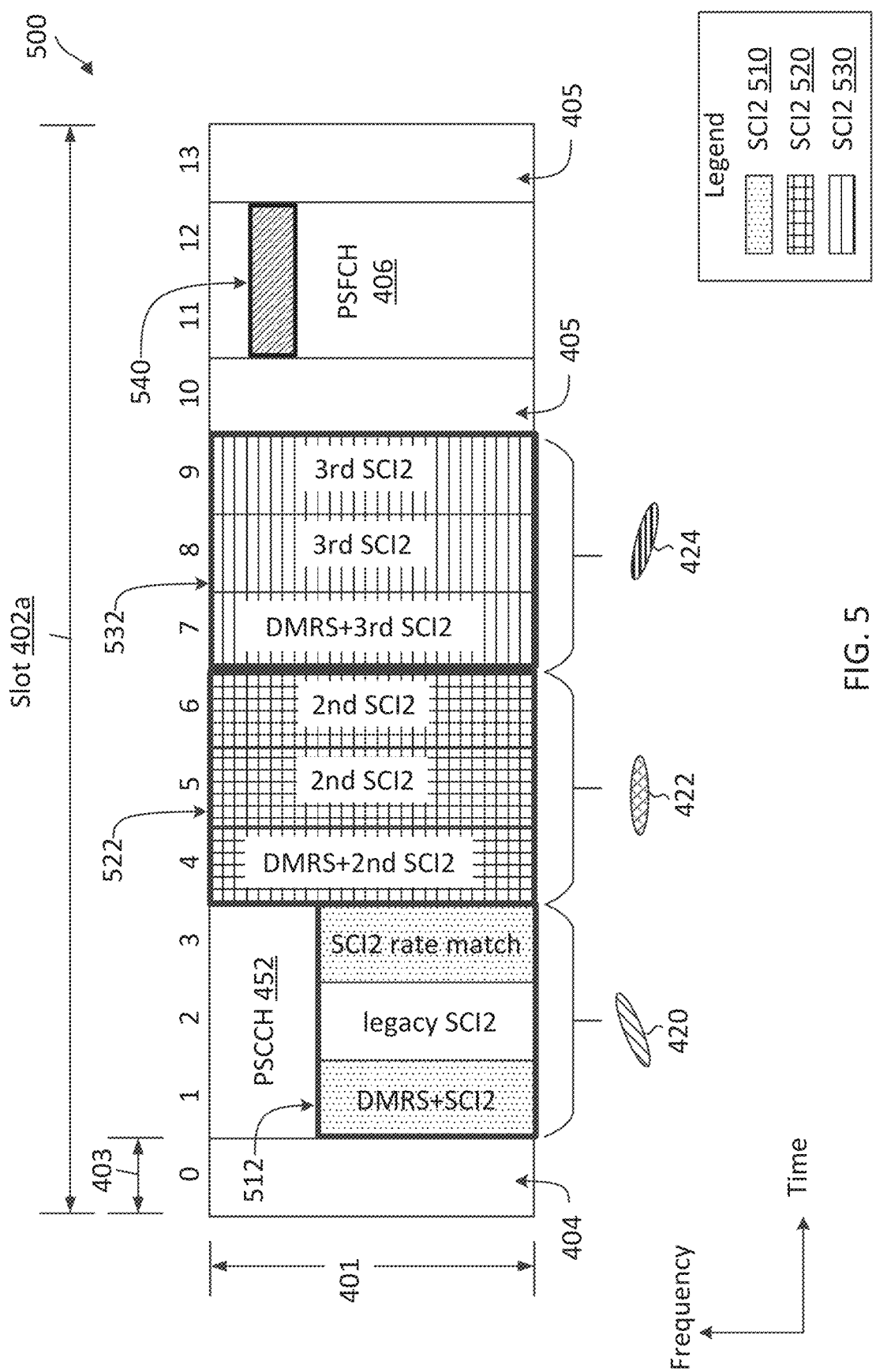
FIG. 5 illustrates an intra-slot sidelink beam selection scheme according to some aspects of the present disclosure.

FIG. 5 illustrates an intra-slot sidelink beam selection scheme 500 according to some aspects of the present disclosure. The scheme 500 may be employed by UEs such as the UEs 115, 215, and/or 302 in a network such as the networks 100 and/or 200 for sidelink communications. In particular, sidelink UEs may employ the scheme 500 to perform transmit beam selection, for example, prior to a receive beam selection and/or a sidelink data communication. In FIG. 5, the x-axis represents time in some arbitrary units, and the y-axis represents frequency in some arbitrary units. The scheme 500 is illustrated using the same sidelink slot resource structure (including 14 symbols with an AGC symbol 404 at symbol 1 and a gap at symbol 13) and the same set of transmit beams (the transmit beams 420, 422, 424, and 426) at a transmitting sidelink UE (e.g., the UE 302a) as in FIG. 4A-4B, and may use the same reference numerals as in FIGS. 4A-4B for simplicity's sake.

In the scheme 500, a UE 302a may transmit a plurality of beam measurement signals in a plurality of beam directions (e.g., including at least 2 different beam directions) during a sidelink slot, where each beam measurement signal of the plurality of beam measurement signals may include SCI (e.g., beam sweeping SCI-2). The UE 302a may transmit each beam measurement signal of the plurality of beam measurement signals in one of the plurality of beam directions, for example, in consecutive time periods within the slot with back-to-back beam measurement signal transmissions. For instance, the UE 302a may transmit a first beam measurement signal 512 including beam sweeping SCI-2 510 during a first period (in symbols 1-3) of a slot 402 (shown 402a) in a PSSCH using the beam 420. The UE 302a may transmit a second beam measurement signal 522 including beam sweeping SCI-2 520 during a second period (in symbols 4-6) of the slot 402a in the PSSCH using the beam 422. The UE 302a may transmit a third beam measurement signal 532 including beam sweeping SCI-2 530 during a third period (in symbols 7-8) of the slot 402a in a PSSCH using the beam 424. Each beam measurement signal 512, 522, or 532 may include a DMRS. In each beam measurement signal 512, 522, or 532, the corresponding SCI-2 510, 520, or 530 may rate-match around the DMRS. In some aspects, the first beam measurement signal 512 may be multiplexed with a PSCCH 452 in the first period and may further include legacy SCI-2. Although FIG. 5 illustrates each beam measurement signal occupying three symbols 403, it should be understood that in other examples a beam measurement signal may occupy a greater number of symbols or a less number of symbols 403.

In some aspects, the SCI-2 510, the SCI-2 520, and the SCI-530 may include the same content, for example, including information for activating a corresponding UE 302b to perform beam selection and preferred beam reporting. However, the resource mapping for the SCI-2 510, the SCI-2 520, and the SCI-530 can be different. For instance, the SCI-2 510 may occupy part of the subchannel 401 (due to the multiplexing with the PSCCH 452) during symbols 1 and 2 with rate-matching around DMRS at symbol 1. The SCI-2 520 may occupy the entire subchannel 401 at symbols 5 and 6 with rate matching around DMRS at symbol 4 since there is no PSCCH in symbols 5 and 6. Similarly, the SCI-2 530 may occupy the entire subchannel 401 at symbols 8 and 9 with rate matching around DMRS at symbol 7 since there is no PSCCH in symbols 7-9. Although FIG. 5 illustrates the transmitting sidelink UE 302a transmitting each beam measurement signal (including SCI-2 and associated DMRS) in a different beam direction in the slot 402a, it should be understood that in other examples the transmitting sidelink UE may transmit two beam measurement signals (e.g., the beam measurement signal 512 and 522) within a slot in the same beam direction (e.g., the beam 420, 422, 424, or 426).

In some aspects, the transmitting sidelink UE 302a may transmit SCI-1 in the PSCCH 452 (during symbols 1-3) indicating beam sweeping scheduling information for the slot 402a. For instance, the SCI-1 may indicate that the first beam measurement signal 512 (including SCI-2 510) is scheduled for symbols 1-3, the second beam measurement signal 522 (including SCI-2 520) is scheduled for symbols 4-6, and the third beam measurement signal 532 (including SCI-2 530) is scheduled for symbols 7-8. In some aspects, the UE 302a may transmit the SCI-1 in the PSCCH 452 using a wide beam, for example, covering at least all the beam directions of the beams 420, 422, and 424 that are used in the slot 402a. The wide beam transmission of the SCI-1 allows for a wide coverage. Additionally, SCI-1 may usually have a better link performance than SCI-2 and/or sidelink data as SCI-1 are transmitted using a lower MCS.

In some aspects, transmitting sidelink UE 302a may perform transmit beam sweeping per slot and per subchannel. For instance, the UE 302a may transmit multiple beam measurement signals similar to the beam measurement signals 512, 522, and 532 in each subchannel 401 within a single slot 402a period. The UE 302a may transmit beam measurement signals in different subchannels using different beams. For instance, for each subchannel 401, the UE 302a may sweep three beams in a single slot 402a as shown in FIG. 5. In some instances, the UE 302a may sweep through the same set of beams in each subchannel in the same order or in different order. In some other instances, the UE 302a may sweep through different set of beams (e.g., different combination of beams) in different subchannels.

In some aspects, a receiving sidelink UE or beam measurement UE 302b may perform beam measurements during the slot 402a. For instance, the UE 302b may configure its frontend (e.g., the RF unit XX and or antenna XX) to receive signal using the receive beam 410. The UE 302 may receive each of the beam measurement signals 512, 522, and 532 using the beam 410 and determine a receive signal measurement (e.g., RSRPs, SNRs, SINRs) for each beam measurement signal 512, 522, and 532. In some aspects, the receive signal measurement may be based on the DMRS in each corresponding beam measurement signal 512, 522, and 532. The UE 302 may select a strongest (preferred) beam from the beams 420, 422, and 424 by selecting a beam direction where the beam measurement signal with the highest receive signal measurement (e.g., a highest RSRP, a highest SNR, and/or a highest SINR) is received. The UE 302b may transmit an indication 540 indicating the preferred beam direction in the PSFCH 406, for example, using a resource in the PSFCH 406 associated with the preferred beam direction. There may be a gap symbol 405 before the PSFCH 406, for example, to allow time for transmit-receive switching at the UE 302a and/or the UE 302b. In some aspects, the UE 302b may identify a resource in the PSFCH 406 based on a certain mapping rule that maps each of the beams (e.g., 420, 422, and 424) to a resource (e.g., time-frequency resource) in the PSFCH 406.

In some aspects, the UE 320b may perform SCI-2 decoding for each beam measurement signal 512, 522, 532. However, in some instances, the UE 302b may terminate SCI-2 decoding early, for example, to conserve power at the UE 302b. For instance, the UE 302b may determine whether a receive signal measurement satisfies a threshold (e.g., exceeding the threshold). If the UE 302b determines that the receive signal measurement satisfies the threshold, the UE 302b may refrain from monitoring and receiving a further beam measurement signal in the slot 402a. In other words, the UE 302b may not necessarily monitor and measure all beam measurement signals in the slot 402a. The UE 302b may stop beam measurement signal monitoring and/or measurement if a sufficiently good beam from the UE 302a is detected. As an example, the UE 302b may determine that the receive signal measurement for the beam measurement signal 512 satisfies the threshold. Accordingly, the UE 302b may not proceed to monitor the remaining symbols 403 in the slot 402a for a further beam measurement signal (e.g., the beam measurement signals 522 and 523).

As discussed above, the UE 302a may sweep through a set of transmit beams in each subchannel 401 within a slot 402a duration. As such, the UE 302b may decode multiple beam sweeping SCI-2 in each subchannel 401. The UE 302b may successfully decode multiple SCI-2 within a slot 402a in each subchannel. The UE 302b may select a preferred beam by selecting a beam direction where the beam measurement signal with the highest receive signal measurement (e.g., a highest RSRP, SNRs, SINRs) is received. After determining a preferred beam or beam direction, the UE 302b may transmit an indication indicating the preferred beam direction in the PSFCH 406, for example, using a resource in the PSFCH 406 associated with the preferred beam direction and/or subchannel. Accordingly, the UE 302a may detect the indication 540 from the UE 302b in the PSFCH resource. The UE 302a may determine the preferred transmit beam for the UE 302b is the transmit beam 422 based on an association between the transmit beam 422 and the PSFCH resource where the indication 540 is received.

As can be observed from FIG. 5, multiple beam measurement may be transmitted back-to-back (in consecutive time periods with no gap between the periods) within a single slot 402a to allow for intra-slot beam sweeping, which reduces transmit beam selection time. Additionally, on-demand intra-slot beam sweeping and/or reporting can be activated via the SCI-2 510, 520, and 530.

In some aspects, after the UE 302a receives the preferred beam indication 540, the UE 302a may transmit multiple beam measurement signals in a subsequent slot 402a using the beam direction indicated by the indication 540 and instruct the UE 302b to perform a receive beam selection as in the scheme 400 discussed above with respect to FIG. 4A. For instance, in a subsequent slot 402a, the UE 302a may transmit a first beam measurement signal (e.g., the beam measurement signals 512, 522, and 532) at symbols 1-3, a second beam measurement signal at symbols 4-6, and a third beam measurement signal at symbols 7-9 in the preferred beam direction. The UE 302b may sweep across a set of receive beams (e.g., the beams 410 and 412) to receive each beam measurement signal using a different receive beam, determine a receive signal measurement for each receive beam, and select a preferred receive beam based on a highest receive signal measurement among the receive signal measurements.

Figure 6:
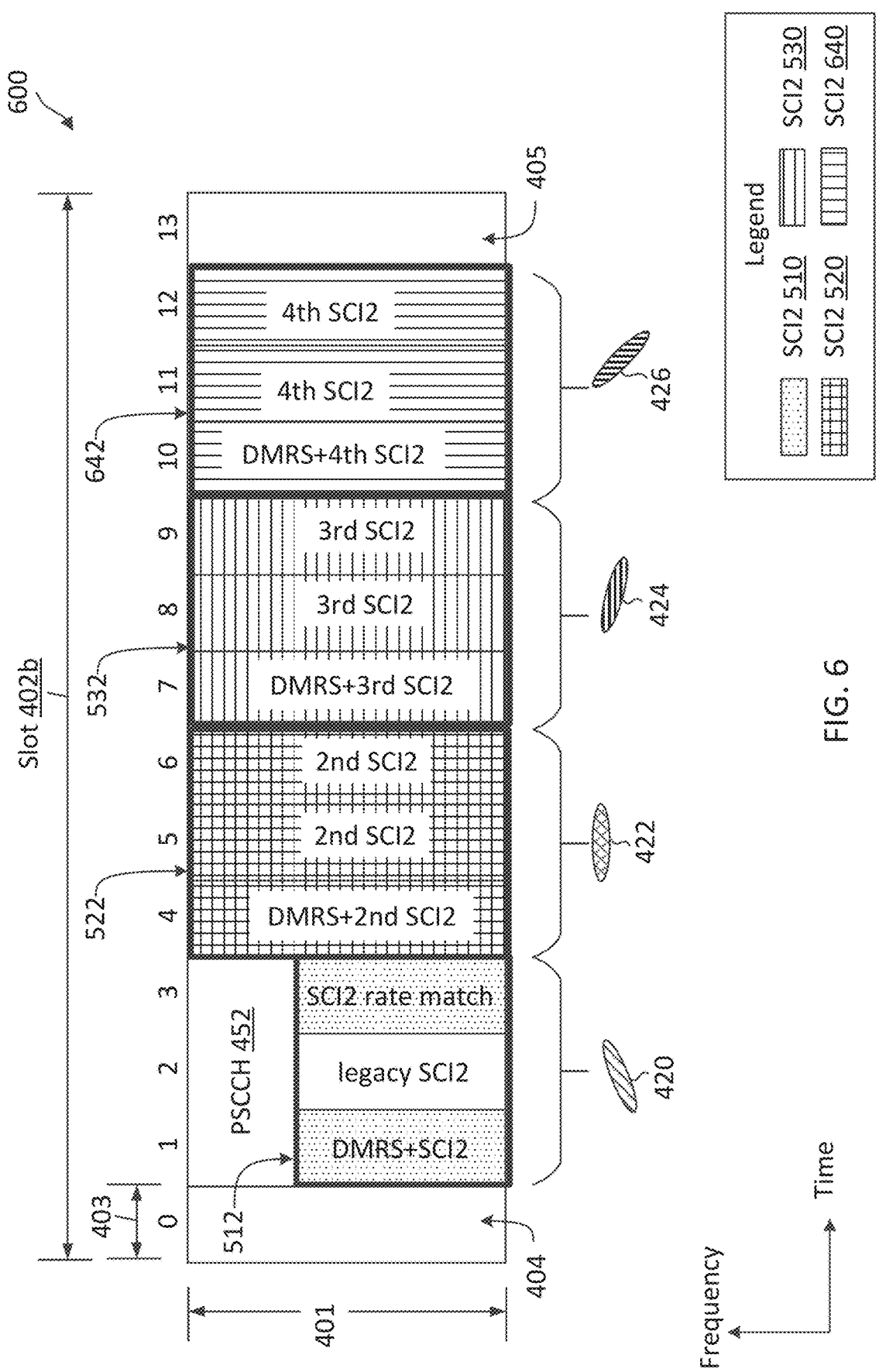
FIG. 6 illustrates an intra-slot sidelink beam selection scheme according to some aspects of the present disclosure.

FIG. 6 illustrates an intra-slot sidelink beam selection scheme 600 according to some aspects of the present disclosure. The scheme 600 may be employed by UEs such as the UEs 115, 215, and/or 302 in a network such as the networks 100 and/or 200 for sidelink communications. In particular, sidelink UEs may employ the scheme 600 to perform transmit beam selection, for example, prior to a receive beam selection and/or a sidelink data communication. In FIG. 6, the x-axis represents time in some arbitrary units, and the y-axis represents frequency in some arbitrary units. The scheme 600 is illustrated using the same sidelink slot resource structure (including 14 symbols with an AGC symbol 404 at symbol 1 and a gap at symbol 13) and the same set of transmit beams (the transmit beams 420, 422, 424, and 426) at a transmitting sidelink UE (e.g., the UE 302a) as in FIG. 4A-4B, and may use the same reference numerals as in FIGS. 4A-4B for simplicity's sake. The scheme 600 is substantially similar to the scheme 500. However, the scheme 600 illustrates transmit beam sweeping in a slot 402 (shown as 402b) without a PSFCH (e.g., the PSFCH 406).

For instance, the UE 302a may transmit a beam measurement signal 512 (including SCI-2 510) at symbols 1-3 using the beam 420, a second beam measurement signal 522 (including SCI-2 520) at symbols 4-6 using the beam 422, and a third beam measurement signal 532 (including SCI-2 530) at symbols 7-8 using the beam 424. Since there is no PSFCH in the slot 402b, the UE 302a may transmit a fourth beam measurement signal 642 (including SCI-2 640) at symbols 9-11 using the beam 426. The beam measurement signal 642 may also include a DMRS at symbol 10 and the SCI-2 640 can be rate-matched around the DMRS. In other words, the UE 302a may sweep across four transmit beams in a single slot 402b instead of 3 as in the scheme 500. The SCI-2 640 may be substantially similar to the SCI-2 510, 520, and 530. The UE 302a may transmit SCI-1 in the PSCCH 452 to schedule the beam measurement signals 512, 522, 532, and 542.

Similar to the schemes 400 and 500, the UE 302b may receive each of the beam measurement signals 512, 522, 532, and 642. The UE 302b may determine a receive signal measurement (e.g., RSRPs, SNRs, SINRs) for each beam measurement signal 512, 522, 532, and 642. The UE 302 may select a strongest (preferred) beam from the beams 420, 422, 424, and 426 by selecting a beam direction where the beam measurement signal with the highest receive signal measurement (e.g., a highest RSRP, a highest SNR, and/or a highest SINR) is received.

In some aspects, the UE 302a may utilize a sequence of slots 402, for example, the slot 402b (shown in FIG. 6 without a PSFCH) followed by the slot 402a (shown in FIG. 5 with a PSFCH), and thus the UE 302b may report the preferred transmit beam direction in the PSFCH of the slot 402a. In general, the UE 302b may report a preferred transmit beam in the same slot as where the preferred transmit beam was received or in a different slot than where the preferred transmit beam is received.

While the schemes 400 and 500 can allow a pair of transmitting sidelink UE and receiving sidelink UE to select a transmit-receive beam pair for sidelink data communications, in some scenarios, for example, in an FR1 band, initial transmit beam establishment and/or re-establishment with wide-beam PSCCH transmissions may not perform well. As such, it may be necessary for the UE 302a to apply beamforming for PSCCH transmissions in addition to PSSCH transmissions. Thus, it may not be desirable to rely on SCI-1 to schedule on-demand intra-slot beam sweeping as discussed in the schemes 500 and 600. In order to support beamformed PSCCH transmission, SPS-based beam sweeping scheduling as discussed in FIG. 7 below may be more suitable.

Figure 7:
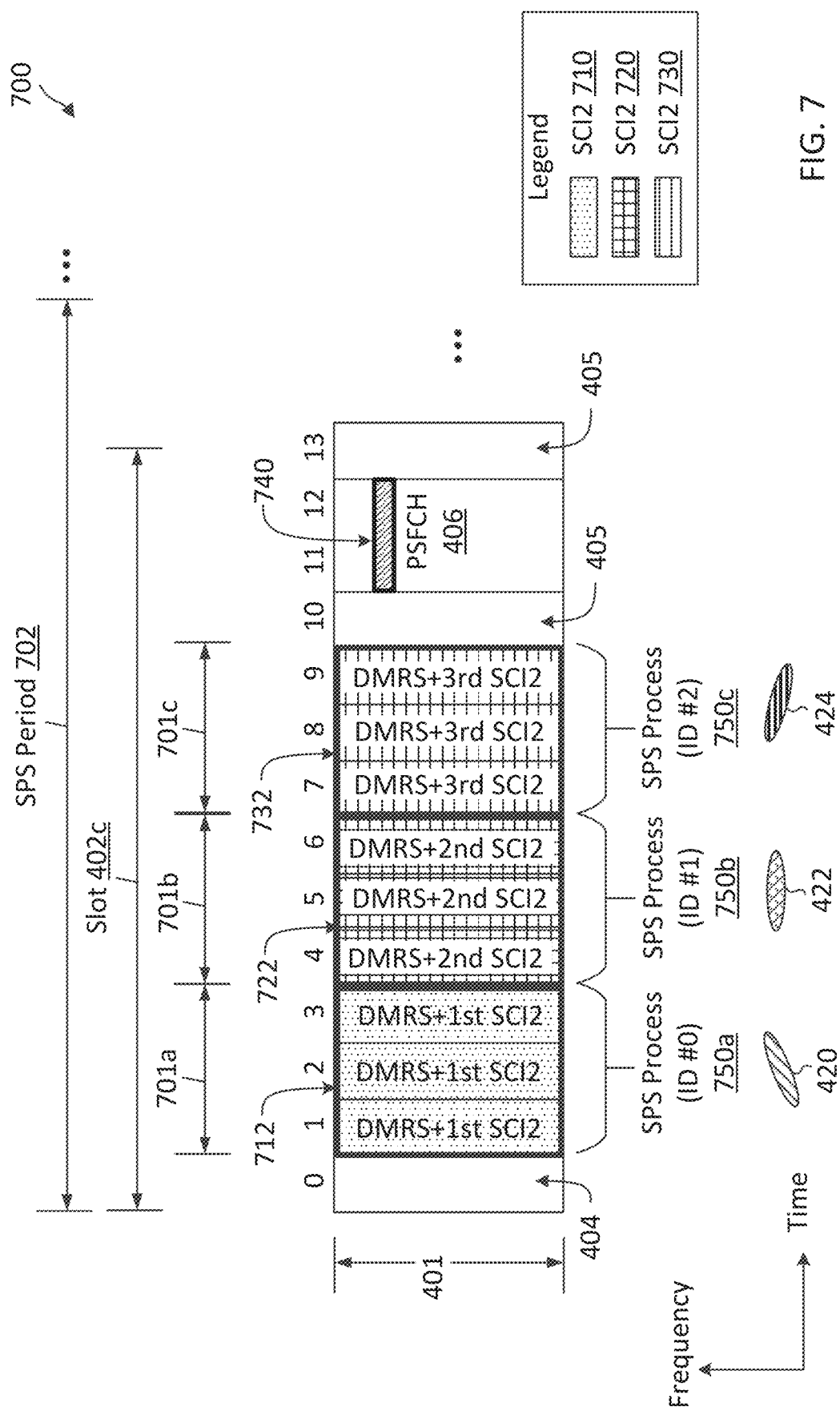
FIG. 7 illustrates an intra-slot sidelink beam selection scheme according to some aspects of the present disclosure.

FIG. 7 illustrates an intra-slot sidelink beam selection scheme 700 according to some aspects of the present disclosure. The scheme 700 may be employed by UEs such as the UEs 115, 215, and/or 302 in a network such as the networks 100 and/or 200 for sidelink communications. In particular, sidelink UEs may employ the scheme 700 to perform transmit beam selection, for example, prior to a receive beam selection and/or a sidelink data communication. In FIG. 7, the x-axis represents time in some arbitrary units, and the y-axis represents frequency in some arbitrary units. The scheme 700 is illustrated using the same sidelink slot resource structure (including 14 symbols with an AGC symbol 404 at symbol 1 and a gap at symbol 13) and the same set of transmit beams (the transmit beams 420, 422, 424, and 426) at a transmitting sidelink UE (e.g., the UE 302a) as in FIG. 4A-4B, and may use the same reference numerals as in FIGS. 4A-4B for simplicity's sake.

In the scheme 700, the UE 302a and the UE 302b may utilize an SPS for transmit/receive beam selection to remove the dependency on SCI-1 to schedule transmit beam sweeping and/or transmit beam selection. For simplicity of illustration and discussion, FIG. 7 illustrates an SPS in one subchannel 401. However, the SPS can be extended to multiple subchannels 401 with each subchannel 401 having a similar SPS configuration as shown in FIG. 7.

For SPS-based beam sweeping, the UE 302a may configure an SPS in a set of mini-slots 701 (shown as 701a, 701b, 701c) for transmitting beam sweeping SCI-2. The set of mini-slots 701 can be back-to-back in time (in consecutive periods with no gap between the periods). Each mini-slot 701 can be associated with an SPS process 750 (shown as 750a, 750b, and 750c). Each SPS process 750 may have one instance within the set of mini-slots 701 as shown. The UE 302a may use each SPS process 750 to sweep one beam direction (e.g., the beam 420, 422, 424, or 426). For instance, there may be a one-to-one correspondence between transmit beam directions and SPS processes. The association or correspondence between each SPS process 750 and beam direction can be preconfigured. The SPS may be repeated in time, at every SPS period 702. In other words, the set of mini-slots 701 for beam sweeping may be repeated at every SPS period 702.

Although FIG. 7 illustrates each mini-slot 701 including three symbols (e.g., symbols 403), it should be understood that in other examples each mini-slot may include a greater number of symbols or a less number of symbols. The number of beams that the UE 302a may sweep within a slot 402 may depend on the length or duration of a mini-slot 701. Additionally, the time-density for the beam sweeping SPS (e.g., how often the SPS is repeated) can be a tradeoff between the scheduling starting opportunity and power saving at a receiving sidelink UE (e.g., the UE 302b performing the beam measurements for transmit beam selection). For instance, the SPS can be repeated more often (e.g., with a shorter SPS period 702) to provide a more accurate beam selection and/or a faster channel adaptation, but this may increase power consumption at the receiving sidelink UE. On the other hand, the SPS can be repeated less often (e.g., a longer SPS period 702) to provide better power saving at the receiving sidelink UE, but channel adaption (e.g., to switch to a different beam when the channel changes) may be slower.

In the illustrated example of FIG. 7, the mini-slot 701a, 701b, 701c are configured for SPS processes 750a, 750b, and 750c, respectively. The SPS processes 750a, 750b, 750c are associated with the transmit beams 420, 422, and 424, respectively. The UE 302a may sweep one transmit beam per SPS process 750 according to the SPS-to-transmit beam association and may sweep the beam in the slot 402c according to the SPS-to-mini-slot allocation. As shown, the UE 302a transmits a beam measurement signal measurement signal 712 including SCI-2 710 and a DMRS during mini-slot 701a using the beam 420. The UE 302a transmits a second beam measurement signal 722 including SCI-2 720 and a DMRS during the mini-slot 701b using the beam 422. The UE 302b transmits a third beam measurement signal 732 including SCI-2 730 and a DMRS during the mini-slot 701c using the beam 424. Each beam measurement signal 712, 722, and 732 may include DMRS in at least one symbol. To densify DMRS, each beam measurement signal 712, 722, and 732 may include DMRS in each symbol, for example, to facilitate receive beam selection as will be discussed more fully below.

The SCI-2 710, 720, and 730 may be substantially similar to the SCI-2 510, 520, 530, and 640. For instance, the SCI-2 710, 720, and 730 may carry information for beam reporting, for example, indicating resources in the PSFCH and/or rules for identifying resources in the PSFCH for preferred beam reporting. In some aspects, each SCI-2 710, 720, and 730 may indicate a corresponding SPS process ID. For example, the SPS process 750a may be identified by an SPS process ID 0, the SPS process 750b may be identified by an SPS process ID 1, and the SPS process 750c may be identified by an SPS process ID 2. Each SCI-2 710, 720, and 730 may also indicate a pair of source and destination ID. For instance, the UE 302a may include in each SCI-2 710, 720, and 730 a source ID indicating the UE 302a's ID and a destination ID indicating the UE 302b's ID.

In some aspects, the UE 302a may transmit an SPS configuration to the UE 302b. The SPS configuration may indicate an SPS for the set of SPS processes 750 (e.g., SPS process ID). The SPS configuration may also indicate the mini-slot 701 that is allocated to each SPS process 750. The SPS configuration may also indicate a quasi-colocation (QCL) association (e.g., a transmit beam direction) for each SPS process 750. For instance, the SPS configuration may indicate that the SPS process 750a identified by SPS ID 0 is assigned to mini-slot 701a and quasi-co-located with the transmit beam 420. The SPS configuration may indicate that the SPS process 750b identified by SPS ID 1, assigned to mini-slot 701b, and quasi-co-located with beam 422. The SPS configuration may indicate that the SPS process 750c identified by SPS ID 2 is assigned to mini-slot 701c and quasi-co-located with transmit beam 424. The SPS configuration may also indicate that the SPS has a periodicity that repeats every period 702.

Accordingly, the UE 302b may perform transmit beam selection in accordance with the SPS configuration. The UE 302b may employ substantially similar transmit beam selectin mechanisms as discussed above. For instance, the UE 302b may utilize the same receive beam (e.g., the receive beam 410 shown in FIG. 4A) for reception while the UE 302a sweep across the set of transmit beams 420, 422, 424 in the mini-slots 701. The UE 302b may determine a receive signal measurement (e.g., RSRP, SNR, SINR) for each beam measurement signal 712, 722, and 732. The UE 302b may determine the highest receive signal measurement among the receive signal measurements. The UE 302b may determine the SPS process ID associated with the beam measurement signal with the highest receive signal measurement (e.g., based on the SPS process ID indicated by the SCI-2 carried in beam measurement signal with the highest receive signal measurement). The UE 302b may determine a resource in the PSFCH 406 for reporting the preferred transmit beam direction. As an example, the receive signal measurement for the beam measurement signal 722 corresponding to the transmit beam 422 provides the highest RSRP.

The UE 302b may determine a PSFCH resource for transmitting a preferred beam indication to the UE 302a. In some aspects, the UE 302b may determine a PSFCH resource based on the SPS process ID, the source ID, and/or the destination ID in the SCI-2 carried by the beam measurement signal 722 with the highest receive signal measurement. For instance, the UE 302b may identify the SPS process ID 2 associated with the beam measurement signal 722, for example, by decoding SCI-2 720. The UE 302b may also identify the source ID and the destination ID from the decoded SCI-2 720. In some instances, the UE 302b may determine a set of physical resource blocks (PRBs) with cyclic-shift resources in the PSFCH 406 for reporting the preferred transmit beam direction based on the SPS process ID. In some instances, the cyclic-shift resources may be redistributed based on a hash function applied according to the source ID, and/or the destination ID. After determining a PSFCH resource, the UE 302b may transmit a preferred transmit beam indication 740 in the determined PSFCH resource. Accordingly, the UE 302a may detect the indication 740 from the UE 302b in the PSFCH resource. The UE 302a may determine the preferred transmit beam for the UE 302b is the transmit beam 422 based on an association between the PSFCH resource where the indication 740 is received and the SPS process 750b, and an association between the SPS process 750b and the transmit beam 422.

In some aspects, after the UE 302a receives the preferred beam indication 740, the UE 302a may transmit multiple beam measurement signals in a subsequent slot 402 using the beam direction indicated by the preferred beam indication 740 and instruct the UE 302b to perform a receive beam selection as discussed above in the schemes 400 and 500. For instance, in a subsequent slot 402, the UE 302a may transmit a first beam measurement signal (e.g., the beam measurement signals 712, 722, and 732) at symbols 1-3, a second beam measurement signal at symbols 4-6, and a third beam measurement signal at symbols 7-9 in the preferred beam direction. The UE 302b may sweep across a set of receive beams (e.g., the beams 410 and 412) to receive each beam measurement signal using a different receive beam, determine a receive signal measurement for each receive beam, and select a preferred receive beam based on a highest receive signal measurement among the receive signal measurements. In some aspects, the UE 302a may transmit a DMRS in each symbol within mini-slot 701 as shown. As such, the UE 302b may sweep up to 9 receive beams in a single slot 402 for a single subchannel 401.

As can be observed in the scheme 700, there is no PSCCH transmission in SPS-based beam sweeping. Thus, the receiving sidelink UE 302b decodes SCI-2 (e.g., the SCI-2 710, 720, and 730) carried in the beam measurement signals (e.g., the beam measurement signals 712, 722, and 732) based on blind decoding. Channel access occupancy ratio (CR)-based congestion control is commonly used for managing sidelink UEs access to a sidelink resource pool. CR measurements are based on SCI-1 sensing, and thus may not account for SPS-based beamforming transmissions. As such, it may not be desirable to use the same sidelink resource pool for SPS-based beams sweeping and normal sidelink communications (with SCI-1 in PSCCH and SCI-2 and data in PSSCH). Accordingly, it may be more suitable to configure a resource pool specifically for periodic intra-slot beam sweeping as discussed below in FIG. 8.

Figure 8:
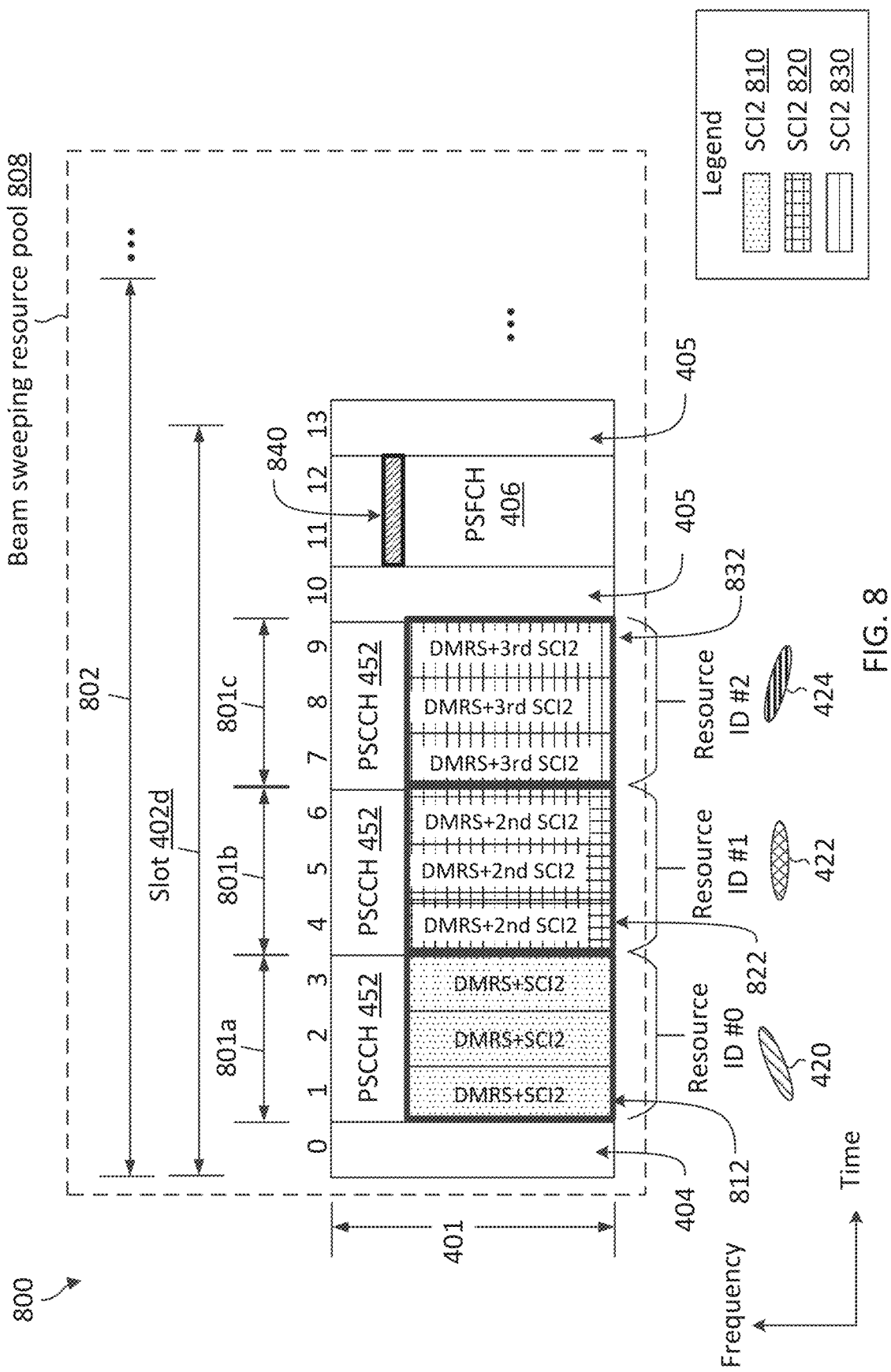
FIG. 8 illustrates an intra-slot sidelink beam selection scheme according to some aspects of the present disclosure.

FIG. 8 illustrates an intra-slot sidelink beam selection scheme 800 according to some aspects of the present disclosure. The scheme 800 may be employed by UEs such as the UEs 115, 215, and/or 302 in a network such as the networks 100 and/or 200 for sidelink communications. In particular, sidelink UEs may employ the scheme 800 to perform transmit beam selection, for example, prior to a receive beam selection and/or a sidelink data communication. In FIG. 8, the x-axis represents time in some arbitrary units, and the y-axis represents frequency in some arbitrary units. The scheme 800 is illustrated using the same sidelink slot resource structure (including 14 symbols with an AGC symbol 404 at symbol 1 and a gap at symbol 13) and the same set of transmit beams (the transmit beams 420, 422, 424, and 426) at a transmitting sidelink UE (e.g., the UE 302a) as in FIG. 4A-4B, and may use the same reference numerals as in FIGS. 4A-4B for simplicity's sake.

In the scheme 800, the UE 302a and the UE 302b may utilize a beam sweeping resource pool 808 for transmit/receive beam selection. The resource pool 808 may be substantially similar to the resource pool 408. For example, the resource pool 808 can span multiple subchannels 401 in frequency sidelink slot resource that repeats in time, for example, according to a period 802. For simplicity of illustration and discussion, FIG. 8 illustrates one sidelink slot resource in a sidelink slot 402 (shown as 402d) for one subchannel 401 in the resource pool 808. However, the resource pool 808 may include similar sidelink slot resource in each subchannel 401 and may all repeat according to the period 802.

For instance, the UE 302a may configure the UE 302b with a set of mini-slots 801 (shown as 801a, 801b, 801c) for beam sweeping. The set of mini-slots 801 can be back-to-back in time (in consecutive periods with no gap between the periods). Each mini-slot 801 may have a QCL association with one of the transmit beams 420, 422, 424, and 426. Thus, the UE 302a may sweep one transmit beam per mini-slot 801. The set of mini-slots 801 may be repeated in time, at every period 802. Each mini-slot 801 may carry SCI-1 in a PSCCH and SCI-2 in a shortened PSSCH.

Although FIG. 8 illustrates each mini-slot 801 including three symbols (e.g., symbols 403), it should be understood that in other examples each mini-slot may include a greater number of symbols or a less number of symbols. The number of beams that the UE 302a may sweep within a slot 402 may depend on the length or duration of a mini-slot 801. Additionally, the time-density for the beam sweeping (e.g., how often the mini-slots 801 are repeated) can be a tradeoff between the scheduling starting opportunity and power saving at a receiving sidelink UE (e.g., the UE 302b performing the beam measurements for transmit beam selection) as discussed above with respect to FIG. 7.

As shown, the UE 302a transmits a beam measurement signal measurement signal 812 including SCI-2 810 and a DMRS (in a shortened PSSCH) during mini-slot 801a using the beam 420. The UE 302a transmits a second beam measurement signal 822 including SCI-2 820 and a DMRS (in a shortened PSSCH) during the mini-slot 801b using the beam 422. The UE 302b transmits a third beam measurement signal 832 including SCI-2 830 and a DMRS (in a shortened PSSCH) during the mini-slot 801c using the beam 424. Additionally, the UE 302a transmits SCI-1 in a PSCCH 452 multiplexed with the first beam measurement signal 812 during the mini-slot 801a. Similarly, the UE 302a transmits SCI-1 in a PSCCH 452 multiplexed with the second beam measurement signal 822 during the mini-slot 801b and transmits SCI-1 in a PSCCH 452 multiplexed with the third beam measurement signal 832 during the mini-slot 801b. Each SCI-1 may schedule a corresponding beam sweeping SCI-2 in the corresponding shortened PSSCH. For instance, the SCI-1 in the mini-slot 801a may schedule the first beam measurement signal 812, the SCI-1 in the mini-slot 801b may schedule the first beam measurement signal 822, and the SCI-1 in the mini-slot 801c may schedule the first beam measurement signal 832.

The SCI-2 810, 820, and 830 may be substantially similar to the SCI-2 510, 520, 530, 640, 710, 720, 730, and 740. For instance, the SCI-2 810, 820, and 830 may carry information for beam reporting, for example, indicating resources in the PSFCH and/or rules for identifying resources in the PSFCH for preferred beam reporting. In some aspects, each SCI-2 810, 820, and 830 may indicate a corresponding mini-slot resource ID. For example, the mini-slot 801*a* may be identified by a resource ID 0, the mini-slot 801*b* may be identified by a resource ID 1, and the mini-slot 801*c* may be identified by a resource ID 2. Each SCI-2 810, 820, and 830 may also indicate a pair of source and destination ID. For instance, the UE 302*a* may include in each SCI-2 810, 820, and 830 a source ID indicating the UE 302*a*'s ID and a destination ID indicating the UE 302*b*'s ID.

In some aspects, the UE 302*a* may transmit a beam sweeping resource pool configuration to the UE 302*b* indicating a configuration for the resource pool 808. The beam sweeping resource pool configuration may indicate the set of mini-slots 801, a QCL association (e.g., a transmit beam direction) for each mini-slot 801. For instance, the beam sweeping resource pool configuration may indicate that the mini-slot 801*a* identified by resource ID 0 is quasi-co-located with the transmit beam 420. the beam sweeping resource pool configuration may indicate that the mini-slot 801*b* identified by resource ID 1 is quasi-co-located with the transmit beam 422. The beam sweeping resource pool configuration may indicate that the mini-slot 801*c* identified by resource ID 2 is quasi-co-located with the transmit beam 424. The beam sweeping resource pool configuration may also indicate that the set of mini-slots 801 in the resource pool 808 has a periodicity that repeats every period 802.

Accordingly, the UE 302*b* may perform transmit beam selection in accordance with the beam sweeping resource pool configuration. The UE 302*b* may employ substantially similar transmit beam selectin mechanisms as discussed above in the schemes 400, 500, 600, and 700 with respect to FIGS. 4A, 5, 6, and 7, respectively. For instance, the UE 302*b* may utilize the same receive beam (e.g., the receive beam 410 shown in FIG. 4A) for reception while the UE 302*a* sweep across the set of transmit beams 420, 422, 424 in the mini-slots 801. The UE 302*b* may determine a receive signal measurement (e.g., RSRP, SNR, SINR) for each beam measurement signal 812, 822, and 832. The UE 302*b* may determine the highest receive signal measurement among the receive signal measurements. The UE 302*b* may determine the mini-slot resource ID associated with the beam measurement signal with the highest receive signal measurement (e.g., based on the resources ID indicated by the SCI-2 carried in beam measurement signal with the highest receive signal measurement). The UE 302*b* may determine a resource in the PSFCH 406 for reporting the preferred transmit beam direction. As an example, the receive signal measurement for the beam measurement signal 822 corresponding to the transmit beam 422 provides the highest RSRP.

The UE 302*b* may determine a PSFCH resource for transmitting a preferred beam indication to the UE 302*a*. In some aspects, the UE 302*b* may determine a PSFCH resource based on the resource ID, the source ID, and/or the destination ID in the SCI-2 carried by the beam measurement signal 822 with the highest receive signal measurement. For instance, the UE 302*b* may identify the resource ID 2 associated with the beam measurement signal 722, for example, by decoding SCI-2 720. The UE 302*b* may also identify the source ID and the destination ID from the decoded SCI-2 720. In some instances, the UE 302*b* may determine a set of PRBs with cyclic-shift resources in the PSFCH 406 for reporting the preferred transmit beam direction based on the resource process ID. In some instances, the cyclic-shift resources may be redistributed based on a hash function applied according to the source ID, and/or the destination ID. After determining a PSFCH resource, the UE 302*b* may transmit a preferred transmit beam indication 840 in the determined PSFCH resource. Accordingly, the UE 302*a* may detect the indication 840 from the UE 302*b* in the PSFCH resource. The UE 302*a* may determine the preferred transmit beam for the UE 302*b* is the transmit beam 422 based on an association between the PSFCH resource where the indication 840 is received and the mini-slot 801*b*, and an association between the mini-slot 801*b* and the transmit beam 422.

In some aspects, after the UE 302*a* receives the preferred beam indication 740, the UE 302*a* may transmit multiple beam measurement signals in a subsequent slot 402 using the beam direction indicated by the preferred beam indication 840 and instruct the UE 302*b* to perform a receive beam selection as discussed above in the schemes 400, 500, and 700. For instance, in a subsequent slot 402, the UE 302*a* may transmit a first beam measurement signal (e.g., the beam measurement signals 812, 822, and 832) at symbols 1-3 (a mini-slot 801*a*), a second beam measurement signal at symbols 4-6 (a mini-slot 801*b*), and a third beam measurement signal at symbols 7-9 (a mini-slot 80*ca*) in the preferred beam direction. The UE 302*b* may sweep across a set of receive beams (e.g., the beams 410 and 412) to receive each beam measurement signal using a different receive beam, determine a receive signal measurement for each receive beam, and select a preferred receive beam based on a highest receive signal measurement among the receive signal measurements. In some aspects, the UE 302*a* may transmit a DMRS in each symbol within mini-slot 801 as shown. As such, the UE 302*b* may sweep up to 9 receive beams in a single slot 402 for a single subchannel 401.

In some scenarios, a wide beam SCI-2 may reach multiple receiving sidelink UEs. As such, it may not be necessary transmit beamformed SCI-2 for transmit and/or receive beam selection. In other words, it may be sufficient for a receiving sidelink UE to measure multiple beamformed reference signals (e.g., CSI-RSs), for example, transmitted in time-division multiplexed resources within a sidelink slot as discussed below in FIGS. 9A and 9B.

Figure 9A:
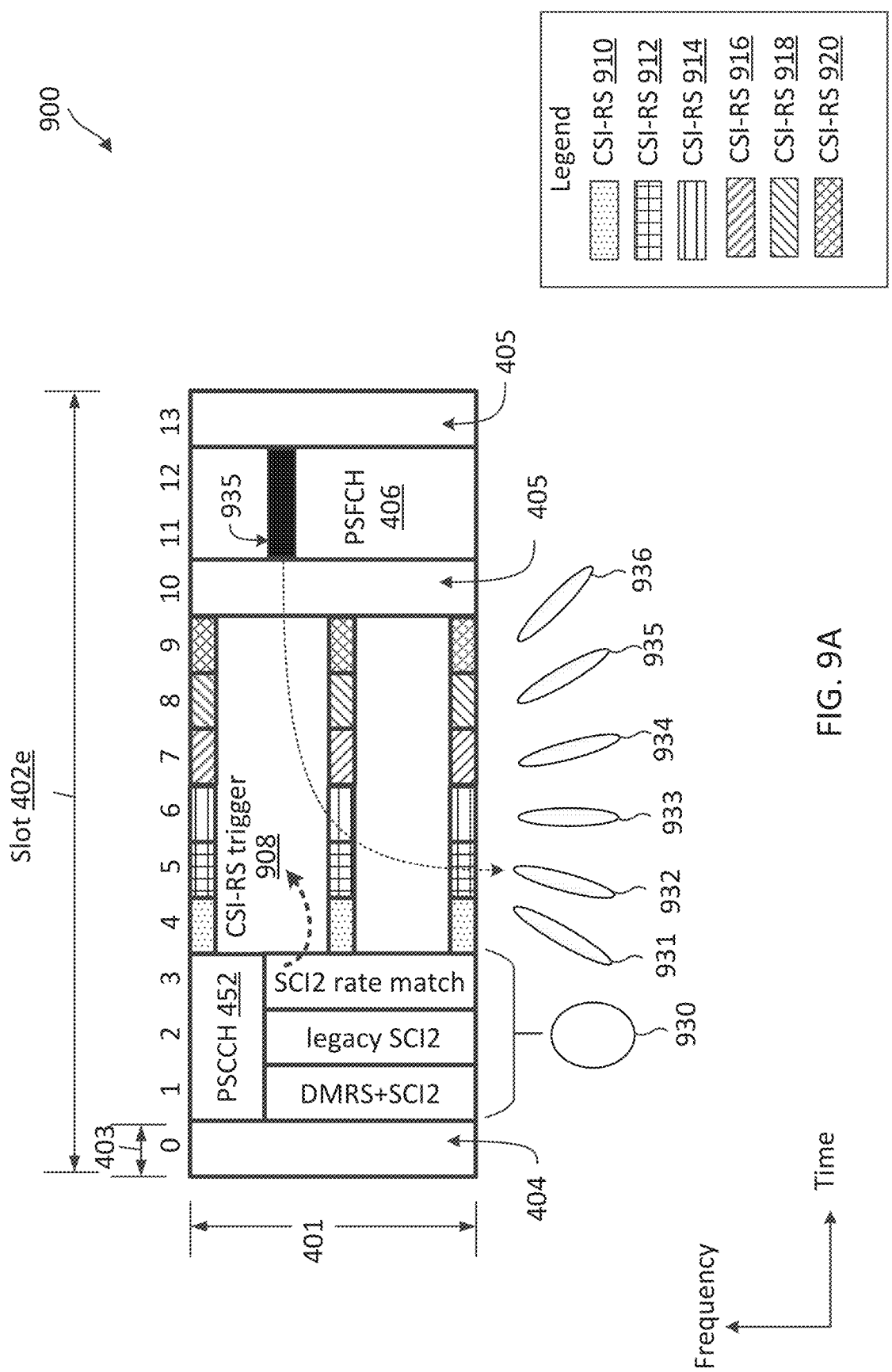
FIG. 9A illustrates an intra-slot sidelink beam selection scheme according to some aspects of the present disclosure.

FIG. 9A illustrates an intra-slot sidelink beam selection scheme 900 according to some aspects of the present disclosure. The scheme 900 may be employed by UEs such as the UEs 115, 215, and/or 302 in a network such as the networks 100 and/or 200 for sidelink communications. In particular, sidelink UEs may employ the scheme 900 to perform transmit beam selection, for example, prior to a receive beam selection and/or a sidelink data communication. In FIG. 9A, the x-axis represents time in some arbitrary units, and the y-axis represents frequency in some arbitrary units. The scheme 900 is illustrated using the same sidelink slot resource structure (including 14 symbols with an AGC symbol 404 at symbol 1 and a gap at symbol 13) as in FIG. 4A-4B, and may use the same reference numerals as in FIGS. 4A-4B for simplicity's sake.

In the scheme 900, the UE 302*a* may configure the UE 302*b* with multiple CSI-RS resources in symbols 403 following a CSI-RS trigger, for example, carried by SCI-2. To sweep N transmit beams (e.g., the transmit beams 931-936) at the UE 302*a*, the UE 302*a* may configure N CSI-RS resources on N symbols following SCI-2 in a shortened PSSCH. For instance, the UE 302*a* may transmit a plurality of beam measurement signals to the UE 302*b*, each in one of a plurality of resources (CSI-RS resource) time-multiplexed within a sidelink slot 402 (shown as 402e), by sweeping through a plurality of beam directions. Each beam measurement signal may be a CSI-RS. The plurality of beam directions may include at least two different beam directions for transmit beam selection. To trigger the UE 302b for the transmit beam selection, the UE 302a may transmit a CSI-RS trigger, for example, at the beginning of the slot 402e, using a wide beam covering at least all of the plurality of beam directions to be used beam sweeping in the slot 402. In some aspects, the UE 302a may configure the UE 302b with a CSI-RS configuration separately from the CSI-RS trigger. For instance, the UE 302a may configure the CSI-RS resources (e.g., REs at symbol 4-9 shown by the patterned filled boxes) prior to triggering a CSI-RS trigger. As such, the UE 302a may transmit the CSI-RS trigger to activate a transmit beam selection in a certain slot 402 (e.g., the 402e) without having to indicate the CSI-RS resource in the trigger. In some instances, each CSI-RS resource may be identified by a resource ID and may have a QCL association with one of the beams 931-936. Thus, the configuration can include a time/frequency configuration, CSI-RS resource ID and an QCL association for each CSI-RS resource.

In the illustrated example of FIG. 9A, the UE 302a may transmit SCI-2 in a shortened PSSCH during in symbols 1-3 of the slot 402e. The SCI-2 may include a legacy SCI-2 at symbol 2 and beam sweeping trigger SCI-2 at symbols 1 and 3 and can be rate-matched to a DMRS at the symbols 1 and 3. The UE 302a may also transmit SCI-1 in a PSCCH 452 multiplexed with the shortened PSSCH at symbols 1-3. The SCI-1 may include information related to SCI-2 decoding. As shown, the UE 302a may transmit the SCI-1 in the PSCCH 452 and the SCI-2 and DMRS in the shortened PSSCH using a wide beam 930. The wide beam 930 may cover multiple directions, for example, include at least all the transmit beams 931-936 to be used for beam sweeping in the slot 402e.

The beam sweeping trigger SCI-2 may include a CSI-RS trigger 908. The CSI-RS trigger 908 may trigger the UE 302b to perform CSI-RS measurements for transmit beam selection. For instance, the UE 302a sweep through the transmit beams 931-936. As shown, the UE 302b transmits a CSI-RS 910 during symbol 4 using the transmit beam 931, transmits a CSI-RS 912 during symbol 5 using the transmit beam 932, transmits a CSI-RS 914 during symbol 6 using the transmit beam 933, transmits a CSI-RS 916 during symbol 7 using the transmit beam 934, transmits a CSI-RS 918 during symbol 8 using the transmit beam 935, and transmits a CSI-RS 920 during symbol 9 using the transmit beam 936. The CSI-RS 910, 912, 914, 916, 918, and 920 may include predetermined waveform sequences. In some instances, the CSI-RS 910, 912, 914, 916, 918, and 920 may include the same waveform sequence. In some other instances, the CSI-RS 910, 912, 914, 916, 918, and 920 may include different waveform sequences.

In some aspects, the SCI-1, the beam sweeping SCI-2, and/or the legacy CSI-2 may include a source ID indicating the UE 302a's ID and a destination ID indicating the UE 302b's ID to trigger the UE 302b to perform transmit beam selection. In some aspects, the SCI-1, the beam sweeping SCI-2, and/or the legacy CSI-2 may include a source ID indicating the UE 302a's ID and a group destination ID indicating a groupcast ID identifying a group of sidelink UEs including the UE 302b The use of the groupcast ID can trigger a group of UEs to perform transmit beam selection instead of a single UE 302b. The use of groupcast ID can be useful. For example, the UE 302a can configure common CSI-RS resources group a group of UEs, and thus may have better resource utilization.

The receiving sidelink UE 302b may receive SCI-1 in the PSCCH. The UE 302b may decode the SCI-2 based on parameters (e.g. SCI-2 resource mapping and/or MCS for transmitting the SCI-2) provided by the SCI-1. The UE 302b may decode the CSI-RS trigger 908 from the SCI-2. Upon detecting the CSI-RS trigger 908, the UE 302b may perform a transmit beam selection in the slot 402. As discussed above, the UE 302b may have received a CSI-RS configuration earlier, and thus may be aware of the CSI-RS resources (e.g., the time and/or frequency locations) in the slot 402 and/or the CSI-RS waveform sequence to monitor for. The UE 302b may perform the transmit beam selection using substantially similar transmit beam selectin mechanisms as discussed above in the schemes 400, 500, 600, 700, and 800 with respect to FIGS. 4A, 5, 6, 7, and 8, respectively. For instance, the UE 302b may utilize the same receive beam (e.g., the receive beam 410 shown in FIG. 4A) for reception while the UE 302a sweep across the set of transmit beams 931-936 in the slot 402e. The UE 302b may determine a receive signal measurement (e.g., RSRP, SNR, SINR) for each beam measurement signal 931-936. The UE 302b may determine the highest receive signal measurement among the receive signal measurements. The UE 302b may determine the CSI-RS resource ID associated with the resource where the beam measurement signal with the highest receive signal measurement is received (e.g., as indicated by the CSI-RS configuration). The UE 302b may determine a resource in the PSFCH 406 for reporting the preferred transmit beam direction based on the resource ID, the source ID, and/or the destination ID. As an example, the receive signal measurement for the CSI-RS 912 corresponding to the transmit beam 932 provides the highest RSRP.

The UE 302b may determine a PSFCH resource for transmitting a preferred beam indication 935 to the UE 302a. In some aspects, the UE 302b may determine a PSFCH resource based on the resource ID, the source ID, and/or the destination ID in the SCI-1/SCI-2. For instance, the UE 302b may identify the CSI-RS resource ID 2 associated with the resource where the CSI-RS 912 is received, for example, by decoding SCI-1/SCI-2. The UE 302b may also identify the source ID and the destination ID from the decoded SCI-1/SCI-2. In some instances, the UE 302b may determine a set of PRBs with cyclic-shift resource in the PSFCH 406 for reporting the preferred transmit beam direction based on the resource process ID. In some instances, the cyclic-shift resources may be redistributed based on hash function applied according to the source ID, and/or the destination ID. After determining a PSFCH resource, the UE 302b may transmit a preferred transmit beam indication 935 in the determined PSFCH resource. Accordingly, the UE 302a may detect the indication 935 from the UE 302b in the PSFCH resource. The UE 302a may determine the preferred transmit beam for the UE 302b is the transmit beam 422 based on an association between the PSFCH resource where the indication 935 is received and the CSI-RS resource, and an association between the CSI-RS resource and the transmit beam 422.

In some aspects, the UE 302b may select M (e.g., 1, 2, 3) strongest beams from the transmit beams 931-936 and report the M strongest beams using on-off keying modulation in the associated PSFCH resources.

Although FIG. 9A illustrates the slot 402e including a PSFCH 406, it should be understood that in other examples a slot 402 where beam sweeping CSI-RSs are transmitted may not include a PSFCH. As such, the UE 302b may transmit the preferred transmit beam indication 935 in a different slot than where the preferred transmit beam was received. In general, the UE 302b may report a preferred transmit beam in the same slot as where the preferred transmit beam was received or in a different slot than where the preferred transmit beam is received.

As similarly discussed above in schemes 400, 500, 600, 700, and 800, after the UE 302a receives the preferred beam indication 935, the UE 302a may transmit multiple beam measurement signals in a subsequent slot 402 using the beam direction indicated by the preferred beam indication 840 and instruct the UE 302b to perform a receive beam selection as discussed below in FIG. 9B.

Figure 9B:
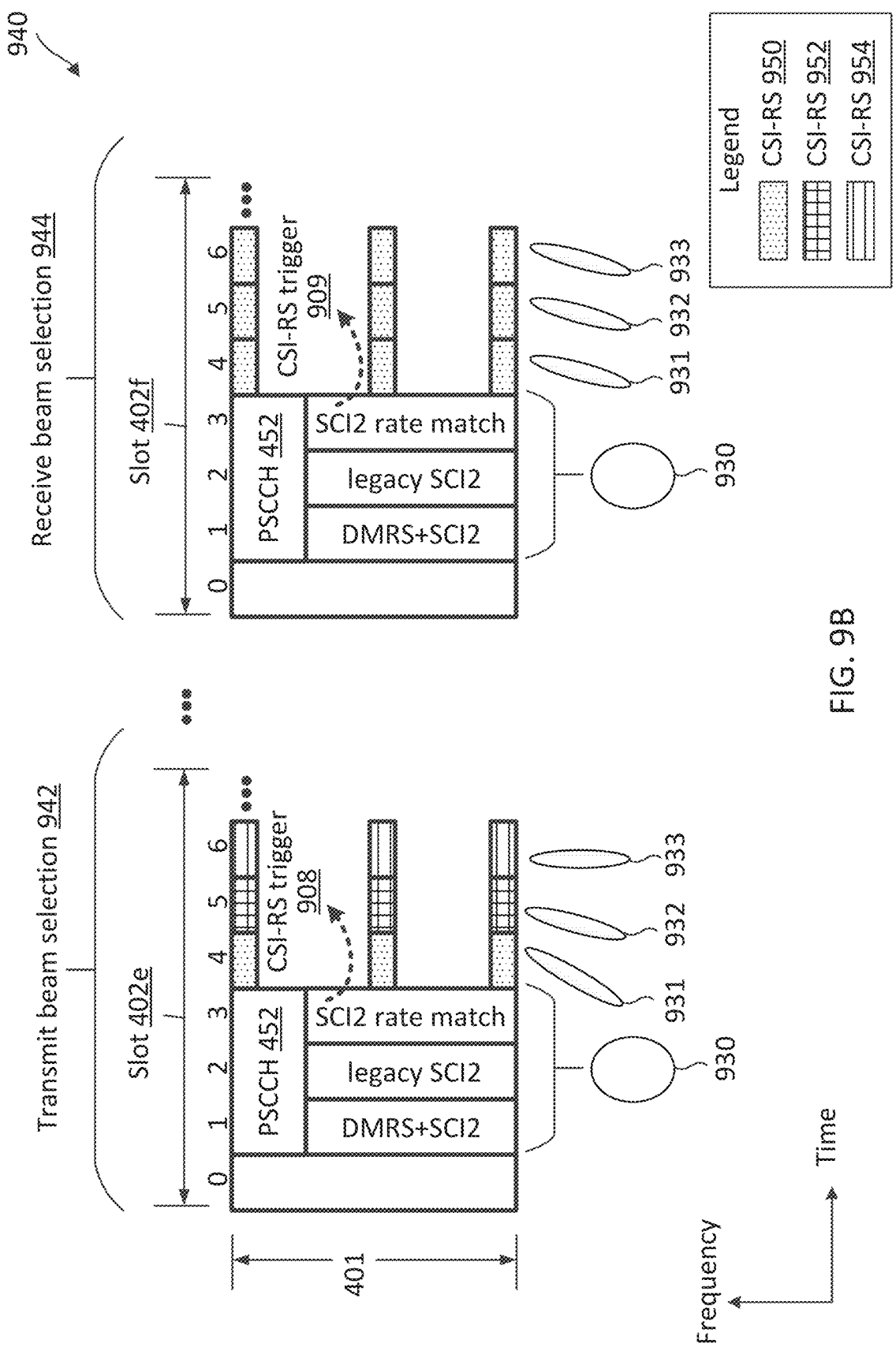
FIG. 9B illustrates an intra-slot sidelink beam selection scheme according to some aspects of the present disclosure.

FIG. 9B illustrates an intra-slot sidelink beam selection scheme 940 according to some aspects of the present disclosure. The scheme 940 may be employed by UEs such as the UEs 115, 215, and/or 302 in a network such as the networks 100 and/or 200 for sidelink communications. In particular, sidelink UEs may employ the scheme 940 to perform transmit beam selection, for example, prior to a receive beam selection and/or a sidelink data communication. In FIG. 9B, the x-axis represents time in some arbitrary units, and the y-axis represents frequency in some arbitrary units. The scheme 940 is illustrated using the same sidelink slot resource structure (including 14 symbols with an AGC symbol 404 at symbol 1 and a gap at symbol 13) as in FIG. 4A-4B and the same CSI-RS-based beam sweeping as in FIG. 9A, and may use the same reference numerals as in FIGS. 4A-4B and 9B for simplicity's sake.

In the scheme 940, the UE 302a and 302b may perform CSI-RS-based transmit beam selection 942 followed by CSI-RS-based receive beam selection 944. Generally speaking, the transmit beam selection 942 includes features similar to the scheme 900 in many respects. For example, the UE 302a may trigger a CSI-RS based transmit beam selection based on a CSI-RS trigger 908 carried in SCI-1 and/or SCI-2a and may sweep a set of beams (e.g., beams 931-936) in CSI-RS resources within a slot 402e. Accordingly, for sake of brevity, details of those transmissions will not be repeated here.

Referring to the example discussed in FIG. 9A, the UE 302b may indicate to the UE 302a (e.g., in the indication 935) that the transmit beam 932 is the preferred transmit beam among the transmits 931-936. Accordingly, the UE 302a may receive the indication. After the UE 302a receives the preferred beam indication, the UE 302a may transmit multiple beam measurement signals in a subsequent slot 402f using the beam direction indicated by the preferred beam indication and instruct the UE 302b to perform a receive beam selection as discussed above in the schemes 400, 500, 700, and 800. For instance, in the slot 402f, the UE 302a may transmit SCI-1 in a PSCCH 452 and SCI-2 in a shortened PSSCH as discussed above in relation to FIG. 9A. The UE 302a may include a CSI-RS trigger 909 in the SCI-1 and/or SCI-2. The CSI-RS trigger 909 may trigger the UE 302b to perform the receive beam selection 944. The UE 302a may transmit a CSI-RS in each CSI-RS resource using the transmit beam 932 preferred by the UE 302b. As shown, the UE 302a transmits CSI-RSs 950, 952, 954 in CSI-RS resources at symbol 4, 5, and 5, respectively, of the slot 402f. The UE 302b may sweep across a set of receive beams (e.g., the beams 410 and 412) to receive each CSI-RS using a different receive beam, determine a receive signal measurement for each receive beam, and select a preferred receive beam based on a highest receive signal measurement among the receive signal measurements. For instance, the UE 302b may determine the receive beam 412 is the preferred receive beam.

After selecting the preferred transmit beam 932 and the preferred receive beam 410, the UE 302a may transmit data (e.g., PSSCH data 335) to the UE 302b over a sidelink channel (e.g., the sidelink channel 310) using the preferred transmit beam 932 and the UE 302b may receive the data using the preferred receive beam 412. The UE 302a and 302b may also apply channel reciprocity by using the same set of transmit-receive beams for communication in a reverse link direction. The UE 302a and 302b may also apply channel reciprocity by using the same set of transmit-receive beams for communication in a reverse link direction. For instance, the UE 302b may transmit data to the UE 302a over the sidelink channel in the same beam direction as the preferred receive beam direction, and the UE 302a may receive the data from the UE 302b in the same beam direction as the preferred transmit beam direction.

In some aspects, the UE 302a and the UE 302b may implement any suitable combination of the schemes 400, 500, 600, 700, 800, 900, and 950 discussed above with respect to FIGS. 4A, 5, 6, 7, 8, 9A, and 9B, respectively.

Figure 10:
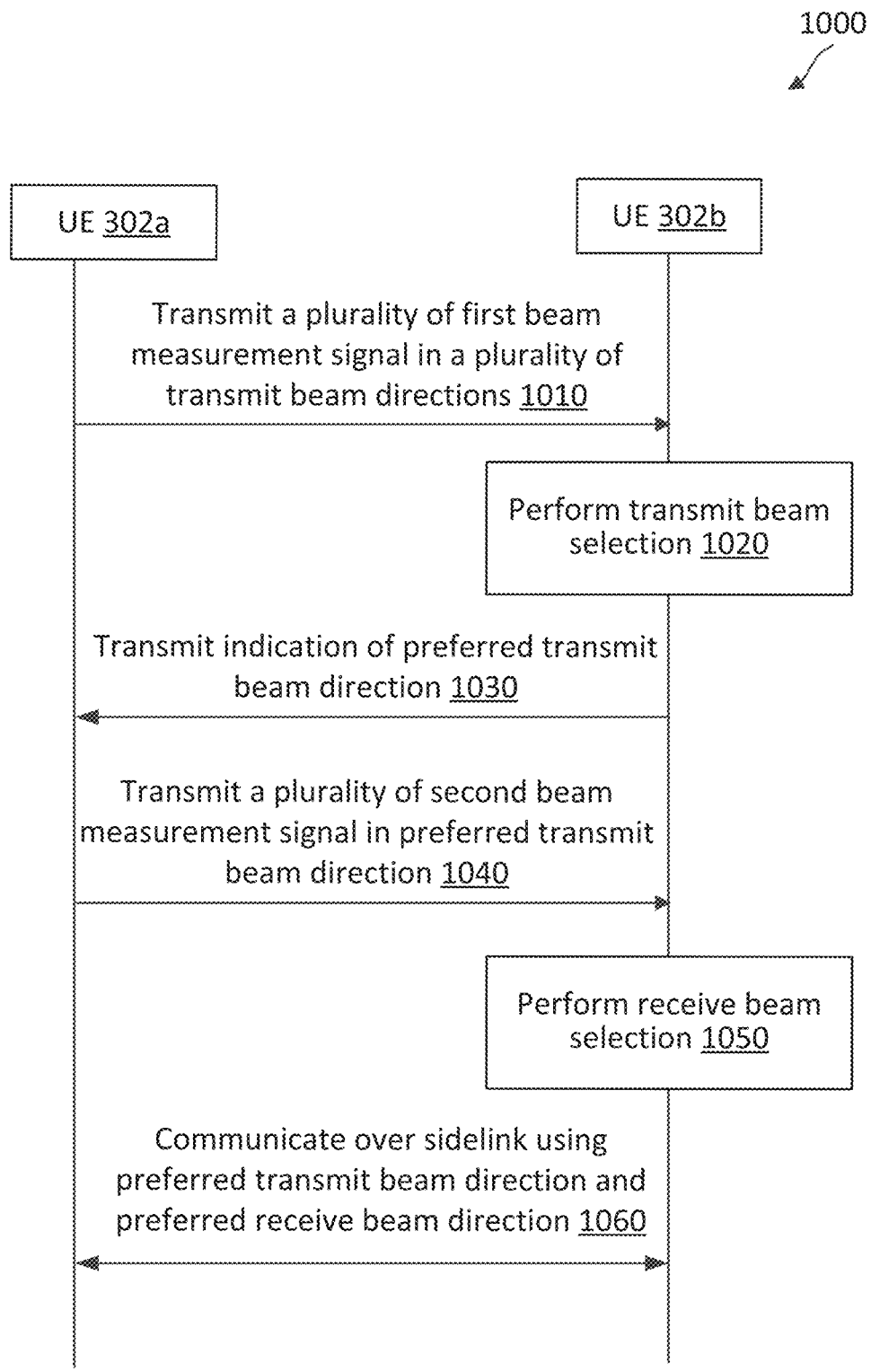
FIG. 10 is a sequence diagram illustrating a sidelink transmit/receive beam selection method according to some aspects of the present disclosure.

FIG. 10 is a sequence diagram illustrating a sidelink transmit/receive beam selection method 1000 according to some aspects of the present disclosure. The method 1000 may be implemented between the UE 302a and the UE 302b. The method 1000 may employ similar mechanisms as discussed above with respect to FIGS. 4A-4B, 5-8, and 9A-9B for communications. Although the method 1000 illustrates the UE 302a in communication with one UE 302b, it should be understood that in other examples the UE 302a may communicate with any suitable number of UEs 302 (e.g., about 2, 3, 4, 5, 6 or more) over a sidelink. As illustrated, the method 1000 includes a number of enumerated actions, but embodiments of the method 1000 may include additional actions before, after, and in between the enumerated actions. In some embodiments, one or more of the enumerated actions may be omitted or performed in a different order.

At action 1010, the UE 302a transmits a plurality of first beam measurement signals over a sidelink in a plurality of transmit beam directions. In some aspects, the UE 302a may transmit each first beam measurement signal in one of the plurality of transmit beam directions in a different sidelink slot as discussed above in relation to FIG. 4A. In some other aspects, the UE 302a may transmit each first beam measurement signal in one of the plurality of transmit beam directions within a single sidelink slot as discussed above in relation to FIGS. 5-8 and 9A-9B. The plurality of transmit beam directions may include at least two different beam directions. In some aspects, each first beam measurement signal may include beam sweeping SCI-2 and a DMRS as discussed above in relation to FIGS. 4A, and 5-8. In some aspects, each first beam measurement signal may include a CSI-RS as discussed above in relation to FIGS. 9A-9B. In some aspects, the UE 302a may sweep beams with the plurality of first beam measurement signals according to a beam sweeping schedule scheduled by SCI-1 as discussed above in relation to FIG. 5. In some other aspects, the UE 302a may sweep beams with the plurality of first beam measurement signals according to an SPS as discussed above in relation to FIG. 7. In yet some other aspects, the UE 302a may sweep beams with the plurality of first beam measurement signals according to a beam sweeping resource pool configuration as discussed above in relation to FIG. 8. In yet some other aspects, the UE 302a may sweep beams with the plurality of first beam measurement signals according to a CSI-RS resource configuration and CSI-RS trigger as discussed above in relation to FIGS. 9A-9B.

At action 1020, the UE 302b performs transmit beam selection to select a preferred transmit beam direction based on receiving the plurality of transmit beam measurement signals transmitted by UE 302a. The UE 302b may perform the transmit beam selection using similar mechanisms as discussed above in relation to FIGS. 4A, 5-8, and 9A-9B. For instance, the UE 302b may determine a receive signal measurement (e.g., RSRP, SNR, SINR) for each of the first beam measurement signals. The UE 302b may select a best transmit beam direction from the plurality of transmit beam direction based on the receive signal measurements. In this regard, the UE 302 may determine the beam measurement signal that provides the highest receive signal power among the plurality of first beam measurement signals. The UE 302b may determine the beam direction where the beam measurement signal with the highest receive signal measurement is receive as the preferred transmit beam direction.

At action 1030, the UE 302b transmits an indication of a preferred transmit beam direction of the plurality transmit beam directions. The UE 302b may determine a resource in a PSFCH and transmit the indication in the determine resource. The UE 302b may determine the PSFCH resource in a variety of ways and may depend on a scheduling mechanism used for scheduling the plurality of first beam measurement signals. In general, there is an association between each transmit beam direction and a corresponding PSFCH resource. In some aspects, the association can be further based on an SPS process ID when the beam sweeping is scheduled by an SPS as discussed above in relation to FIG. 7. In some aspects, the association can be further based on a mini-slot resource ID when the beam sweeping is scheduled using a beam sweep resource pool as discussed above in relation to FIG. 8. In some aspects, the association can be further based on a CSI-RS resource ID when the beam sweeping is trigger by a CSI-RS trigger s discussed above in relation to FIGS. 9A-9B. In some aspects, the association can be further based on a source ID (e.g., the UE 302a's ID) and/or a destination ID (e.g., the UE 302b's ID or a groupcast ID) associated with the beam measurement signal. Accordingly, the UE 302a may detect the preferred transmit beam indication from the UE 302b in a PSFCH resource and may determine the transmit beam direction preferred by the UE 302b based on the associations (e.g., SPS process ID, mini-slot resource ID, CSI-RS resource ID, source ID, destination ID) as discussed above in relation to FIGS. 5-8 and 9A-9B.

At action 1040, after receiving the preferred transmit beam indication, the UE 302a transmits a plurality of second beam measurement signals over the sidelink using the preferred transmit beam direction. In some aspects, the plurality of second beam measurement signals can include beam sweeping SCI-2 and a DMRS. In some aspects, the plurality of second beam measurement signals can include CSI-RSs. In aspects, the UE 302a may transmit a trigger to trigger the UE 302b to perform a receive beam selection. The trigger can be an instruction in SCI-2 and/or a CSI-RS trigger.

At action 1050, the UE 302b performs receive beam selection to select a preferred receive beam direction based on the plurality of receive beam measurement signals. The UE 302b may perform the receive beam selection using similar mechanisms as discussed above in relation to FIGS. 4A, 5-8, and 9A-9B. For instance, the UE 302b may sweep through a set of receive beam directions, using a different receive beam to receive each beam measurement signal of the plurality of second beam measurement signals. The UE 302b may determine a receive signal measurement (e.g., RSRPs, SNR, SINR) for each of second beam measurement signals. The UE 302b may select a best receive beam direction (e.g., the receive beam direction providing, e.g., the highest RSRP, SNR, or SINR) from the set of receive beam directions based on the receive signal measurements. The UE 302b may select the receive beam direction that provides the highest receive signal measurement.

At action 1060, the UE 302a and the UE 302b communicate with each over the sidelink based on the preferred transmit beam direction and the preferred receive beam direction. For instance, the UE 302a may transmit data (e.g., PSSCH data 335) to the UE 302b over a sidelink channel (e.g., the sidelink channel 310) using the preferred transmit beam direction and the UE 302b may receive the data using the preferred receive beam direction. The UE 302a and 302b may also apply channel reciprocity by using the same set of transmit-receive beams for communication in a reverse link direction. For instance, the UE 302b may transmit data to the UE 30ab over the sidelink channel in the same beam direction as the preferred receive beam direction, and the UE 302a may receive the data from the UE 302b in the same beam direction as the preferred transmit beam direction.

Figure 11:
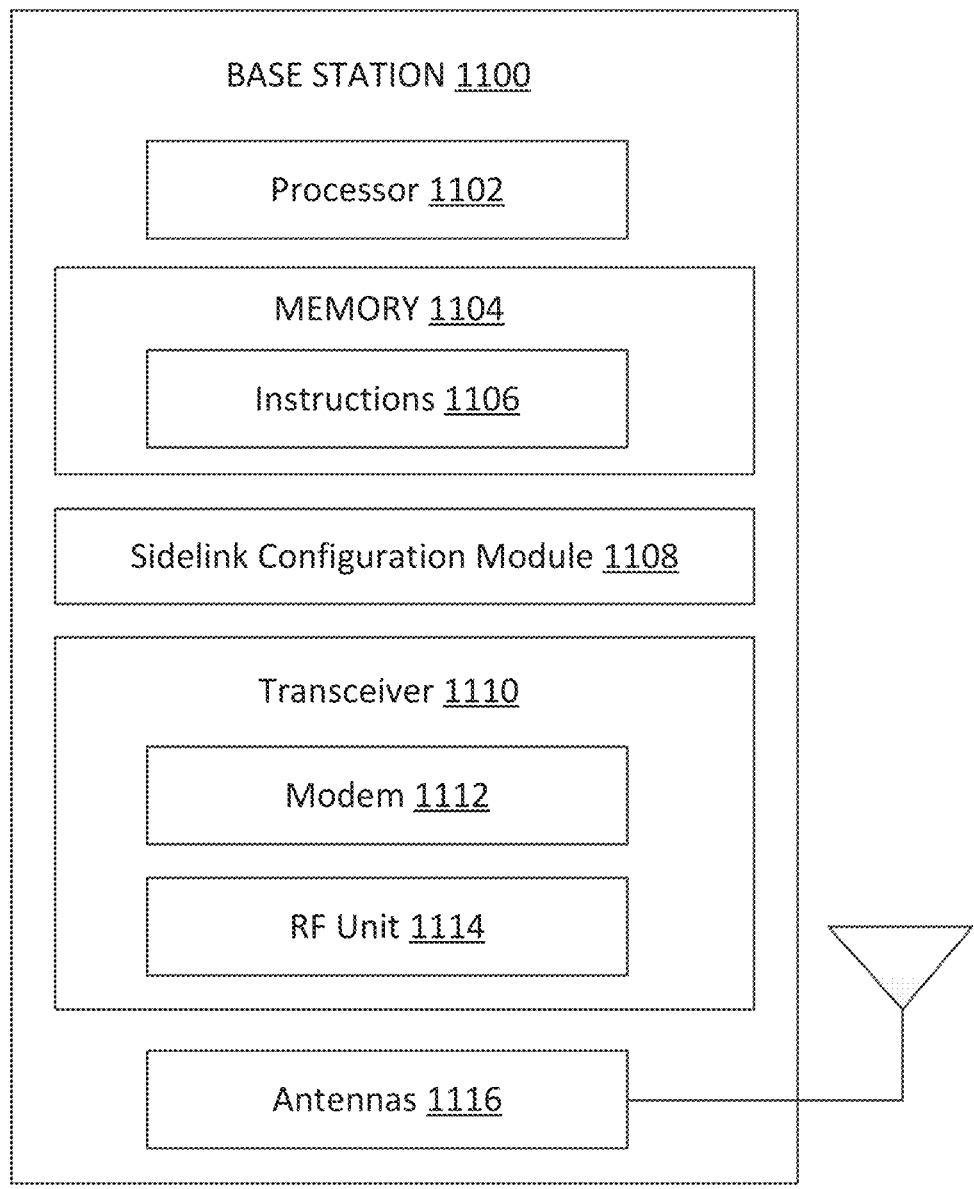
FIG. 11 is a block diagram of an exemplary base station (BS) according to some aspects of the present disclosure.

FIG. 11 is a block diagram of an exemplary BS 1100 according to some aspects of the present disclosure. The BS 1100 may be a BS 105 in the network 100 as discussed above in FIG. 1. A shown, the BS 1100 may include a processor 1102, a memory 1104, an sidelink configuration module 1108, a transceiver 1110 including a modem subsystem 1112 and a RF unit 1114, and one or more antennas 1116. These elements may be coupled with each other and in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 2-3, 4A-4B, and 5-8, 9A-9B, and 10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc.

"Instructions" and "code" may include a single computer-readable statement or many computer-readable statements.

The sidelink configuration module 1108 may be implemented via hardware, software, or combinations thereof. For example, the sidelink configuration module 1108 may be implemented as a processor, circuit, and/or instructions 1106 stored in the memory 1104 and executed by the processor 1102. In some examples, the sidelink configuration module 1108 can be integrated within the modem subsystem 1112. For example, the sidelink configuration module 1108 can be implemented by a combination of software components (e.g., executed by a DSP or a general processor) and hardware components (e.g., logic gates and circuitry) within the modem subsystem 1112.

The sidelink configuration module 1108 may communicate with various components of the BS 1100 to perform various aspects of the present disclosure, for example, aspects of FIGS. 2-3, 4A-4B, and 5-8, 9A-9B, and 10. The sidelink configuration module 1108 is configured to configure UEs (e.g., the UEs 115, 215, and/or 302) with sidelink resource pools for sidelink communications. In some aspects, the sidelink configuration module 1108 may configure the UEs with a beam sweeping resource pool (e.g., the beam sweeping resource pool 808) specific for sidelink beam sweeping, for example, as discussed above in relation to FIG. 8.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, sidelink resource pools configurations) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. This may include, for example, transmission of information to complete attachment to a network and communication with a camped UE 115 according to some aspects of the present disclosure. The antennas 1116 may further receive data messages transmitted from other devices and provide the received data messages for processing and/or demodulation at the transceiver 1110. The transceiver 1110 may provide the demodulated and decoded data to the sidelink configuration module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
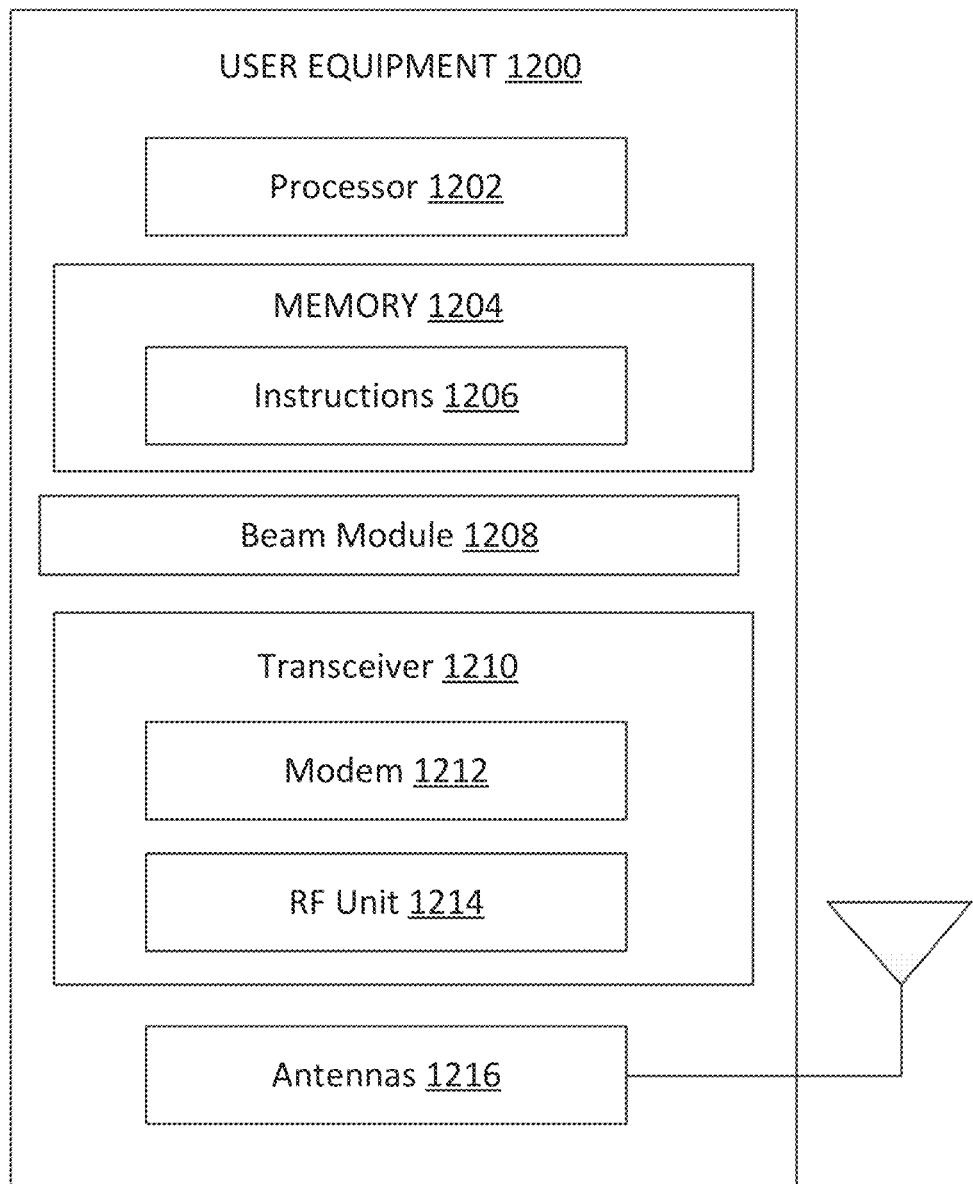
FIG. 12 is a block diagram of an exemplary user equipment (UE) according to some aspects of the present disclosure.

FIG. 12 is a block diagram of an exemplary UE 1200 according to some aspects of the present disclosure. The UE 1200 may be a UE 115 as discussed above with respect to FIG. 1. As shown, the UE 1200 may include a processor 1202, a memory 1204, a beam module 1208, a transceiver 1210 including a modem subsystem 1212 and a radio frequency (RF) unit 1214, and one or more antennas 1216. These elements may be coupled with each other and in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 in connection with aspects of the present disclosure, for example, aspects of FIGS. 2-3, 4A-4B, and 5-8, 9A-9B, and 10. Instructions 1206 may also be referred to as program code, which may be interpreted broadly to include any type of computer-readable statement(s) as discussed above with respect to FIG. 11.

The beam module 1208 may be implemented via hardware, software, or combinations thereof. For example, the beam module 1208 may be implemented as a processor, circuit, and/or instructions 1206 stored in the memory 1204 and executed by the processor 1202. In some examples, the beam module 1208 can be integrated within the modem subsystem 1212. For example, the beam module 1208 can be implemented by a combination of software components (e.g., executed by a DSP or a general processor) and hardware components (e.g., logic gates and circuitry) within the modem subsystem 1212.

The beam module 1208 may communicate with various components of the UE 1200 to perform aspects of the present disclosure, for example, aspects of FIGS. 2-3, 4A-4C, and 5-12. In some aspects, the UE 1200 is a sidelink UE that initiates transmit/receive beam selections. For instance, the beam module 1208 is configured to transmit, to a second UE (e.g., the UE 115, 215, or 302) over a sidelink, a plurality of first beam measurement signals in a plurality of transmit beam directions during a first slot. Each beam measurement signal of the plurality of first beam measurement signals includes at least one of SCI or a CSI-RS. The plurality of transmit beam directions includes at least two different beam directions. In some aspects, the first slot may be similar the sidelink slot 402 of FIGS. 4A-4B, 5-8, and 9A-9B. In some aspects, the plurality of transmit beam directions may be similar to the transmit beams 420, 422, 424, and 426 shown in FIG. 4A or the transmit beams 931-936 shown in FIGS. 9A-9B. In some aspects, the beam module 1208 is further configure to configure or schedule the second UE with the plurality of first beam measurement signals by transmitting, to the second UE, at least one of SCI-1 (e.g., as discussed above in relation to FIG. 5), an SPS configuration (e.g., as discussed above in relation to FIG. 7), a beam sweeping pool configuration (e.g., as discussed above in relation to FIG. 8), or a CSI-RS trigger (e.g., as discussed above in relation to FIG. 9A-9B).

The beam module 1208 is further configured to receive, from the second UE, an indication of a preferred beam direction of the plurality of beam directions, for example, in a PSFCH resource associated with the preferred beam direction. Depending on the beam scheduling and/or configuration mechanism, the PSFCH resource may be based on at least one of the preferred transmit beam direction, an SPS process identifier (ID) (when SPS scheduling is used), a mini-slot resource ID (when a beam sweeping specific resource pool is used), a CSI-RS resource ID (when CSI-RS trigger is used), a source ID (e.g., the first UE's ID), or a destination ID (e.g., the second UE's ID).

The beam module 1208 is further configured to transmit, to the second UE over the sidelink, a plurality of second beam measurement signals in the preferred transmit beam direction to enable the second UE to perform receive beam selection. The beam module 1208 is further configured to transmit data to the second UE in the preferred beam direction after the second UE completes the receive beam selection. The data may include a TB as discussed above in relation to FIG. 3.

In some aspects, the UE 1200 is a sidelink UE that performs transmit/receive beam selections based on a schedule, request, or trigger. For instance, the beam module 1208 is configured to receive, from a second UE (e.g., the UE 115, 215, or 302) over a sidelink, a plurality of first beam measurement signals in a plurality of transmit beam directions during a first slot. Each beam measurement signal of the plurality of first beam measurement signals includes at least one of SCI or a CSI-RS. The plurality of transmit beam directions includes at least two different beam directions. In some aspects, the first slot may be similar the sidelink slot 402 of FIGS. 4A-4B, 5-8, and 9A-9B. In some aspects, the plurality of transmit beam directions may be similar to the transmit beams 420, 422, 424, and 426 shown in FIG. 4A or the transmit beams 931-936 shown in FIGS. 9A-9B. In some aspects, the beam module 1208 is further configure to receive, from second UE, at least one of SCI-1 (e.g., as discussed above in relation to FIG. 5), an SPS configuration (e.g., as discussed above in relation to FIG. 7), a beam sweeping pool configuration (e.g., as discussed above in relation to FIG. 8), or a CSI-RS trigger (e.g., as discussed above in relation to FIGS. 9A-9B).

The beam module 1208 is further configured to determine a preferred transmit beam direction from the plurality of transmit beam directions based on the received first beam measurement signals. For instance, the beam module 1208 is further configured to determine a receive signal measurement (e.g., RSRP, SNR, and/or SINR) for each of the plurality of first beam measurement signals, select a highest receive signal measurement, determine the beam measurement signal that provides the highest receive signal power among the plurality of first beam measurement signals, determine the beam direction where the beam measurement signal with the highest receive signal measurement is receive as the preferred transmit beam direction. The beam module 1208 is further configured to transmit, to the second UE, an indication of a preferred beam direction of the plurality of beam directions, for example, in a PSFCH resource associated with the preferred beam direction. Depending on the beam scheduling and/or configuration mechanism, the PSFCH resource may be based on at least one of the preferred transmit beam direction, an SPS process identifier (ID) (when SPS scheduling is used), a mini-slot resource ID (when a beam sweeping specific resource pool is used), a CSI-RS resource ID (when CSI-RS trigger is used), a source ID (e.g., the first UE's ID), or a destination ID (e.g., the second UE's ID).

The beam module 1208 is further configured to receive, from the second UE over the sidelink, a plurality of second beam measurement signals in the preferred transmit beam direction for receive beam selection. In this regard, the beam module 1208 is configured to sweep through a set of receive beam directions (e.g., the receive beams 410 and 412), using a different receive beam to receive each beam measurement signal of the plurality of second beam measurement signals, determine a receive signal measurement (e.g., RSRPs, SNR, SINR) for each of second beam measurement signals, select a best receive beam direction from the set of receive beam directions based on the receive signal measurements, and select the receive beam direction that provides the highest receive signal measurement as the preferred receive beam direction. The beam module 1208 is further configured to receive data from the second UE in the preferred beam direction after the second UE completes the receive beam selection. The data may include a TB as discussed above in relation to FIG. 3.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the beam module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., PSCCH, PSSCH, SCI-1, SCI-2, sidelink data, SPS configuration, beam sweeping pool configuration, CSI-RS triggers) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configurations, PSCCH, PSSCH, SCI-1, SCI-2, sidelink data, SPS configuration, beam sweeping pool configuration, CSI-RS triggers) to the beam module 1208 for processing. The antennas 1216 may include multiple antennas of similar or different designs in order to sustain multiple transmission links. The RF unit 1214 may configure the antennas 1216.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
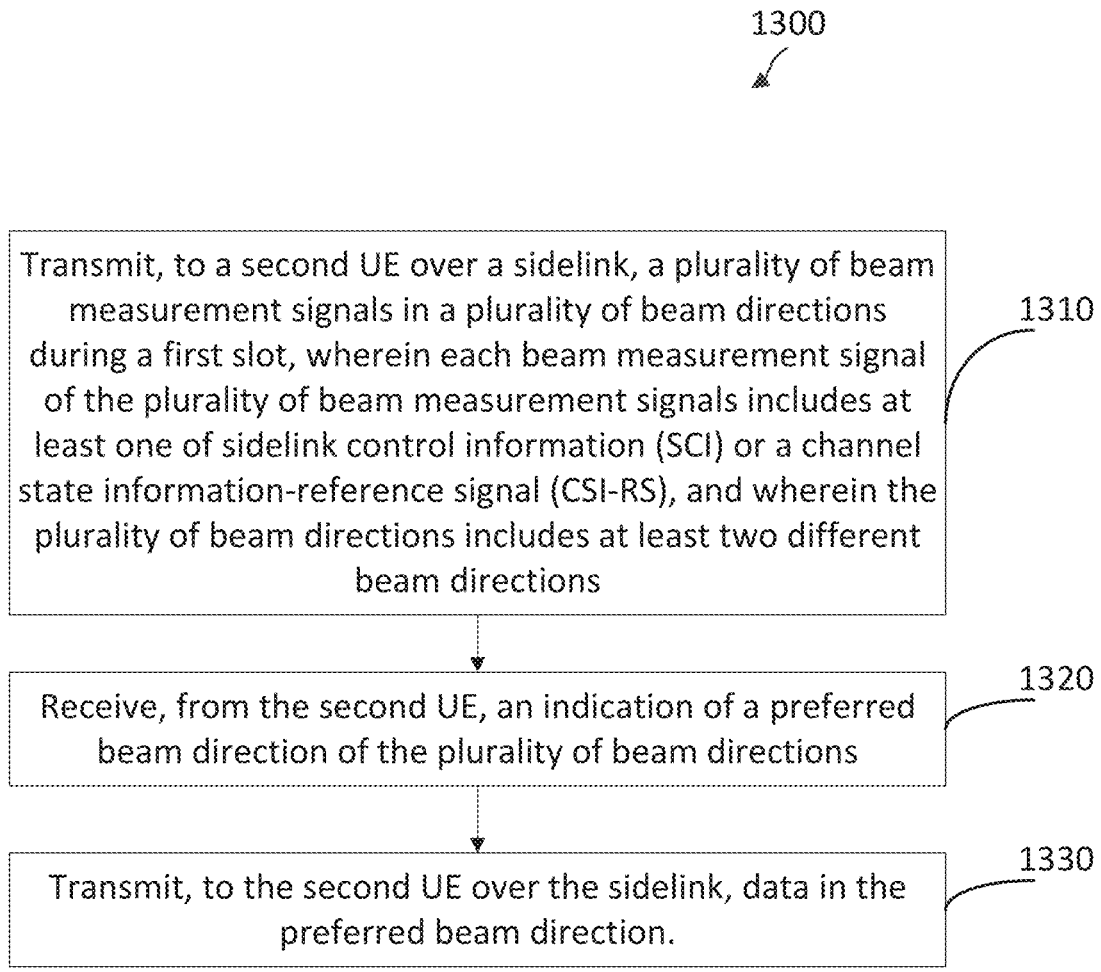
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115, 215, 302, or 1200 may utilize one or more components, such as the processor 1202, the memory 1204, the beam module 1208, the transceiver 1210, the modem 1212, and the one or more antennas 1216, to execute the steps of method 1300. The method 1300 may employ similar mechanisms as described above in FIGS. 2-3, 4A-4B, 5-8, 9A-9B, and 10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a first UE (e.g., the UE 115, 215, 302, or 1200) transmits, to a second UE over a sidelink, a plurality of beam measurement signals in a plurality of beam directions during a first slot. Each beam measurement signal of the plurality of beam measurement signals includes at least one of SCI or a CSI-RS. The plurality of beam directions includes at least two different beam directions. In some aspects, the first slot may be similar the sidelink slot 402 of FIGS. 4A-4B, 5-8, and 9A-9B. In some aspects, the plurality of beam directions may be similar to the transmit beams 420, 422, 424, and 426 shown in FIG. 4A or the transmit beams 931-936 shown in FIGS. 9A-9B. In some instances, the first UE may utilize one or more components, such as the processor 1202, the memory 1204, the beam module 1208, the transceiver 1210, the modem 1212, and/or the one or more antennas 1216, to perform the operations at block 1310.

In some aspects, the first UE may transmit a first beam measurement signal of the plurality of beam measurement signals during a first period within the first slot in a first beam direction of the plurality of beam directions, and transmit a second beam measurement signal of the plurality of beam measurement signals during a second period within the first slot in a second beam direction of the plurality of beam directions. The second period may be adjacent to the first period. In some instances, the first beam direction may be the same as the second beam direction. In some other instances, the first beam direction is different from the second beam direction.

In some aspects, the first UE may transmit a first beam measurement signal of the plurality of beam measurement signals in a first subchannel using a first beam direction of the plurality of beam directions, and may transmit a second beam measurement signal of the plurality of beam measurement signals in second subchannel using a second beam direction of the plurality of beam directions, where the second subchannel is different from the first subchannel, for example, as shown in FIG. 4A.

In some aspects, the first UE may transmit the plurality of beam measurement signals as discussed above in FIGS. 5-8. The first UE may transmit the first beam measurement signal including at least one of first SCI-2 (e.g., beam sweeping SCI-2 510, 520, 530, 640, 710, 720, 730, 810, 820, or 830) or a reference signal (e.g., a DMRS) in a PSSCH. Similarly, the first UE may transmit the second beam measurement signal including at least one of second SCI-2 (e.g., beam sweeping SCI-2 510, 520, 530, 640, 710, 720, 730, 810, 820, or 830) or a reference signal (e.g., a DMRS) in a PSSCH. In some aspects, the first SCI and the second SCI may be have same content. In some aspects, the first UE may further multiplex the first beam measurement signal with SCI-1 in a PSCCH during the first period and/or multiplex the first beam measurement signal with SCI-1 in a PSCCH during the second period. In some aspects, the first UE may transmit each beam measurement signal of the plurality of beam measurement signals in one of consecutive periods within the first slot, where each beam measurement signal includes SCI-2 (e.g., beam sweeping SCI-2 510, 520, 530, 640, 710, 720, 730, 810, 820, or 830).

In some aspects, the first UE transmit each beam measurement signal of the plurality of beam measurement signals in one of a plurality of resources time-multiplexed within the first slot, each beam measurement signal including the CSI-RS (e.g., the CSI-RSs 910, 912, 914, 916, 918, 920 of discussed above in relation to FIGS. 9A-9B).

At block 1320, the first UE receive, from the second UE, an indication of a preferred beam direction of the plurality of beam directions. In some aspects, the first UE may receive the indication of the preferred beam direction in a PSFCH of the first slot. In some aspects, the first UE may receive the indication of the preferred beam direction in a PSFCH of a second slot different from the first slot. In some instances, the first UE may utilize one or more components, such as the processor 1202, the memory 1204, the beam module 1208, the transceiver 1210, the modem 1212, and/or the one or more antennas 1216, to perform the operations at block 1320.

In some aspects, the first UE may receive the indication of the preferred beam direction in a first resource of a plurality of resources in the PSFCH. In some aspects, the first resource may be based on the SCI-2 in the beam measurement signal of the preferred beam direction as discussed above in relation to FIG. 5. In some aspects, the first resource may be based on at least one of an SPS process ID, a source ID, or a destination ID discussed above in relation to FIG. 7. In some aspects, the first resource may be based on at least one of a mini-slot resource ID, a source ID, or a destination ID discussed above in relation to FIG. 8. In some aspects, the first resource may be based on at least one of a CSI-RS resource ID, a source ID, or a destination ID discussed above in relation to FIGS. 9A-9B. 28. In some aspects, the first UE may receive the indication of the preferred beam direction in the PSFCH based on an on-off keying modulation.

At block 1330, the first UE transmit, to the second UE over the sidelink, data in the preferred beam direction. The data may include a TB as discussed above in relation to FIG. 3. In some instances, the first UE may utilize one or more components, such as the processor 1202, the memory 1204, the beam module 1208, the transceiver 1210, the modem 1212, and/or the one or more antennas 1216, to perform the operations at block 1330.

In some aspects, the first UE may further transmit SCI-1 including beam sweep scheduling information for the plurality of beam measurement signals to the second UE via a PSSCH within the first slot as discussed above in relation to FIG. 5.

In some aspects, the first UE may further transmit an SPS configuration indicating a set of SPS processes to the second UE, where each SPS process of the set of SPS processes is associated with one of a set of consecutive mini-slots within the first slot and a QCL association with a different beam direction of the plurality of beam directions, and each mini-slot of the set of consecutive mini-slots corresponds to one of the consecutive periods as discussed above in relation to FIG. 7. The SPS configuration may also indicate a periodicity for the set of SPS processes.

In some aspects, the first UE may transmit a configuration indicating a beam sweeping resource pool including a set of consecutive mini-slots within the first slot, wherein each mini-slot of the set of consecutive mini-slots corresponds to one of the consecutive periods and a QCL association with a different beam direction of the plurality of beam directions as discussed above in relation to FIG. 8.

In some aspects, the first UE may transmit a CSI-RS trigger for the plurality of beam measurement signals in the first slot to the second UE during the first slot in a first beam direction including at least the plurality of beam directions as discussed above in relation to FIGS. 9A-9B. In some aspects, the first UE may transmit the CSI-RS trigger in at least one of SCI-1 via a PSCCH or SCI-2 via a PSSCH. In some aspects, the CSI-RS trigger may indicate each of the plurality of resources being associated with a different beam direction of the plurality of beam directions. In some aspects, the CSI-RS trigger may be destined for a group of UEs including the second UE.

Figure 14:
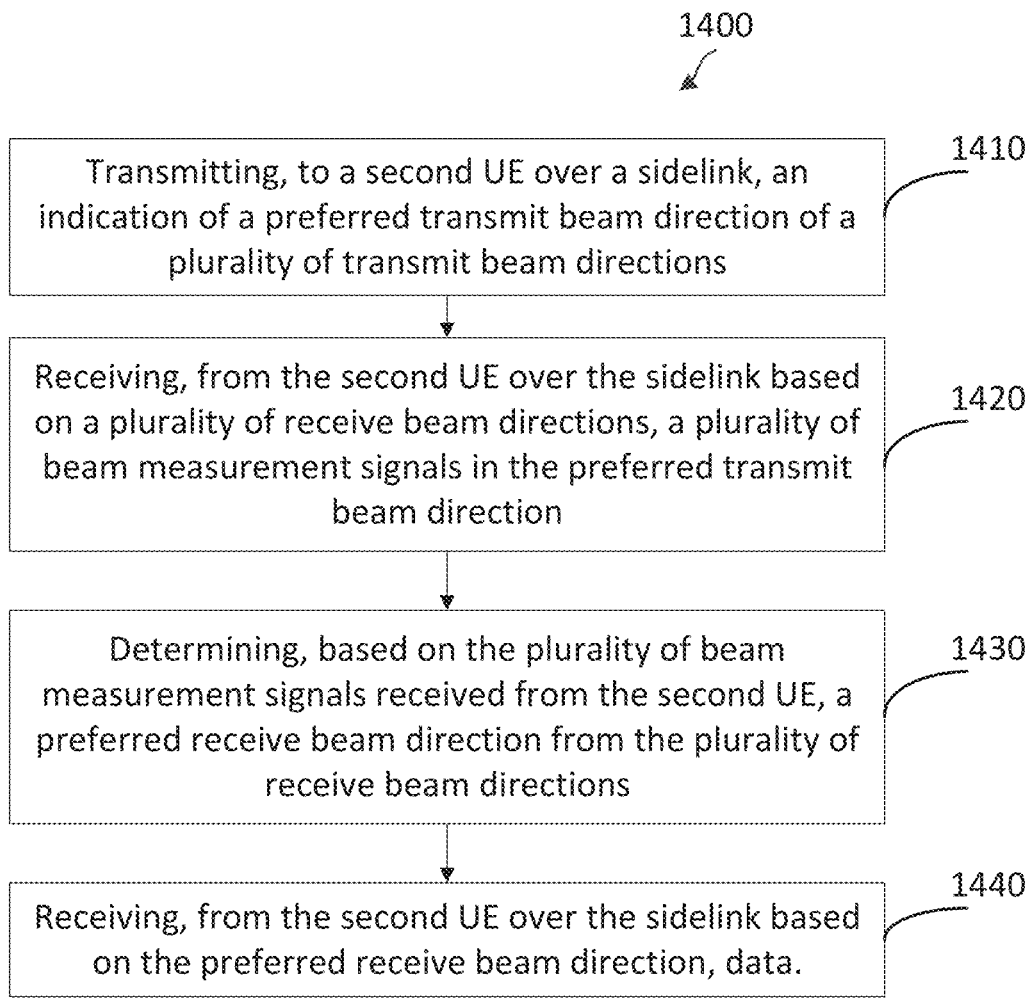
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115, 215, 302, or 1200 may utilize one or more components, such as the processor 1202, the memory 1204, the beam module 1208, the transceiver 1210, the modem 1212, and the one or more antennas 1216, to execute the steps of method 1400. The method 1400 may employ similar mechanisms as described above in FIGS. 2-3, 4A-4B, 5-8, 9A-9B, and 10. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first UE (e.g., the UE 115, 215, 302, or 1200) transmits, to a second UE (e.g., the UE 115, 215, 302, or 1200) over a sidelink, an indication of a preferred transmit beam direction of a plurality of transmit beam directions. In some aspects, the plurality of transmit beam directions may be similar to the transmit beams 420, 422, 424, and 426 shown in FIG. 4A or the transmit beams 931-936 shown in FIGS. 9A-9B. In some aspects, the first UE may transmit the indication in a PSFCH as discussed above in relation to FIGS. 4A, 5-8, and 9A-9B. In some instances, the first UE may utilize one or more components, such as the processor 1202, the memory 1204, the beam module 1208, the transceiver 1210, the modem 1212, and/or the one or more antennas 1216, to perform the operations at block 1410.

At block 1420, the first UE receives, from the second UE over the sidelink based on a plurality of receive beam directions, a plurality of beam measurement signals in the preferred transmit beam direction. In some aspects, the plurality of receive beam directions may be similar to the receive beams 410 and 420 shown in FIG. 4A. In some instances, the first UE may utilize one or more components, such as the processor 1202, the memory 1204, the beam module 1208, the transceiver 1210, the modem 1212, and/or the one or more antennas 1216, to perform the operations at block 1420.

In some aspects, the first UE may receive a first beam measurement signal of the plurality of beam measurement signals based on a first receive beam direction of the plurality of receive beam directions, and receive a second beam measurement signal of the plurality of beam measurement signals based on a second receive beam direction of the plurality of receive beam direction. In some aspects, the first UE may receive the first beam measurement signal during a first period, and receive the second beam measurement signal during a second period. In some aspects, the first period and the second period are in different slots. In some other aspects, the first period and the second period are adjacent periods within a slot.

In some aspects, the first UE may receive each beam measurement signal including at least one of SCI-2 (e.g., beam sweeping SCI-2 510, 520, 530, 640, 710, 720, 730, 810, 820, or 830) or a reference signal (e.g., a DMRS) during each period as discussed above in relation to FIGS. 4A and 5-8. In some aspects, the first UE may receive each beam measurement signal including a CSI-RS (e.g., the CSI-RSs 910, 912, 914, 916, 918, 920) during each period as discussed above in relation to FIGS. 9A-9B.

At block 1430, the first UE determines, based on the plurality of beam measurement signals received from the second UE, a preferred receive beam direction from a plurality of receive beam directions. For instance, the first UE may determine a receive signal measurement (e.g., RSRP, SNR, SINR) for each of the received beam measurement signals. The UE 302b may select a best beam from the plurality of transmit beam directions based on the receive signal measurements. In this regard, the first UE may determine the beam measurement signal that provides the highest receive signal power among the plurality of beam measurement signals. The first UE may determine the beam direction where the beam measurement signal with the highest receive signal measurement is receive as the preferred transmit beam direction. In some instances, the first UE may utilize one or more components, such as the processor 1202, the memory 1204, the beam module 1208, the transceiver 1210, the modem 1212, and/or the one or more antennas 1216, to perform the operations at block 1430.

In some aspects, as part of determining the preferred receive beam direction, the first may determine a receive power for a first beam measurement signal of the plurality of beam measurement signals satisfies a threshold, and refrain from monitoring for a further beam measurement signal in the slot based on the receive power for the first beam measurement signal satisfying the threshold.

At block 1440, the first UE receives, from the second UE over the sidelink based on the preferred receive beam direction, data. The data may include a TB as discussed above in relation to FIG. 3. In some instances, the first UE may utilize one or more components, such as the processor 1202, the memory 1204, the beam module 1208, the transceiver 1210, the modem 1212, and/or the one or more antennas 1216, to perform the operations at block 1440.

In some aspects, the first UE may further receive, from the second UE in a PSSCH within the slot, SCI-2 indicating a trigger, and the determining the preferred receive beam direction at block 1430 is further based on the trigger.

Figure 15:
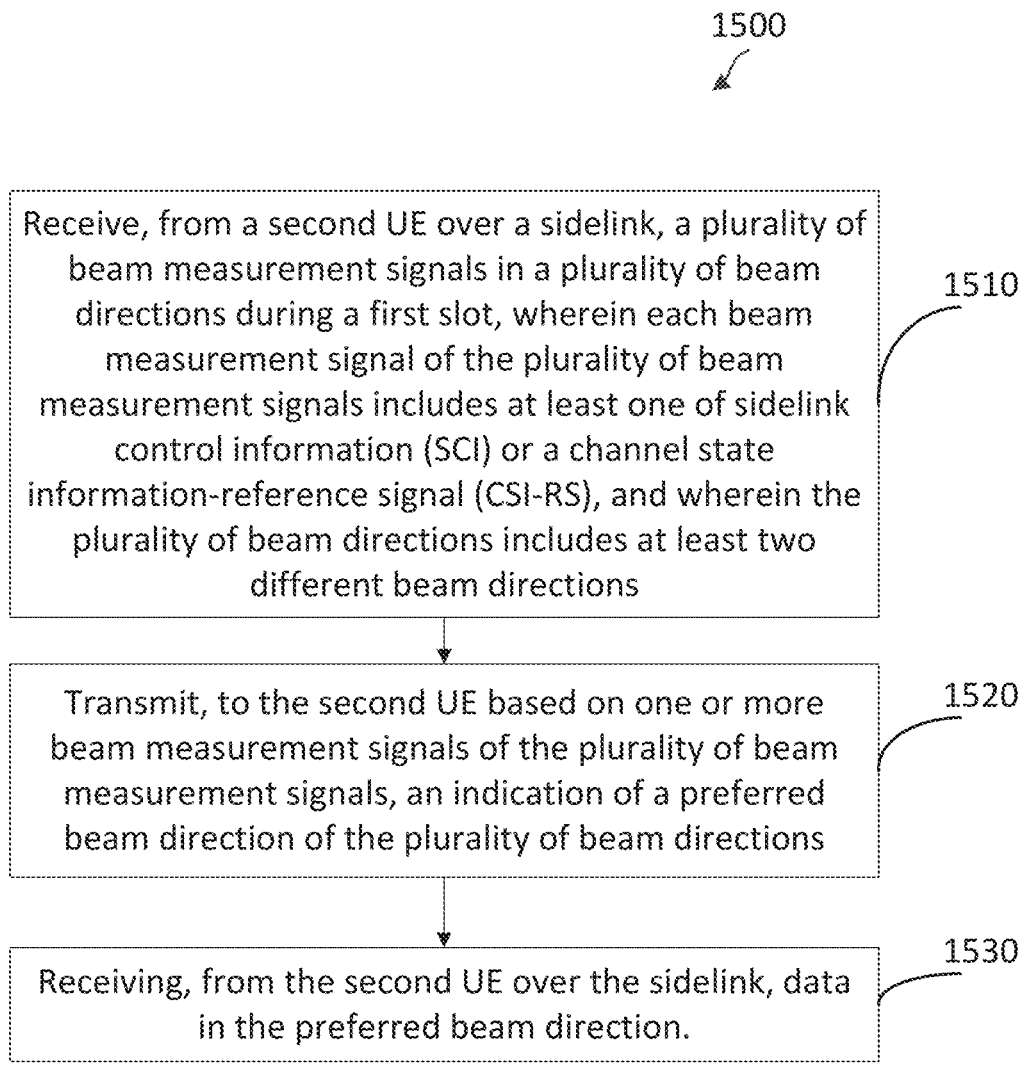
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115, 215, 302, or 1200 may utilize one or more components, such as the processor 1202, the memory 1204, the beam module 1208, the transceiver 1210, the modem 1212, and the one or more antennas 1216, to execute the steps of method 1500. The method 1500 may employ similar mechanisms as described above in FIGS. 2-3, 4A-4B, 5-8, 9A-9B, and 10. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a first UE (e.g., the UE 115, 215, 302, or 1200) receives, from a second UE (e.g., the UE 115, 215, 302, or 1200) over a sidelink, a plurality of beam measurement signals in a plurality of beam directions during a first slot. Each beam measurement signal of the plurality of beam measurement signals includes at least one of SCI or a CSI-RS. The plurality of beam directions includes at least two different beam directions. In some aspects, the first slot may be similar the sidelink slot 402 of FIGS. 4A-4B, 5-8, and 9A-9B. In some aspects, the plurality of beam directions may be similar to the receive beams 410 and 412 shown in FIG. 4A or the receive beams 931-936 shown in FIGS. 9A-9B. In some instances, the first UE may utilize one or more components, such as the processor 1202, the memory 1204, the beam module 1208, the transceiver 1210, the modem 1212, and/or the one or more antennas 1216, to perform the operations at block 1510.

In some aspects, the first UE may receive a first beam measurement signal of the plurality of beam measurement signals during a first period within the first slot in a first beam direction of the plurality of beam directions, and receive a second beam measurement signal of the plurality of beam measurement signals during a second period within the first slot in a second beam direction of the plurality of beam directions. The second period may be adjacent to the first period. In some instances, the first beam direction may be the same as the second beam direction. In some other instances, the first beam direction is different from the second beam direction.

In some aspects, the first UE may receive a first beam measurement signal of the plurality of beam measurement signals in a first subchannel using a first beam direction of the plurality of beam directions, and may receive a second beam measurement signal of the plurality of beam measurement signals in second subchannel using a second beam direction of the plurality of beam directions, where the second subchannel is different from the first subchannel, for example, as shown in FIG. 4A.

In some aspects, the first UE may receive the plurality of beam measurement signals as discussed above in FIGS. 5-8.

The first UE may receive the first beam measurement signal including at least one of first SCI-2 (e.g., beam sweeping SCI-2 510, 520, 530, 640, 710, 720, 730, 810, 820, or 830) or a reference signal (e.g., a DMRS) in a PSSCH. Similarly, the first UE may receive the second beam measurement signal including at least one of second SCI-2 (e.g., beam sweeping SCI-2 510, 520, 530, 640, 710, 720, 730, 810, 820, or 830) or a reference signal (e.g., a DMRS) in a PSSCH. In some aspects, the first SCI and the second SCI may be have same content. In some aspects, the first UE may further multiplex the first beam measurement signal with SCI-1 in a PSCCH during the first period and/or multiplex the first beam measurement signal with SCI-1 in a PSCCH during the second period. In some aspects, the first UE may receive each beam measurement signal of the plurality of beam measurement signals in one of consecutive periods within the first slot, where each beam measurement signal includes SCI-2 (e.g., beam sweeping SCI-2 510, 520, 530, 640, 710, 720, 730, 810, 820, or 830).

In some aspects, the first UE receive each beam measurement signal of the plurality of beam measurement signals in one of a plurality of resources time-multiplexed within the first slot, each beam measurement signal including the CSI-RS (e.g., the CSI-RSs 910, 912, 916, 916, 918, 920 of discussed above in relation to FIGS. 9A-9B).

At block 1520, the first UE transmit, to the second UE, an indication of a preferred beam direction of the plurality of beam directions. In some aspects, the first UE may transmit the indication of the preferred beam direction in a PSFCH of the first slot. In some aspects, the first UE may transmit the indication of the preferred beam direction in a PSFCH of a second slot different from the first slot. In some instances, the first UE may utilize one or more components, such as the processor 1202, the memory 1204, the beam module 1208, the transceiver 1210, the modem 1212, and/or the one or more antennas 1216, to perform the operations at block 1520.

In some aspects, the first UE may transmit the indication of the preferred beam direction in a first resource of a plurality of resources in the PSFCH. In some aspects, the first resource may be based on the SCI-2 in the beam measurement signal of the preferred beam direction as discussed above in relation to FIG. 5. In some aspects, the first resource may be based on at least one of an SPS process ID, a source ID, or a destination ID discussed above in relation to FIG. 7. In some aspects, the first resource may be based on at least one of a mini-slot resource ID, a source ID, or a destination ID discussed above in relation to FIG. 8. In some aspects, the first resource may be based on at least one of a CSI-RS resource ID, a source ID, or a destination ID discussed above in relation to FIGS. 9A-9B. In some aspects, the first UE may transmit the indication of the preferred beam direction in the PSFCH based on an on-off keying modulation.

At block 1530, the first UE receive, from the second UE over the sidelink, data in the preferred beam direction. The data may include a TB as discussed above in relation to FIG. 3. In some instances, the first UE may utilize one or more components, such as the processor 1202, the memory 1204, the beam module 1208, the transceiver 1210, the modem 1212, and/or the one or more antennas 1216, to perform the operations at block 1530.

In some aspects, the first UE may further receive SCI-1 including beam sweep scheduling information for the plurality of beam measurement signals from the second UE via a PSSCH within the first slot as discussed above in relation to FIG. 5.

In some aspects, the first UE may further receive an SPS configuration indicating a set of SPS processes from the second UE, where each SPS process of the set of SPS processes is associated with one of a set of consecutive mini-slots within the first slot and a QCL association with a different beam direction of the plurality of beam directions, and each mini-slot of the set of consecutive mini-slots corresponds to one of the consecutive periods as discussed above in relation to FIG. 7. The SPS configuration may also indicate a periodicity for the set of SPS processes.

In some aspects, the first UE may receive a configuration indicating a beam sweeping resource pool including a set of consecutive mini-slots within the first slot, wherein each mini-slot of the set of consecutive mini-slots corresponds to one of the consecutive periods and a QCL association with a different beam direction of the plurality of beam directions as discussed above in relation to FIG. 8.

In some aspects, the first UE may receive a CSI-RS trigger for the plurality of beam measurement signals in the first slot from the second UE during the first slot in a first beam direction including at least the plurality of beam directions as discussed above in relation to FIGS. 9A-9B. In some aspects, the first UE may receive the CSI-RS trigger in at least one of SCI-1 via a PSCCH or SCI-2 via a PSSCH. In some aspects, the CSI-RS trigger may indicate each of the plurality of resources being associated with a different beam direction of the plurality of beam directions. In some aspects, the CSI-RS trigger may be destined for a group of UEs including the second UE.

In some aspects, the first UE may determine the preferred receive beam direction from the plurality of receive beam directions based on one or more of the plurality of beam measurement signals. In some aspects, as part of determining the preferred receive beam direction, the first UE may determine a receive signal measurement for a first beam measurement signal of the plurality of beam measurement signals satisfies a threshold, and may refrain from monitoring for a further beam measurement signal in the slot based on the receive signal measurement for the first beam measurement signal satisfying the threshold.

Figure 16:
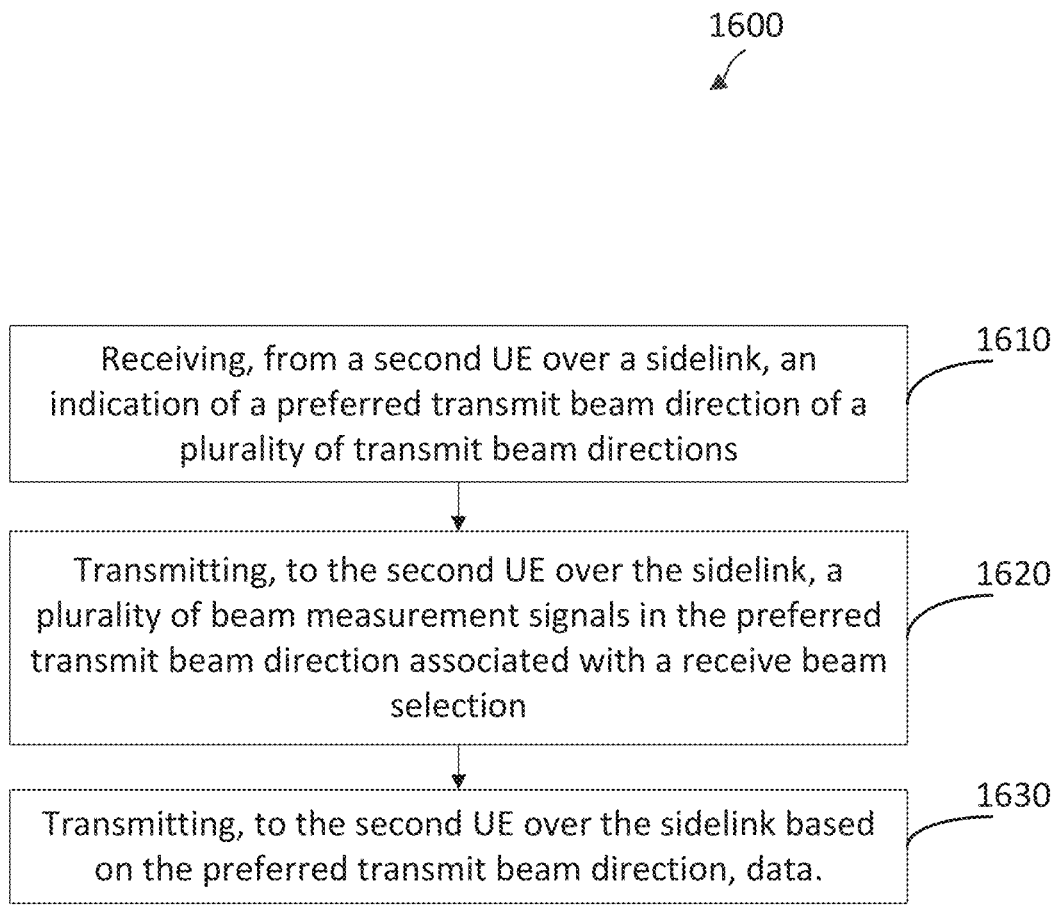
FIG. 16 is a flow diagram of a wireless communication method according to some aspects of the present disclosure.

FIG. 16 is a flow diagram of a wireless communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as the UEs 115, 215, 302, or 1200 may utilize one or more components, such as the processor 1202, the memory 1204, the beam module 1208, the transceiver 1210, the modem 1212, and the one or more antennas 1216, to execute the steps of method 1600. The method 1600 may employ similar mechanisms as described above in FIGS. 2-3, 4A-4B, 5-8, 9A-9B, and 10. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a first UE (e.g., the UE 115, 215, 302, or 1200) receives, from a second UE (e.g., the UE 115, 215, 302, or 1200) over a sidelink, an indication of a preferred receive beam direction of a plurality of receive beam directions. In some aspects, the plurality of receive beam directions may be similar to the receive beams 410 and 412 shown in FIG. 4A or the receive beams 931-936 shown in FIGS. 9A-9B. In some aspects, the first UE may receive the indication in a PSFCH as discussed above in relation to FIGS. 4A, 5-8, and 9A-9B. In some instances, the first UE may utilize one or more components, such as the processor 1202, the memory 1204, the beam module 1208, the transceiver 1210, the modem 1212, and/or the one or more antennas 1216, to perform the operations at block 1610.

At block 1620, the first UE transmits, to the second UE over the sidelink based on a plurality of transmit beam directions, a plurality of beam measurement signals in the preferred receive beam direction. In some aspects, the plurality of transmit beam directions may be similar to the transmit beams 410 and 420 shown in FIG. 4A. In some instances, the first UE may utilize one or more components, such as the processor 1202, the memory 1204, the beam module 1208, the transceiver 1210, the modem 1212, and/or the one or more antennas 1216, to perform the operations at block 1620.

In some aspects, the first UE may transmit a first beam measurement signal of the plurality of beam measurement signals based on a first transmit beam direction of the plurality of transmit beam directions, and transmit a second beam measurement signal of the plurality of beam measurement signals based on a second transmit beam direction of the plurality of transmit beam directions. In some aspects, the first UE may transmit the first beam measurement signal during a first period, and transmit the second beam measurement signal during a second period. In some aspects, the first period and the second period are in different slots. In some other aspects, the first period and the second period are adjacent periods within a slot.

In some aspects, the first UE may transmit each beam measurement signal including at least one of SCI-2 (e.g., beam sweeping SCI-2 510, 520, 530, 640, 710, 720, 730, 810, 820, or 830) or a reference signal (e.g., a DMRS) during each period as discussed above in relation to FIGS. 4A and 5-8. In some aspects, the first UE may transmit each beam measurement signal including a CSI-RS (e.g., the CSI-RSs 910, 912, 916, 916, 918, 920) during each period as discussed above in relation to FIGS. 9A-9B.

At block 1630, the first UE transmits, to the second UE over the sidelink based on the preferred transmit beam direction, data. The data may include a TB as discussed above in relation to FIG. 3. In some instances, the first UE may utilize one or more components, such as the processor 1202, the memory 1204, the beam module 1208, the transceiver 1210, the modem 1212, and/or the one or more antennas 1216, to perform the operations at block 1630.

In some aspects, the first UE may further transmit, to the second UE in a PSSCH within the slot, SCI-2 indicating a trigger, and the determining the preferred transmit beam direction at block 1630 is further based on the trigger.

Further aspects of the present disclosure are provided below.

Aspect 1 includes method of wireless communication performed by a first user equipment (UE), comprising transmitting, to a second UE over a sidelink, a plurality of beam measurement signals in a plurality of beam directions during a first slot, wherein each beam measurement signal of the plurality of beam measurement signals includes at least one of sidelink control information (SCI) or a channel state information-reference signal (CSI-RS), and wherein the plurality of beam directions includes at least two different beam directions; receiving, from the second UE, an indication of a preferred beam direction of the plurality of beam directions; and transmitting, to the second UE over the sidelink, data in the preferred beam direction.

Aspect 2 includes the method of aspect 1, wherein the transmitting the plurality of beam measurement signals comprises transmitting, to the second UE during a first period within the first slot in a first beam direction of the plurality of beam directions, a first beam measurement signal of the plurality of beam measurement signals; and transmitting, to the second UE during a second period within the first slot in a second beam direction of the plurality of beam directions, a second beam measurement signal of the plurality of beam measurement signals, wherein the second period is adjacent to the first period.

Aspect 3 includes the method of aspect 2, wherein the first beam direction is different from the second beam direction.

Aspect 4 includes the method of aspect 2, wherein the first beam direction is the same as the second beam direction.

Aspect 5 includes the method of aspect 2, wherein the transmitting the first beam measurement signal further includes transmitting, to the second UE in a physical sidelink shared channel (PSSCH) within the first period, first sidelink control information part 2 (SCI-2).

Aspect 6 includes the method of aspect 5, wherein the transmitting the first beam measurement signal further includes transmitting, to the second UE, a reference signal, wherein the first SCI-2 is rate-matched around the reference signal.

Aspect 7 includes the method of aspect 6, further comprising transmitting, to the second UE during the first period, sidelink control information part 1 (SCI-1) in a physical sidelink control channel (PSCCH) multiplexed with SCI-2 and the reference signal in the PSSCH.

Aspect 8 includes the method of aspect 7, wherein the transmitting the plurality of beam measurement signals further comprises transmitting, to the second UE in the PSSCH within the second period, the second beam measurement signal including second SCI-2, wherein the second period does not include any PSCCH.

Aspect 9 includes the method of aspect 8, wherein the first SCI-2 and the second SCI-2 include the same content.

Aspect 10 includes the method of aspect 1, wherein the transmitting the plurality of beam measurement signals further comprises transmitting, to the second UE, each beam measurement signal of the plurality of beam measurement signals in one of consecutive periods within the first slot, wherein each beam measurement signal includes sidelink control information part 2 (SCI-2).

Aspect 11 includes the method of aspect 1, wherein the receiving the indication of the preferred beam direction comprises receiving, from the second UE in a physical sidelink feedback channel (PSFCH) within the first slot, the indication of the preferred beam direction.

Aspect 12 includes the method of aspect 1, wherein the receiving the indication of the preferred beam direction comprises receiving, from the second UE in a physical sidelink feedback channel (PSFCH) within a second slot different from the first slot, the indication of the preferred beam direction.

Aspect 13 includes the method of any of aspects 1-12, further comprising transmitting, to the second UE in a physical sidelink control channel (PSCCH) within the first slot, SCI part 1 (SCI-1) including beam sweep scheduling information for the plurality of beam measurement signals.

Aspect 14 includes the method of aspect 13, wherein the receiving the indication of the preferred beam direction further comprises receiving, from the second UE in a first resource of a plurality of resources in the PSFCH, the indication of the preferred beam direction, the first resource being based on the SCI-2 in the beam measurement signal of the preferred beam direction.

Aspect 15 includes the method of any of aspects 1-12, further comprising transmitting, to the second UE, a semi-persistent scheduling (SPS) configuration indicating a set of SPS processes, wherein each SPS process of the set of SPS processes is associated with one of a set of consecutive mini-slots within the first slot and a quasi-colocation (QCL) association with a different beam direction of the plurality of beam directions, and wherein each mini-slot of the set of consecutive mini-slots corresponds to one of the consecutive periods.

Aspect 16 includes the method of aspect 15, wherein the transmitting the SPS configuration comprises transmitting, to the second UE, the SPS configuration indicating a periodicity for the set of SPS processes.

Aspect 17 includes the method of aspect 15, wherein the transmitting the plurality of beam measurement signals comprises transmitting, to the second UE based on a first SPS process of the set of SPS processes, a first beam measurement signal of the plurality of beam measurement signals in a first beam direction of the plurality of beam directions, the first beam direction corresponding to the preferred beam direction; and the receiving the indication of the preferred beam direction further comprises receiving, from the second UE in a first resource of a plurality of resources in the PSFCH, the indication of the preferred beam direction, the first resource being based on at least one of a SPS process ID for the first SPS process, a source ID associated with the first UE, or a destination ID associated with the second UE.

Aspect 18 includes the method of aspect 17, wherein the transmitting the plurality of beam measurement signals further comprises transmitting, to the second UE, the first beam measurement signal including information for selecting the first resource from the plurality of resources in the PSFCH, the information being associated with the at least one of the SPS process ID, the source ID, or the destination ID.

Aspect 19 includes the method of aspect 17, wherein the transmitting the plurality of beam measurement signals further comprises transmitting, to the second UE, the first beam measurement signal including SCI part 2 (SCI-2) indicating the information for selecting the first resource from the plurality of resources in the PSFCH.

Aspect 20 includes the method of any of aspects 1-12, further comprising transmitting, to the second UE, a configuration indicating a beam sweeping resource pool including a set of consecutive mini-slots within the first slot, wherein each mini-slot of the set of consecutive mini-slots corresponds to one of the consecutive periods and a quasi-colocation (QCL) association with a different beam direction of the plurality of beam directions.

Aspect 21 includes the method of any of aspects 1, 11, or 12, wherein the transmitting the plurality of beam measurement signals further comprises transmitting, to the second UE, each beam measurement signal of the plurality of beam measurement signals in one of a plurality of resources time-multiplexed within the first slot, each beam measurement signal including the CSI-RS.

Aspect 22 includes the method of aspect 21, wherein each resource is in a different symbol of the first slot.

Aspect 23 includes the method of aspect 21, further comprising transmitting, to the second UE during the first slot in a first beam direction including at least the plurality of beam directions, a CSI-RS trigger for the plurality of beam measurement signals in the first slot.

Aspect 24 includes the method of aspect 23, wherein the transmitting the CSI-RS trigger comprises at least one of transmitting, to the second UE in a physical sidelink control channel (PSCCH), sidelink control information part 1 (SCI-1) including the CSI-RS trigger; or transmitting, to the second UE in a physical sidelink control channel (PSSCH), sidelink control information part 2 (SCI-2) including the CSI-RS trigger.

Aspect 25 includes the method of aspect 23, wherein the transmitting the CSI-RS trigger comprises transmitting, to the second UE, the CSI trigger indicating each of the plurality of resources associated with a different beam direction of the plurality of beam directions.

Aspect 26 includes the method of aspect 23, wherein the transmitting the CSI-RS trigger further comprises transmitting, to a group of UEs including the second UE, the CSI-RS trigger.

Aspect 27 includes the method of aspect 21, wherein the receiving further comprises receiving, from the second UE in a first resource of a plurality of resources within the PSFCH, the indication of the preferred beam direction, the first resource being based on at least one of a cyclic-shift, a source ID associated with the first UE, or a destination ID associated with the second UE.

Aspect 28 includes the method of aspect 27, wherein the receiving further comprises receiving, from the second UE in the PSFCH based on an on-off keying modulation, the indication of the preferred beam direction.

Aspect 29 includes the method of aspect 1, wherein the transmitting the plurality of beam measurement signals comprises transmitting, to the second UE in a first subchannel and in a first beam direction of the plurality of beam directions, a first beam measurement signal of the plurality of beam measurement signals; and transmitting, to the second UE in a second subchannel and in a second beam direction of the plurality of beam directions, a second beam measurement signal of the plurality of beam measurement signals, wherein the second subchannel is different from the first subchannel.

Aspect 30 includes a method of wireless communication performed by a first user equipment (UE), comprising transmitting, to a second UE over a sidelink, an indication of a preferred transmit beam direction of a plurality of transmit beam directions; receiving, from the second UE over the sidelink based on a plurality of receive beam directions, a plurality of beam measurement signals in the preferred transmit beam direction; determining, based on the plurality of beam measurement signals received from the second UE, a preferred receive beam direction from the plurality of receive beam directions; and receiving, from the second UE over the sidelink based on the preferred receive beam direction, data.

Aspect 31 includes the method of aspect 30, wherein the receiving the plurality of beam measurement signals comprises receiving, from the second UE based on a first receive beam direction of the plurality of receive beam directions, a first beam measurement signal of the plurality of beam measurement signals; and receiving, from the second UE based on a second receive beam direction of the plurality of receive beam direction, a second beam measurement signal of the plurality of beam measurement signals.

Aspect 32 includes the method of aspect 31, wherein the receiving the plurality of beam measurement signals further comprises receiving, from the second UE during a first period, the first beam measurement signal; and receiving, from the second UE during a second period, the second beam measurement signal.

Aspect 33 includes the method of aspect 32, wherein the first period and the second period are in different slots.

Aspect 34 includes the method of aspect 32, wherein the first period and the second period are adjacent periods within a slot.

Aspect 35 includes the method of aspect 34, wherein the determining the preferred receive beam direction comprises determining a receive power for a first beam measurement signal of the plurality of beam measurement signals satisfies a threshold; and refraining, based on the receive power for the first beam measurement signal satisfying the threshold, from monitoring for a further beam measurement signal in the slot.

Aspect 36 includes the method of aspect 30, wherein the receiving the plurality of beam measurement signals comprises receiving, from the second UE in a physical sidelink shared channel (PSSCH) within each period, each beam measurement signal including at least one of sidelink control information part 2 (SCI-2) or a reference signal.

Aspect 37 includes the method of aspect 30, wherein the receiving the plurality of beam measurement signals comprises receiving, from the second UE during each period, each beam measurement signal including a channel state information-reference signal (CSI-RS).

Aspect 38 includes the method of any of aspects 35-36, further comprising receiving, from the second UE during a physical sidelink shared channel (PSSCH) within the slot, sidelink control information part 2 (SCI-2) indicating a trigger, wherein the determining the preferred receive beam direction is further based on the trigger.

Aspect 39 includes a method of wireless communication performed by a first user equipment (UE), comprising receiving, from a second UE over a sidelink, a plurality of beam measurement signals in a plurality of beam directions during a first slot, wherein each beam measurement signal of the plurality of beam measurement signals includes at least one of sidelink control information (SCI) or a channel state information-reference signal (CSI-RS), and wherein the plurality of beam directions includes at least two different beam directions; transmitting, to the second UE based on one or more beam measurement signals of the plurality of beam measurement signals, an indication of a preferred beam direction of the plurality of beam directions; and receiving, from the second UE over the sidelink, data in the preferred beam direction.

Aspect 40 includes the method of aspect 39, wherein the receiving the plurality of beam measurement signals comprises receiving, from the second UE during a first period within the first slot in a first beam direction of the plurality of beam directions, a first beam measurement signal of the plurality of beam measurement signals; and receiving, from the second UE during a second period within the first slot in a second beam direction of the plurality of beam directions, a second beam measurement signal of the plurality of beam measurement signals, wherein the second period is adjacent to the first period.

Aspect 41 includes the method of aspect 40, wherein the first beam direction is different from the second beam direction.

Aspect 42 includes the method of aspect 40, wherein the first beam direction is the same as the second beam direction.

Aspect 43 includes the method of aspect 40, wherein the receiving the first beam measurement signal further includes receiving, from the second UE in a physical sidelink shared channel (PSSCH) within the first period, first sidelink control information part 2 (SCI-2).

Aspect 44 includes the method of aspect 43, wherein the receiving the first beam measurement signal further includes receiving, from the second UE, a reference signal, wherein the first SCI-2 is rate-matched around the reference signal.

Aspect 45 includes the method of aspect 44, further comprising receiving, from the second UE during the first period, sidelink control information part 1 (SCI-1) in a physical sidelink control channel (PSCCH) multiplexed with SCI-2 and the reference signal in the PSSCH.

Aspect 46 includes the method of aspect 45, wherein the receiving the plurality of beam measurement signals further comprises receiving, from the second UE in the PSSCH within the second period, the second beam measurement signal including second SCI-2, wherein the second period does not include any PSCCH.

Aspect 47 includes the method of aspect 46, wherein the first SCI-2 and the second SCI-2 include the same content.

Aspect 48 includes the method of aspect 39, wherein the receiving the plurality of beam measurement signals further comprises receiving, from the second UE, each beam measurement signal of the plurality of beam measurement signals in one of consecutive periods within the first slot, wherein each beam measurement signal includes sidelink control information part 2 (SCI-2).

Aspect 49 includes the method of aspect 39, wherein the transmitting the indication of the preferred beam direction comprises transmitting, to the second UE in a physical sidelink feedback channel (PSFCH) within the first slot, the indication of the preferred beam direction.

Aspect 50 includes the method of aspect 39, wherein the transmitting the indication of the preferred beam direction comprises transmitting, to the second UE in a physical sidelink feedback channel (PSFCH) within a second slot different from the first slot, the indication of the preferred beam direction.

Aspect 51 includes the method of any of aspects 39-50, further comprising receiving, from the second UE in a physical sidelink control channel (PSCCH) within the first slot, SCI part 1 (SCI-1) including beam sweep scheduling information for the plurality of beam measurement signals.

Aspect 52 includes the method of aspect 51, wherein the transmitting the indication of the preferred beam direction further comprises transmitting, to the second UE in a first resource of a plurality of resources in the PSFCH, the indication of the preferred beam direction, the first resource being based on the SCI-2 in the beam measurement signal of the preferred beam direction.

Aspect 53 includes the method of any of aspects 39-50, further comprising receiving, from the second UE, a semi-persistent scheduling (SPS) configuration indicating a set of SPS processes, wherein each SPS process of the set of SPS processes is associated with one of a set of consecutive mini-slots within the first slot and a quasi-colocation (QCL) association with a different beam direction of the plurality of beam directions, and wherein each mini-slot of the set of consecutive mini-slots corresponds to one of the consecutive periods.

Aspect 54 includes the method of aspect 53, wherein the receiving the SPS configuration comprises receiving, from the second UE, the SPS configuration indicating a periodicity for the set of SPS processes.

Aspect 55 includes the method of aspect 53, wherein the receiving the plurality of beam measurement signals comprises receiving, from the second UE based on a first SPS process of the set of SPS processes, a first beam measurement signal of the plurality of beam measurement signals in a first beam direction of the plurality of beam directions, the first beam direction corresponding to the preferred beam direction; and the transmitting the indication of the preferred beam direction further comprises transmitting, to the second UE in a first resource of a plurality of resources in the PSFCH, the indication of the preferred beam direction, the first resource being based on at least one of a SPS process ID for the first SPS process, a source ID associated with the first UE, or a destination ID associated with the second UE.

Aspect 56 includes the method of aspect 55, wherein the receiving the plurality of beam measurement signals further comprises receiving, from the second UE, the first beam measurement signal including information for selecting the first resource from the plurality of resources in the PSFCH, the information being associated with the at least one of the SPS process ID, the source ID, or the destination ID.

Aspect 57 includes the method of aspect 55, wherein the receiving the plurality of beam measurement signals further comprises receiving, from the second UE, the first beam measurement signal including SCI part 2 (SCI-2) indicating the information for selecting the first resource from the plurality of resources in the PSFCH.

Aspect 58 includes the method of any of aspects 39-50, further comprising receiving, from the second UE, a configuration indicating a beam sweeping resource pool including a set of consecutive mini-slots within the first slot, wherein each mini-slot of the set of consecutive mini-slots corresponds to one of the consecutive periods and a quasi-colocation (QCL) association with a different beam direction of the plurality of beam directions.

Aspect 59 includes the method of any of aspects 39, 49, or 50, wherein the receiving the plurality of beam measurement signals further comprises receiving, from the second UE, each beam measurement signal of the plurality of beam measurement signals in one of a plurality of resources time-multiplexed within the first slot, each beam measurement signal including the CSI-RS.

Aspect 60 includes the method of aspect 59, wherein each resource is in a different symbol of the first slot.

Aspect 61 includes the method of aspect 59, further comprising receiving, from the second UE during the first slot in a first beam direction including at least the plurality of beam directions, a CSI-RS trigger for the plurality of beam measurement signals in the first slot.

Aspect 62 includes the method of aspect 61, wherein the receiving the CSI-RS trigger comprises at least one of receiving, from the second UE in a physical sidelink control channel (PSCCH), sidelink control information part 1 (SCI-1) including the CSI-RS trigger; or receiving, from the second UE in a physical sidelink control channel (PSSCH), sidelink control information part 2 (SCI-2) including the CSI-RS trigger.

Aspect 63 includes the method of aspect 61, wherein the receiving the CSI-RS trigger comprises receiving, from the second UE, the CSI trigger indicating each of the plurality of resources associated with a different beam direction of the plurality of beam directions.

Aspect 64 includes the method of aspect 61, wherein the receiving the CSI-RS trigger further comprises receiving, to a group of UEs including the second UE, the CSI-RS trigger.

Aspect 65 includes the method of aspect 59, wherein the transmitting further comprises transmitting, to the second UE in a first resource of a plurality of resources within the PSFCH, the indication of the preferred beam direction, the first resource being based on at least one of a cyclic-shift, a source ID associated with the first UE, or a destination ID associated with the second UE.

Aspect 66 includes the method of aspect 65, wherein the transmitting further comprises transmitting, to the second UE in the PSFCH based on an on-off keying modulation, the indication of the preferred beam direction.

Aspect 67 includes the method of aspect 39, wherein the receiving the plurality of beam measurement signals comprises receiving, from the second UE in a first subchannel and in a first beam direction of the plurality of beam directions, a first beam measurement signal of the plurality of beam measurement signals; and receiving, from the second UE in a second subchannel and in a second beam direction of the plurality of beam directions, a second beam measurement signal of the plurality of beam measurement signals, wherein the second subchannel is different from the first subchannel.

Aspect 68 includes the method of aspect 39, further comprising determining, based on one or more of the plurality of beam measurement signals, the preferred receive beam direction from the plurality of beam directions.

Aspect 69 includes the method of aspect 68, wherein the determining further comprises determining a receive signal measurement for a first beam measurement signal of the plurality of beam measurement signals satisfies a threshold; and refraining, based on the receive signal measurement for the first beam measurement signal satisfying the threshold, from monitoring for a further beam measurement signal in the slot.

Aspect 70 includes a method of wireless communication performed by a first user equipment (UE), comprising receiving, from a second UE over a sidelink, an indication of a preferred transmit beam direction of a plurality of transmit beam directions; transmitting, to the second UE over the sidelink, a plurality of beam measurement signals in the preferred transmit beam direction associated with a receive beam selection; and transmitting, to the second UE over the sidelink based on the preferred transmit beam direction, data.

Aspect 71 includes the method of aspect 70, wherein the transmitting the plurality of beam measurement signals further comprises transmitting, to the second UE during a first period, a first beam measurement signal of the plurality of beam measurement signals; and transmitting, to the second UE during a second period, a second beam measurement signal of the plurality of beam measurement signals.

Aspect 72 includes the method of aspect 71, wherein the first period and the second period are in different slots.

Aspect 73 includes the method of aspect 71, wherein the first period and the second period are adjacent periods within a slot.

Aspect 74 includes the method of aspect 70, wherein the transmitting the plurality of beam measurement signals comprises transmitting, to the second UE in a physical sidelink shared channel (PSSCH) within each period, each beam measurement signal including at least one of sidelink control information part 2 (SCI-2) or a reference signal.

Aspect 75 includes the method of aspect 70, wherein the transmitting the plurality of beam measurement signals comprises transmitting, to the second UE during each period, each beam measurement signal including a channel state information-reference signal (CSI-RS).

Aspect 76 includes the method of aspect 70, further comprising transmitting, to the second UE, a receive beam selection trigger.

One aspect includes an apparatus comprising a processor coupled to a transceiver, wherein the processor and transceiver are configured to perform the method of any one of aspects 1-29.

Another aspect includes an apparatus comprising means for performing the method of any one of aspects 1-29.

Another aspect includes a non-transitory computer readable medium including program code, which when executed by one or more processors, causes a wireless communication device to perform the method of any one of aspects 1-29.

Another aspect includes an apparatus comprising a processor coupled to a transceiver, wherein the processor and transceiver are configured to perform the method of any one of aspects 30-38.

Another aspect includes an apparatus comprising means for performing the method of any one of aspects 30-38.

Another aspect includes a non-transitory computer readable medium including program code, which when executed by one or more processors, causes a wireless communication device to perform the method of any one of aspects 30-38.

Another aspect includes an apparatus comprising a processor coupled to a transceiver, wherein the processor and transceiver are configured to perform the method of any one of aspects 39-69.

Another aspect includes an apparatus comprising means for performing the method of any one of aspects 39-69.

Another aspect includes a non-transitory computer readable medium including program code, which when executed by one or more processors, causes a wireless communication device to perform the method of any one of aspects 39-69.

Another aspect includes an apparatus comprising a processor coupled to a transceiver, wherein the processor and transceiver are configured to perform the method of any one of aspects 70-76.

Another aspect includes an apparatus comprising means for performing the method of any one of aspects 70-76.

Another aspect includes a non-transitory computer readable medium including program code, which when executed by one or more processors, causes a wireless communication device to perform the method of any one of aspects 70-76.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), comprising:
    transmitting, to a second UE over a sidelink, a plurality of beam measurement signals in a plurality of beam directions during a first slot, wherein each beam measurement signal of the plurality of beam measurement signals includes at least one of sidelink control information (SCI) or a channel state information-reference signal (CSI-RS), and wherein the plurality of beam directions includes at least two different beam directions;
    receiving, from the second UE, an indication of a preferred beam direction of the plurality of beam directions; and
    transmitting, to the second UE over the sidelink, data in the preferred beam direction.

2. The method of claim 1, wherein the transmitting the plurality of beam measurement signals comprises:
    transmitting, to the second UE during a first period within the first slot in a first beam direction of the plurality of beam directions, a first beam measurement signal of the plurality of beam measurement signals; and
    transmitting, to the second UE during a second period within the first slot in a second beam direction of the plurality of beam directions, a second beam measurement signal of the plurality of beam measurement signals, wherein the second period is adjacent to the first period.

3. The method of claim 2, wherein the transmitting the first beam measurement signal further comprises:
    transmitting, to the second UE in a physical sidelink shared channel (PSSCH) within the first period, the first beam measurement signal including sidelink control information part 2 (SCI-2) and a reference signal, wherein the first period does not include any physical sidelink control channel (PSCCH).

4. The method of claim 1, wherein the receiving the indication of the preferred beam direction comprises:
    receiving, from the second UE in a physical sidelink feedback channel (PSFCH) within the first slot or a second slot different from the first slot, the indication of the preferred beam direction.

5. The method of claim 1, further comprising:
    transmitting, to the second UE in a physical sidelink control channel (PSCCH) within the first slot, SCI part 1 (SCI-1) including beam sweep scheduling information for the plurality of beam measurement signals.

6. The method of claim 1, further comprising:
    transmitting, to the second UE, a semi-persistent scheduling (SPS) configuration indicating a set of SPS processes, wherein each SPS process of the set of SPS processes is associated with one of a set of consecutive mini-slots within the first slot and a quasi-colocation (QCL) association with a different beam direction of the plurality of beam directions.

7. The method of claim 6, wherein:
    the transmitting the plurality of beam measurement signals comprises:
        transmitting, to the second UE based on a first SPS process of the set of SPS processes, a first beam measurement signal of the plurality of beam measurement signals in a first beam direction of the plurality of beam directions, the first beam direction corresponding to the preferred beam direction; and
    the receiving the indication of the preferred beam direction further comprises:
        receiving, from the second UE in a first resource of a plurality of resources in a physical sidelink feedback channel (PSFCH), the indication of the preferred beam direction, the first resource being based on at least one of a SPS process ID for the first SPS process, a source ID associated with the first UE, or a destination ID associated with the second UE.

8. The method of claim 7, wherein the transmitting the plurality of beam measurement signals further comprises:
    transmitting, to the second UE, the first beam measurement signal including information for selecting the first resource from the plurality of resources in the PSFCH, the information being associated with the at least one of the SPS process ID, the source ID, or the destination ID.

9. The method of claim 1, further comprising:
transmitting, to the second UE, a configuration indicating a beam sweeping resource pool including a set of consecutive mini-slots within the first slot, wherein each mini-slot of the set of consecutive mini-slots is associated with a quasi-colocation (QCL) association with a different beam direction of the plurality of beam directions.

10. The method of claim 1, wherein the transmitting the plurality of beam measurement signals further comprises:
transmitting, to the second UE, each beam measurement signal of the plurality of beam measurement signals in one of a plurality of resources time-multiplexed within the first slot, each beam measurement signal including the CSI-RS.

11. The method of claim 10, further comprising:
transmitting, to the second UE during the first slot in a first beam direction including at least the plurality of beam directions, a CSI-RS trigger for the plurality of beam measurement signals in the first slot.

12. A method of wireless communication performed by a first user equipment (UE), comprising:
transmitting, to a second UE over a sidelink, an indication of a preferred transmit beam direction of a plurality of transmit beam directions;
receiving, from the second UE over the sidelink based on a plurality of receive beam directions, a plurality of beam measurement signals in the preferred transmit beam direction;
determining, based on the plurality of beam measurement signals received from the second UE, a preferred receive beam direction from the plurality of receive beam directions; and
receiving, from the second UE over the sidelink based on the preferred receive beam direction, data.

13. The method of claim 12, wherein the receiving the plurality of beam measurement signals comprises:
receiving, from the second UE based on a first receive beam direction of the plurality of receive beam directions, a first beam measurement signal of the plurality of beam measurement signals; and
receiving, from the second UE based on a second receive beam direction of the plurality of receive beam direction, a second beam measurement signal of the plurality of beam measurement signals.

14. The method of claim 12, wherein the receiving the plurality of beam measurement signals comprises:
receiving, from the second UE in a physical sidelink shared channel (PSSCH) within each period, each beam measurement signal including at least one of sidelink control information part 2 (SCI-2) or a reference signal.

15. The method of claim 12, wherein the receiving the plurality of beam measurement signals comprises:
receiving, from the second UE during each period, each beam measurement signal including a channel state information-reference signal (CSI-RS).

16. A first user equipment (UE) comprising:
a memory;
a transceiver; and
at least one processor coupled to the memory and the transceiver, wherein the first UE is configured to:
transmit, to a second UE over a sidelink, a plurality of beam measurement signals in a plurality of beam directions during a first slot, wherein each beam measurement signal of the plurality of beam measurement signals includes at least one of sidelink control information (SCI) or a channel state information-reference signal (CSI-RS), and wherein the plurality of beam directions includes at least two different beam directions;
receive, from the second UE, an indication of a preferred beam direction of the plurality of beam directions; and
transmit, to the second UE over the sidelink, data in the preferred beam direction.

17. The first UE of claim 16, wherein the first UE configured to transmit the plurality of beam measurement signals is further configured to:
transmit, to the second UE during a first period within the first slot in a first beam direction of the plurality of beam directions, a first beam measurement signal of the plurality of beam measurement signals; and
transmit, to the second UE during a second period within the first slot in a second beam direction of the plurality of beam directions, a second beam measurement signal of the plurality of beam measurement signals, wherein the second period is adjacent to the first period.

18. The first UE of claim 17, wherein the first UE configured to transmit the first beam measurement signal is further configured to:
transmit, to the second UE in a physical sidelink shared channel (PSSCH) within the first period, the first beam measurement signal including sidelink control information part 2 (SCI-2) and a reference signal, wherein the first period does not include any physical sidelink control channel (PSCCH).

19. The first UE of claim 16, wherein the first UE configured to receive the indication of the preferred beam direction is further configured to:
receive, from the second UE in a physical sidelink feedback channel (PSFCH) within the first slot or a second slot different from the first slot, the indication of the preferred beam direction.

20. The first UE of claim 16, further configured to:
transmit, to the second UE in a physical sidelink control channel (PSCCH) within the first slot, SCI part 1 (SCI-1) including beam sweep scheduling information for the plurality of beam measurement signals.

21. The first UE of claim 16, further configured to:
transmit, to the second UE, a semi-persistent scheduling (SPS) configuration indicating a set of SPS processes, wherein each SPS process of the set of SPS processes is associated with one of a set of consecutive mini-slots within the first slot and a quasi-colocation (QCL) association with a different beam direction of the plurality of beam directions.

22. The first UE of claim 21, wherein:
the first UE configured to transmit the plurality of beam measurement signals is further configured to:
transmit, to the second UE based on a first SPS process of the set of SPS processes, a first beam measurement signal of the plurality of beam measurement signals in a first beam direction of the plurality of beam directions, the first beam direction corresponding to the preferred beam direction; and
the first UE configured to receive the indication of the preferred beam direction is further configured to:
receive, from the second UE in a first resource of a plurality of resources in a physical sidelink feedback channel (PSFCH), the indication of the preferred beam direction, the first resource being based on at least one of a SPS process ID for the first SPS process, a source ID associated with the first UE, or a destination ID associated with the second UE.

23. The first UE of claim 22, wherein the first UE configured to transmit the plurality of beam measurement signals is further configured to:
   transmit, to the second UE, the first beam measurement signal including information for selecting the first resource from the plurality of resources in the PSFCH, the information being associated with the at least one of the SPS process ID, the source ID, or the destination ID.

24. The first UE of claim 16, wherein the first UE is configured to:
   transmit, to the second UE, a configuration indicating a beam sweeping resource pool including a set of consecutive mini-slots within the first slot, wherein each mini-slot of the set of consecutive mini-slots is associated with a quasi-colocation (QCL) association with a different beam direction of the plurality of beam directions.

25. The first UE of claim 16, wherein the first UE configured to transmit the plurality of beam measurement signals is further configured to:
   transmit, to the second UE, each beam measurement signal of the plurality of beam measurement signals in one of a plurality of resources time-multiplexed within the first slot, each beam measurement signal including the CSI-RS.

26. The first UE of claim 25, wherein the first UE is configured to:
   transmit, to the second UE during the first slot in a first beam direction including at least the plurality of beam directions, a CSI-RS trigger for the plurality of beam measurement signals in the first slot.

27. A first user equipment (UE) comprising:
   a memory;
   a transceiver; and
   at least one processor coupled to the memory and the transceiver, wherein the first UE is configured to:
      transmit, to a second UE over a sidelink, an indication of a preferred transmit beam direction of a plurality of transmit beam directions;
      receive, from the second UE over the sidelink based on a plurality of receive beam directions, a plurality of beam measurement signals in the preferred transmit beam direction;
      determine, based on the plurality of beam measurement signals received from the second UE, a preferred receive beam direction from the plurality of receive beam directions; and
      receive, from the second UE over the sidelink based on the preferred receive beam direction, data.

28. The first UE of claim 27, wherein the first UE configured to receive the plurality of beam measurement signals is further configured to
   receive, from the second UE based on a first receive beam direction of the plurality of receive beam directions, a first beam measurement signal of the plurality of beam measurement signals; and
   receive, from the second UE based on a second receive beam direction of the plurality of receive beam direction, a second beam measurement signal of the plurality of beam measurement signals.

29. The first UE of claim 27, wherein the first UE configured to receive the plurality of beam measurement signals is further configured to
   receive, from the second UE in a physical sidelink shared channel (PSSCH) within each period, each beam measurement signal including at least one of sidelink control information part 2 (SCI-2) or a reference signal.

30. The first UE of claim 27, wherein the first UE configured to receive the plurality of beam measurement signals is further configured to
   receive, from the second UE during each period, each beam measurement signal including a channel state information-reference signal (CSI-RS).

* * * * *